US008321571B2

(12) United States Patent
Crowder, Jr. et al.

(10) Patent No.: US 8,321,571 B2
(45) **Date of Patent: *Nov. 27, 2012**

(54) LOCAL GAME-AREA NETWORK METHOD

(75) Inventors: Robert W. Crowder, Jr., Las Vegas, NV (US); Pravinkumar Patel, Las Vegas, NV (US); Joshua D. Larsen, Las Vegas, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/301,638

(22) Filed: Nov. 21, 2011

(65) Prior Publication Data

US 2012/0064979 A1 Mar. 15, 2012

Related U.S. Application Data

(63) Continuation of application No. 11/740,218, filed on Apr. 25, 2007, now Pat. No. 8,065,394, which is a continuation-in-part of application No. 10/794,760, filed on Mar. 5, 2004, now abandoned, which is a continuation-in-part of application No. 10/224,026, filed on Aug. 19, 2002, now Pat. No. 7,351,151.

(60) Provisional application No. 60/452,407, filed on Mar. 5, 2003, provisional application No. 60/313,743, filed on Aug. 20, 2001.

(51) Int. Cl.
*G06F 15/173* (2006.01)
*A63F 9/24* (2006.01)

(52) U.S. Cl. ........................... 709/226; 709/219; 463/42

(58) Field of Classification Search .................. 709/219, 709/226; 463/42, 29; 370/257
See application file for complete search history.

(56) References Cited

U.S. PATENT DOCUMENTS 6,035,356 A 3/2000 Khan
6,106,396 A 8/2000 Alcorn et al.
6,361,440 B1 * 3/2002 Ogawa et al. .................... 463/42
6,775,246 B1 * 8/2004 Kuribayashi et al. .......... 370/257
(Continued)

FOREIGN PATENT DOCUMENTS

EP 1 550 988 A2 7/2005
(Continued)

OTHER PUBLICATIONS

Scott Oaks: "java security, Passage" Java Security, XX, XX, May 1, 2001, pp. 261-287, 309, XP002321663.

*Primary Examiner* — Jungwon Chang
(74) *Attorney, Agent, or Firm* — Brooke Quist; Marvin Hein

(57) ABSTRACT

A local game-area network includes a plurality of gaming devices and local game-area servers. Each local game-area server is associated with a corresponding gaming device. Each local game-area server in the local game-area network is operatively associated with every other local game-area server in the local game-area network. Additionally, one of the local game-area servers is a host local game-area server while the remaining gaming devices and associated local game-area servers are clients. Furthermore, the host status of the host local game-area server moves dynamically to an available local game-area server in the local game-area network in response to the host local game-area server becoming non-operational.

43 Claims, 27 Drawing Sheets

U.S. PATENT DOCUMENTS

| | | | | |
|---|---|---|---|---|
| 8,065,394 | B2 * | 11/2011 | Crowder et al. | 709/219 |
| 2001/0053712 | A1 | 12/2001 | Yoseloff et al. | |
| 2002/0052230 | A1 | 5/2002 | Martinek et al. | |
| 2002/0082084 | A1 | 6/2002 | Snow et al. | |
| 2002/0137217 | A1 * | 9/2002 | Rowe | 436/42 |
| 2002/0142831 | A1 * | 10/2002 | Mattice et al. | 463/29 |

FOREIGN PATENT DOCUMENTS

| | | |
|---|---|---|
| WO | WO 00/06268 | 2/2000 |
| WO | 02/01351 A2 | 1/2002 |

* cited by examiner (Embodiment of Present Invention)

MEM_MAP[] IS THE KERNEL'S "ONE STOP SHOPPING PLACE" FOR INFORMATION ABOUT THE STATE OF EVERY PAGE FRAME. IT HAS AN ELEMENT OF INFORMATION FOR EACH PAGE OF PHYSICAL MEMORY.

LOCAL GAME-AREA NETWORK METHOD

CROSS-REFERENCE TO RELATED APPLICATIONS

This application is a continuation of U.S. patent application Ser. No. 11/740,218, filed Apr. 25, 2007, which is a continuation-in-part of U.S. patent application Ser. No. 10/794,760, filed Mar. 5, 2004, entitled GAMING SYSTEM ARCHITECTURE WITH MULTIPLE PROCESSES AND MEDIA STORAGE, which is hereby incorporated herein by reference, and which in turn claims the benefit of the filing date of U.S. Provisional Patent Application No. 60/452,407, filed Mar. 5, 2003, entitled GAMING BOARD SET AND GAMING KERNEL FOR GAME CABINETS, now U.S. Pat. No. 7,351,151, issued Apr. 1, 2008, all of which are hereby incorporated herein by reference in their entirety. U.S. patent application Ser. No. 11/740,218 is also a continuation-in-part of U.S. patent application Ser. No. 10/224,026, filed Aug. 19, 2002, entitled GAMING BOARD SET AND GAMING KERNEL FOR GAME CABINETS, which is hereby incorporated herein by reference, and which in turn claims the benefit of the filing date of provisional application 60/313,743 which was filed on Aug. 20, 2001, entitled FORM FITTING UPGRADE BOARD SET FOR EXISTING GAME CABINETS, all of which are hereby incorporated herein by reference. This application is related to co-pending U.S. patent application Ser. No. 11/740,224, concurrently filed on Apr. 25, 2007 entitled LOCAL GAME-AREA NETWORK SYSTEM.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

This invention relates generally to a gaming system and, more particularly, to a system and methodology for providing high performance, incremental and large upgrades, and a consistent game development API for gaming cabinets, both existing and new.

BACKGROUND

Gaming industry cabinets are fairly standardized as to general configuration. This is partly due to the needs of the casinos, who want to fit the maximum number of gaming devices into a given amount of floor space. It is also due to the physical needs of players, who need a certain minimum amount of cabinet area in front of them to play the game while not crowding their fellow players on the next gaming machine. It is also due to the requirements of the game components, encompassing both regulated and non-regulated aspects. Game components include a video monitor or reels, input and output devices (buttons, network interface, voucher or ticket printers, and magnetic strip card readers are typical) together with a main processor board. The main processor board has interfaces to the various input and output devices, and has at least a processor and memory which enables gaming software to be installed and run on the processor board. In most gaming machines the processor board, power supply and other related mechanical and electrical elements are typically co-located near the base of the gaming machine. Disposed thereabove at approximately chest level of the player is the gaming display, such as the rotatable reel displays in a slot machine or a video monitor for video-based games.

FIG. 1 illustrates a common prior art gaming machine. The gaming machine 100 has a top candle 108, a video screen or reel area 102, player input area 104 (generally having buttons, coin-in and/or bill-in, card reader, and in newer machines a printer), and pull handle 106. Gaming machine 100 has, in its interior, a processor board whose location is generally indicated as 110 (the actual processor board and mounting hardware are on the inside of the cabinet).

The processor board, in addition to having physical mounts such as guides, rails, standoff mounts, board slots, board slides, or board tray, will further have cabinet electronic interfaces, typically at the back of the board (towards the front of the cabinet, from a player's perspective). Processor boards will typically have a set of multi-pin plugs or bus connectors that slide into mating plugs or bus connectors when the processor board is correctly seated in its mounts.

FIG. 2 shows a picture of a prior art processor board 200, in this case a processor board from an 1GT® Game King® gaming machine. Shown is the top of the board, with the front of the board facing the bottom of the figure. As is typical, the sides of the board slide into the game cabinet using guide rails in the cabinet, with the cabinet bus or connector interfaces 202 mating to specially positioned and configured plugs in the cabinet.

If the board needs work, the entire processor board is replaced. In addition to a replacement board from the manufacturer (in this case, IGT®), there are commercially-available replacement boards having the same or nearly the same features, speed, memory capacity, and the like, from aftermarket manufacturers. No matter where the board originates, it follows the same configuration, that is, it consists of a single board that replaces the processor board supplied with the game having similar functionality and the same form. In addition to its physical similarity, it employs a monolithic software architecture. Otherwise stated, the game cabinet-specific operating system and specific game software are not a modular, layered design using modem software engineering practices. An example of an aftermarket replacement processor board for the IGT® Game King® gaming cabinet is, or was sold by, Happ Controls™, 106 Garlisch Drive, Elk Grove, Ill. 60007. It has the same basic physical, electronic, and software architecture as the original.

Upgraded processor boards are also available for some games. The reason for considering upgraded boards is that it may be possible to run newer games in a cabinet already owned by a casino if improvements are made to processor speed, memory, graphic support chips, and other components. Game upgrades interface to some degree with the internal busses of the game cabinet but require cabinet modifications. Currently available upgraded boards do not fit in the slot used by the original processor board; rather, they must be mounted elsewhere in the cabinet. In addition to requiring the accompanying mechanical fabrication and electrical work, the upgraded boards are a fixed upgrade. That is, if the configuration of the upgraded game itself needs to be upgraded a few years later, you have to purchase and install a completely new upgrade kit which requires going through the same installation problems that were encountered with the original upgrade. This is a significant deterrent to upgrading activity.

In addition, each proprietary processor board as well as upgraded game boards typically uses its own interface to the game software, requiring game rewrites each time a hardware upgrade occurs. This makes gradual or incremental game enhancement prohibitively expensive.

Thus, it would be desirable to provide a game processor that (1) is usable in upgrades in existing cabinets, as well as usable for new game cabinets; (2) is more cost effective, (3) is easier to install; (4) provides for incremental upgrades itself; and (5) provides more standard interfaces to the game development community.

Furthermore, most gaming systems today are embedded systems. Existing gaming systems typically contain limited resources such as processing power, memory, and program storage. Because of these limitations, gaming platform programs have generally been implemented as one monolithic program, where all of the code is compiled into one executable program. Monolithic programs, which drive the gaming system, typically use interrupts to handle all real-time background activities. These interrupts are driven by the hardware components. The interrupts typically process time-critical data and place this data or status information into memory variables which are shared by the main line code. Monolithic programs usually have a series of tasks that need to be performed in the main line code. These tasks might include acting on status information from interrupts, and processing player input and other events that drive the gaming application.

The problem with monolithic programs is that the program must be stored in one media device such as an EPROM, a series of EPROMs acting as one media device, flash memory devices, or a hard drive. Any modification to the monolithic program requires an update to the program storage device. This means that if a bug is found in a particular core feature, such as paying coins from the hopper, then all game programs must be rebuilt and re-released to the regulatory agencies for approval. A core feature modification such as this can require a gaming manufacturer to re-release hundreds of programs. Each program must be retested and approved by the regulatory agencies causing considerable delays and increased costs to the gaming manufacturer.

Another method that gaming manufacturers have performed in the past, is to separate the media that contains the game paytables from the media that contains the monolithic program. The game paytable is typically a table of pay rates that controls how the gaming machine program plays and pays out wins. The benefit to this method is that regulatory agencies do not need to retest a paytable if it does not change. By making a modification to the monolithic program, the paytable media stays the same, allowing the regulators to assume the paytable will work as it did before.

While there are some benefits to this method, there are some very constraining drawbacks. First, the paytable media only contains data tables that drive the execution of the game program. The paytable media does not contain executable code. This means the monolithic game program must contain the core gaming system code along with the game code. The program must support all game code and game variations that can be driven by the paytable data media. It is not feasible for a game program to support hundreds of different game variations due to the limited resources of the embedded system. The paytable media can only be changed to effect changes in the game features or payouts that are already in the game program. It is also very difficult to continually maintain the core gaming modules along with all of the hundreds of game modules in the manufacturers library.

SUMMARY

Briefly, and in general terms, the disclosed embodiment provides a method of using a local game-area network in a casino environment in which the local game-area network does not require support from a large casino floor network or back-end server system to enable group gaming. The method includes: providing a plurality of gaming device sub-systems in the local game-area network, each gaming device sub-system including a gaming device and a corresponding local game-area server, wherein each local game-area server is associated with a corresponding gaming device in each gaming device sub-system; designating one of the local game-area servers as an active local game-area server that has host status while the remaining local game-area servers act as clients, wherein only a single local game-area server is used to support the plurality of gaming devices, and the other local game-area servers in the plurality of gaming device sub-systems are inactive; and in response to the active local game-area server becoming non-operational, dynamically moving the host status of the active local game-area server to an available local game-area server acting as a client in the local game-area network.

Another embodiment discloses a method of using a local game-area network in a casino environment in which the local game-area network does not require support from a large casino floor network or back-end server system to enable group gaming. The method includes: providing a plurality of gaming device sub-systems in the local game-area network, each gaming device sub-system including a gaming device and a corresponding local game-area server; providing a plurality of additional gaming devices connected to the local game-area network; designating one of the local game-area servers as an active local game-area server that has host status while the remaining local game-area servers act as clients, wherein only a single local game-area server is used to support the plurality of gaming devices, and the other local game-area servers in the plurality of gaming device sub-systems are inactive; and in response to the active local game-area server becoming non-operational, dynamically moving the host status of the active local game-area server to an available local game-area server acting as a client in the local game-area network.

Still another embodiment is directed towards using a gaming system having multiple networks in a casino environment. The method includes: providing a casino floor network, wherein the casino floor network is selected from the group consisting of a legacy casino floor network, an Ethernet casino floor network, and a IP-based casino floor network; providing a local game-area network, wherein the local game-area network enables group gaming without assistance from the casino floor network or a back-end server system; providing a plurality of gaming device sub-systems connected to the local game-area network, each gaming device sub-system including a gaming device and a corresponding local game-area server; designating one of the local game-area servers as an active local game-area server that has host status while the remaining local game-area servers act as clients, wherein only a single local game-area server is used to support the plurality of gaming devices, and the other local game-area servers in the plurality of gaming device sub-systems are inactive; and in response to the active local game-area server becoming non-operational, dynamically moving the host status of the active local game-area server to an available local game-area server acting as a client in the local game-area network.

Other features and advantages of the disclosed embodiment will become apparent from the following detailed description when taken in conjunction with the accompanying drawings, which illustrate by way of example, the features of the disclosed embodiment.

DETAILED DESCRIPTION

Figure 1:
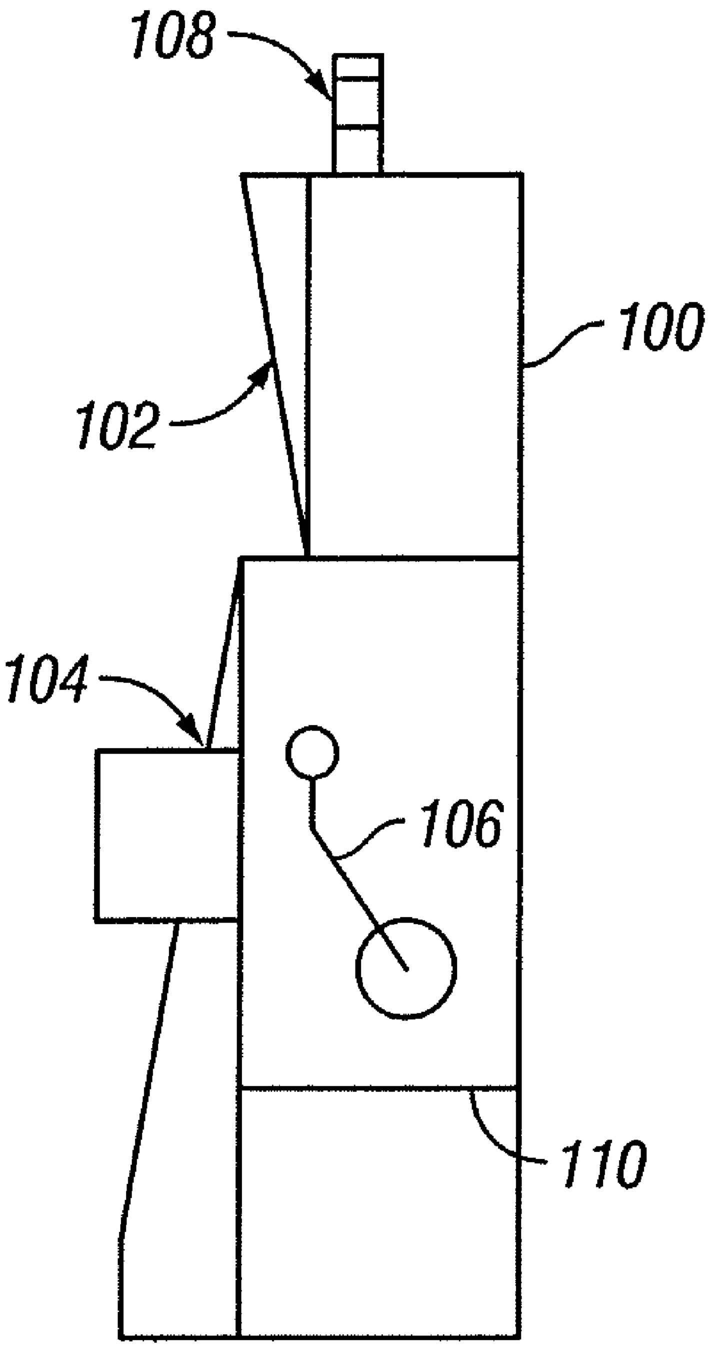
FIG. 1 (Prior Art)
FIG. 1 is a diagram of a prior art game cabinet showing a prior art processor board location.

Referring to the drawings, for illustrative purposes the disclosed embodiments are shown embodied in FIG. 1 through FIG. 5. It will be appreciated that the apparatus may vary as to configuration and as to details of the parts, and that the method may vary as to details, partitioning, and the order of acts in a process, without departing from the inventive concepts disclosed herein. The disclosed embodiments provide a new and dramatically more cost effective way for owners of aging games (hardware and software) to upgrade their existing cabinets to incorporate new hardware features and capabilities, as well manufacturers of new game cabinets to insure a new, novel, and easy to access upgrade paths to help stave off obsolescence in an industry where games often have lives of 6 months or even less.

The disclosed embodiments provide for easy hardware and game-level software upgrades (user-level or application level software, from the operating system's viewpoint and when in a modular and layered software environment such as that provided by the disclosed embodiments), not previously available. This includes being able to easily and economically upgrade hardware that incorporates faster CPUs, busses, and the like, as well as incorporating new features such as Ethernet connectivity, stereo sound, and high-speed/high-resolution graphics. In addition to the ease of upgrading hardware capabilities, the disclosed embodiments further provide a game kernel which, by providing a callable, consistent user-interface API to the new hardware, makes game programming changes for the game-level programmers minimal after a hardware upgrade. It also provides for backward compatibility, enabling gaming machine owners to upgrade hardware, install the game kernel supporting the new hardware (described in more detail below, but fundamentally installing the libraries that support the added or new hardware capabilities), but wait to upgrade the game software until any later time.

In addition, the game kernel and two-piece processor board introduced in the disclosed embodiments allows game-level programmers to design and build games using the same game application interface across multiple manufacturers' cabinets, resulting in a huge development savings when compared to the prior art.

Figure 2:
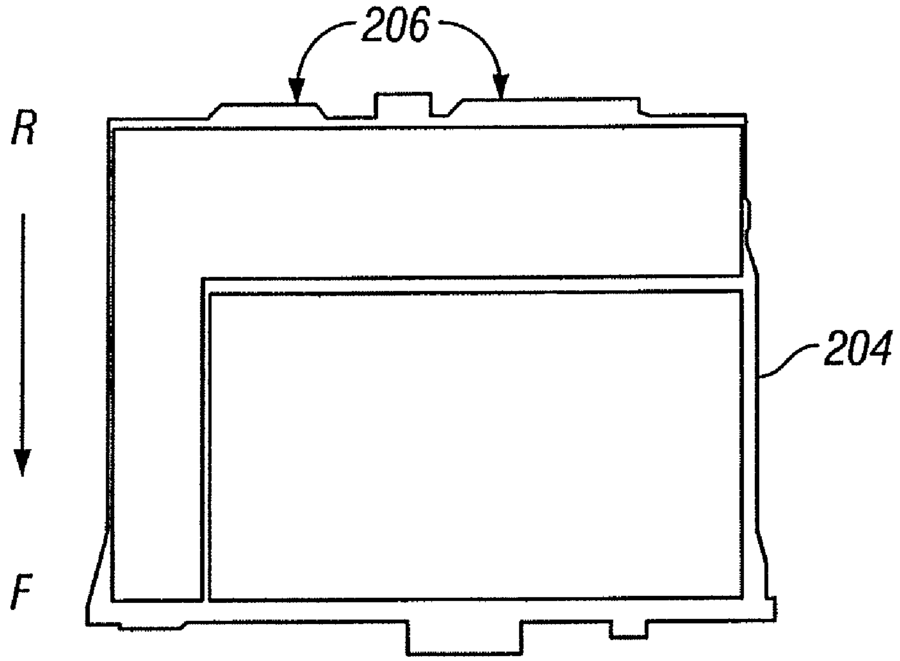
(Prior Art) FIG. 2
FIG. 2 is a diagram of a prior art processor board and a two-board processor board set according to one embodiment.
Figure 2:
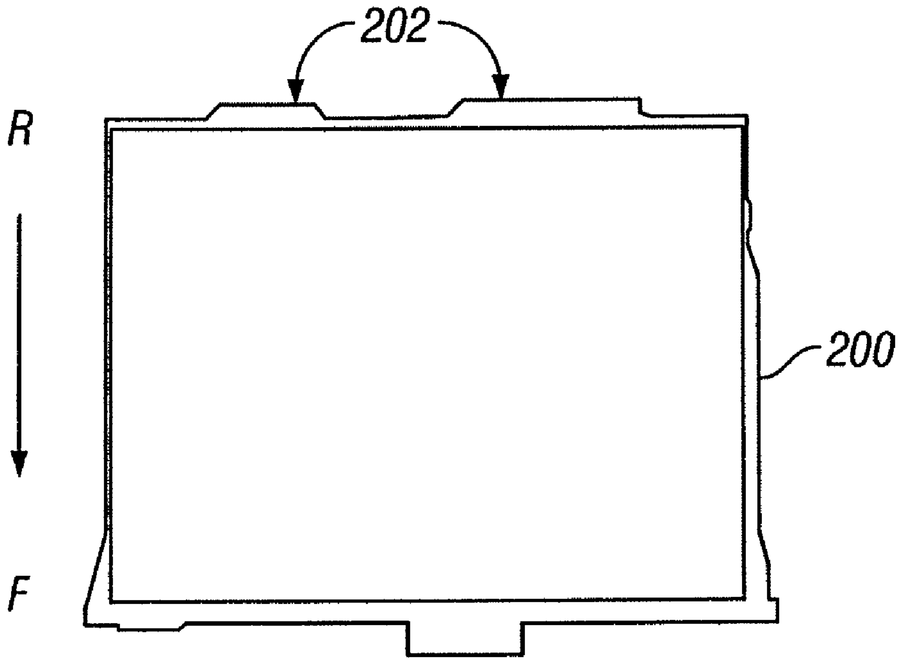
(Prior Art) FIG. 2

FIG. 2 shows two game processor boards. Board 200 is a prior art processor board from an IGT® game cabinet. Board 204 is a processor board according to the disclosed embodiments, called a two-board processor board set. Note that it is designed to be a swap-fit with the original, prior art board. It will use the same physical board mounts (slides, guides, rails, and the like) inside the cabinet, and will connect to the cabinet wiring using compatibly placed connectors 206. Note that in any particular replacement board set, there may be some individual connectors, pins, or pin positions not used, because player I/O devices were changed, added, and/or other considerations. However, the supplied connectors will make the game machine (cabinet) functional for game play. For added functionality, there will typically be additional connectors supplied over and above those on the processor board being replaced. This allows the two-board set of the disclosed embodiments to be a simple swap replacement for the old processor board. This is a huge improvement over other upgrade boards, which require casino personnel to install the prior art replacement processor board in a new physical location within the game cabinet, including figuring out where to mount the new board mounting hardware as well as the attendant problems of fitting new connectors.

For the purpose of this disclosure, the processor board that came with the game cabinet as first delivered from the manufacturer to a customer will be called the OEM (Original Equipment Manufacturer) processor board. Further, the mounting system for the OEM processor board, in whatever form the game cabinet was delivered, is called the OEM mount, mounts, or mounting system. It is to be understood that the OEM mounts may be any implementation, including but not limited to slides, rack-mount, stand-offs, guides, blocks, rails, trays, and the like. Whatever mounting system or mounts were used when the game was first manufactured is included in the definition of OEM mount(s).

Figure 3:
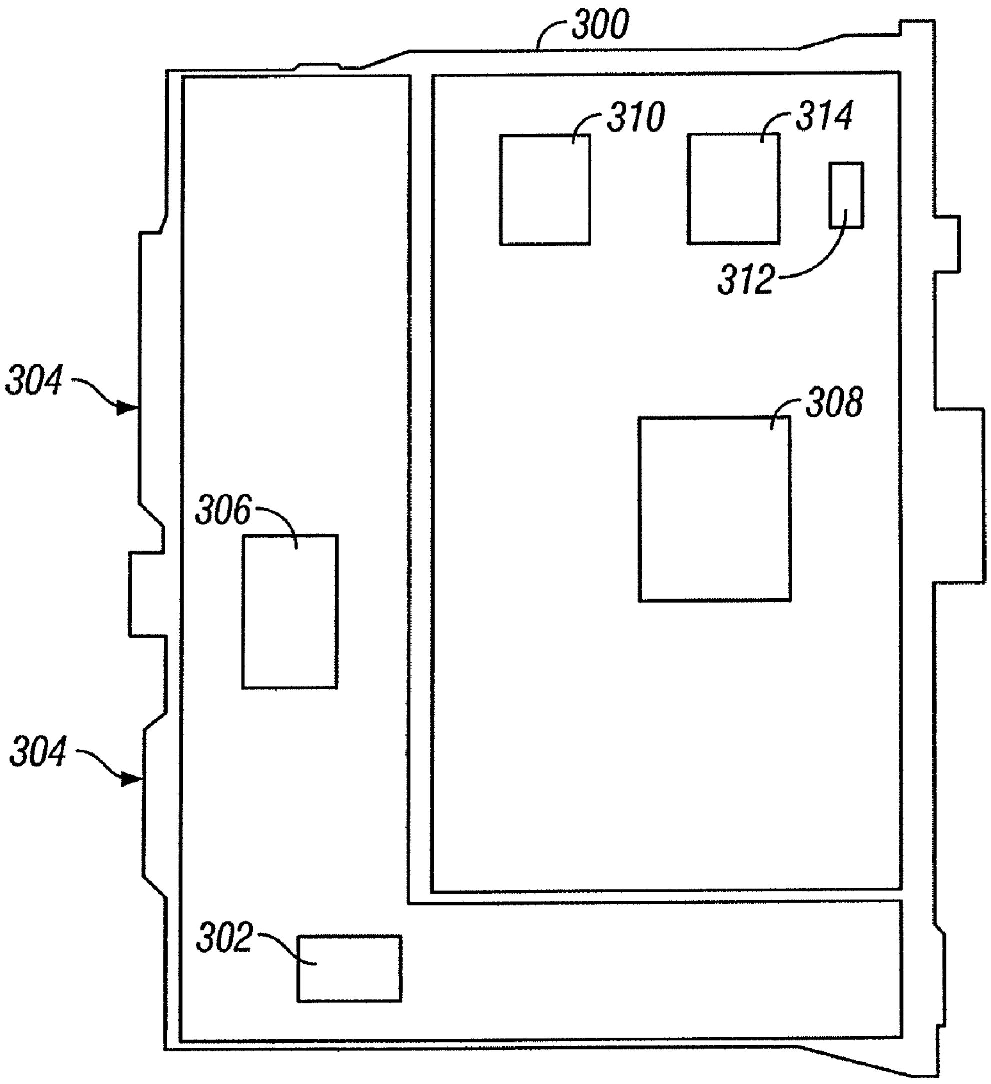
FIG. 3 is an illustration of a two piece replacement processor board according to one embodiment.

FIG. 3 shows more details of an example two board set to replace the traditional processor board. A very important feature is that the replacement processor board is made up of two boards, a first board 300 and a second board 306. The two boards are plugged together, using the three visible multi-connector plugs between the two boards (no pointer provided to help keep visual clutter to a minimum).

Board 300 is an industry standard processor board, such as a Netra AX2200 from Sun Microsystems of California, or the SE440BX-2 or CAI 80 from Intel Corporation of California. Both can be purchased with industry standard form factors and are configured to support at least one operating system (including embedded operating systems). By "industry standard form factors", this disclosure means any board form factor that has been agreed to by more than one board manufacturer. Such form factors typically have publicly-available specifications, often using an industry funded organization to keep the specifications. One such organization is the Desktop Form Factors Organization, which may be found at www.formfactors.org. Examples of form factors whose specifications may be found there include the ATX, MicroATX, NLX, and FlexATX. There are other industry standard form factors as well. In addition, there are other specifications that are understood to be a consideration in the industry and in the selection of an industry standard form factor for use in the disclosed embodiment, but are not explicitly discussed in this disclosure. One such consideration is height. Older rack-mounted systems might have been based on 4U or 6U racks, with boards having a larger perimeter measurement than desktop form factors. Now, manufacturers are targeting 2U or even 1U racks. Because it is generally the case that height is not an issue in pre-existing game cabinets, height considerations (as well as some other form factors) are not explicitly discussed herein. However, it is to be understood that should such considerations become necessary, all such considerations are included in the description of "form factors" as used herein. Any board having at least a CPU or a CPU socket, having any industry standard form factor, and being designed to be a system in the sense of enabling at least one operating system (including an embedded operating system) to run on it, will be referred to as a processor board for the purposes of the disclosure.

Board 306 is a unique board created by Sierra Design Group (SDG) for the purposes of creating a form fitting and functionally compatible replacement processor board (when coupled with board 300) for the OEM processor board found in game cabinets currently in use. The board set is also intended to be used in new gaming cabinets when new game cabinets are designed from the ground up with the board set of the disclosed embodiments, with an I/O adapter board designed specifically for the new cabinet. Existing game cabinets used with the disclosed embodiments might be from IGT®, Bally®, WMS®, or other preeminent game manufacturers. Further, each of these game manufacturers is typically selling several game cabinets, each with their own processor board, at any given time. Board 306 is specially designed and manufactured for each targeted game cabinet, with board 300 and board 306 configured to form a plug-compatible, functionally compatible and functionally enhanced, and form-fit-compatible replacement processor board. As part of this plug-in compatibility, the game cabinet interface connectors 304 mate directly with the plugs in the game cabinet for which the processor board is designed. Note that it may be the case that a subset of the pre-existing game cabinet's plugs (or pins in a plug) are used, where the unused plugs (or pins) do not mate to a compatible plug on the processor board set of the disclosed embodiments. The processor board set is still plug compatible; however, because the remaining plugs (or pins) are designed to be functionally compatible with the subset with which they interface, the unused plugs (or pins) being taken into consideration during the design of the processor board set are such that there is no interference with the other plugs (or pins). Thus, a swap-fit is fully enabled.

Thus, it is to be understood that the term "swap-fit" does not imply identical connector mappings or identical connector configurations; rather, swap-fit simply means that the processor board set described herein replaces the OEM processor board in such a manner that is uses the OEM mounts, and interfaces to such existing plugs/pins/opto-isolators/connectors/connector-blocks/bus-connectors (collectively, connectors) that enables all player devices to be used in the existing game cabinet to be functionally connected to the processor board set of this disclosure.

"Player device" and "player devices" are defined to mean any and all devices that a player may see, hear, touch, or feel. Some are passive (in the sense that a player only receives information from them, such as a video screen and speakers), while others are active (buttons, handles, levers, touchscreens, and the like). Both types are included when using the words "player devices" in general.

Boards (such as boards 306) are called game cabinet adapter and functional enhancement boards, or I/O adapter boards, for the purposes of this disclosure. A processor board coupled with an I/O adapter board is called a two-board processor board set. Note that for certain applications, it may be the case that the applicable I/O adapter board could be made that is an adapter board without additional functional enhancements, to fit an existing game cabinet. This is not expected to be a preferred embodiment, as the cost to provide enhancements (like addition communications ports) is small enough relative to the cost of the overall two-board set making the additional functionality well worth the incremental costs.

The creation of a replacement processor board made up of board 300 and board 306, or two-board processor board set, opens many optional upgrading and game enhancement paths for game box manufacturers, game developers, and casino owners. For example, 302 points to a portion of board 306 which incorporates stereo sound capabilities, including an amplifier to drive higher wattage speakers than found in a standard game cabinet. This allows the game software that is running on the two-board processor board set of the disclosed embodiments (coupled with the gaming kernel), without any changes, to make use of stereo audio output. For best results, the standard mono speakers in the game cabinet should then be upgraded to stereo audio speakers; this can be easily done with the disclosed embodiments by merely replacing the speakers with new ones. Now the game will suddenly have full stereo sound, able to drive speakers having significantly higher wattage ratings. If the speakers are not upgraded, both signals will be sent to the standard plug into the existing game cabinet wiring and speakers, allowing the game to function exactly as before. This enables, at a later date as investment capitol becomes available (or if a new game requires stereo audio capabilities, especially helpful for use with sight impaired game players), the cabinet can be upgraded with new speakers and the stereo output is already available. No further changes are typically required. This one example shows how the two-board processor board set allows both hardware and software upgrades in a gradual manner, as investment capitol becomes available. This incremental upgrading capability, including the use of both hardware and software incremental upgrades, has heretofore been unavailable.

Returning now to board 300, a few of its major components are indicated such as processor chip 310 (a socketted Pentium 266 in one preferred embodiment), memory slot 312, and compact flash program storage 310.

Figure 4:
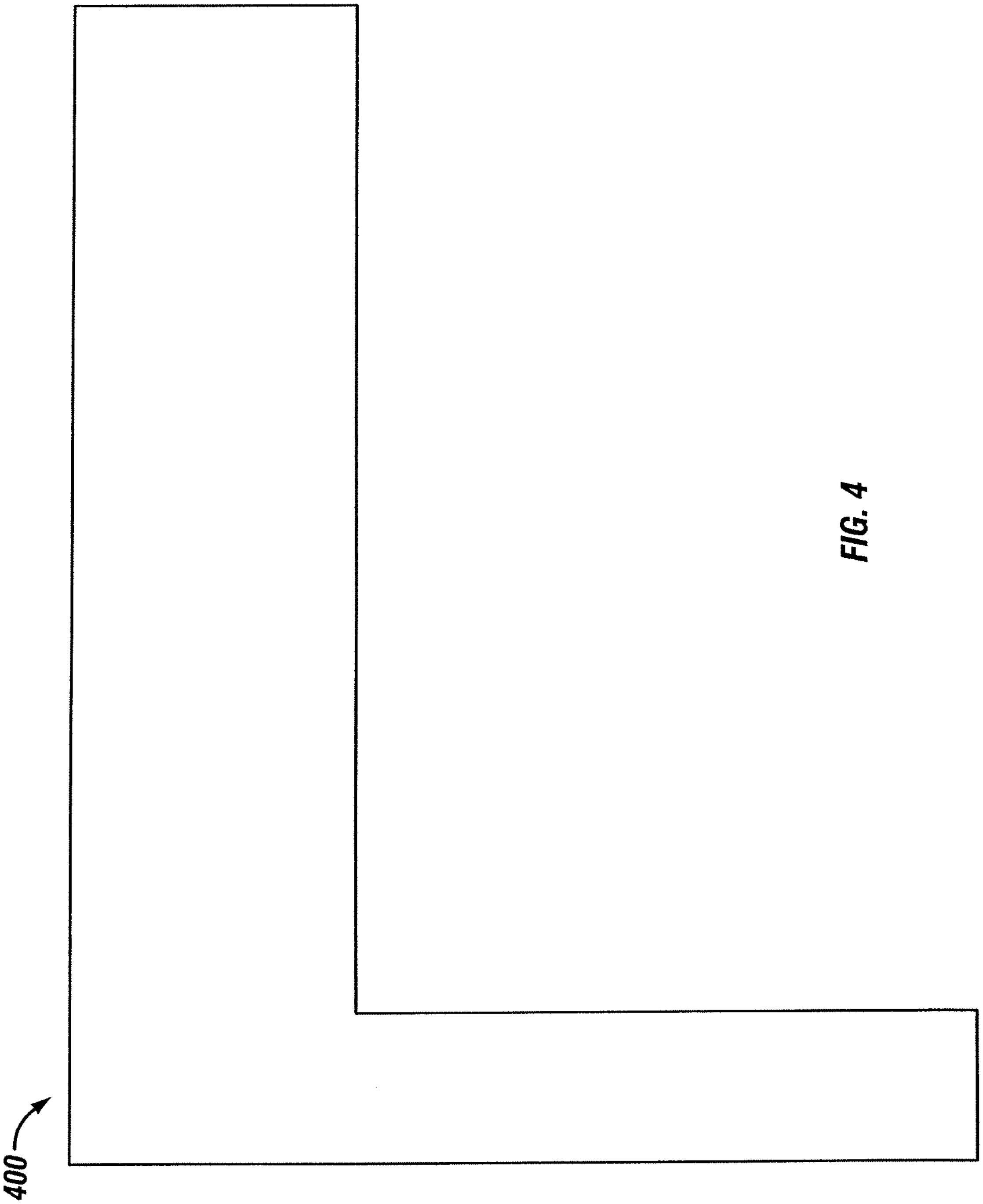
FIG. 4 is a drawing of an 1/0 adapter board in accordance with one embodiment.

Board 306, the I/O adapter board, includes, the functionality described below. Further, to see how board 306 looks in more detail and separated from board 300, FIG. 4 shows an illustration of the I/O adapter board 400 in its unpopulated state. The I/O adapter board shown in FIG. 4 is designed for use with an industry standard CPU board having an ATX type form factor, and for use in a popular IGT® game cabinet, forming thereby a swap-fit replacement for the IGT® processor board that came with the game originally. The I/O adapter and processor board provide significantly enhanced functional capabilities.

The functionality of the I/O adapter board may be grouped into two categories. The first category of functionality is that needed to provide, for each particular preexisting game cabinet, the unique optical or electronic interfaces between the game cabinet's existing apparatus and the new processor board. These interfaces will include both basic electronic or optical interfaces, accounting for differences in everything from voltage levels to power needs to basic signal propagation, up to any needed communications protocol translations or interfaces (depending on each particular game cabinet and CPU board). In additional to supporting the needed base functionality, in one preferred embodiment each I/O adapter board provides additional functionality and support not previously found in the game cabinet. A primary example of this added support would be an Ethernet connection, which may be used to provide supplemental network support to the game machines, or may be used to replace the older serial communications ports found in existing gaming cabinets. Additionally, the new processor board provides increased processing power. In the case of the I/O adapter board for the IGT® game cabinet illustrated in FIG. 4, functionality includes the following.

Power to the processor board is supplied using voltage and power regulators adapted to use the +13V and +25V power supplies in the game cabinet to supply regulated power. Four more communication ports are supplied (in addition to the four supplied by the industry standard processor board) for a total of eight communication ports. One communication port is brought to the front of the processor board or tray where it may be used with an optional touchscreen controller.

A VGA port and a keyboard port are supplied in the I/O adapter board to allow a game independent monitor and input/output device to be hooked up to the game cabinet for development, troubleshooting, and monitoring purposes. For this application, the VGA port is also used to drive the game cabinet's standard video monitor.

An Ethernet connection is provided that may be used in addition to, and eventually in place of, the standard game cabinet's serial port connection to RGCs or other gaming equipment, or the rest of the casino's networked infrastructure. The Ethernet may be used to provide two-level authentication, which further enables age verification and other capabilities as described in co-pending application Ser. No. 09/908,878 entitled "Enhanced Player Authentication Using Biometric Identification," incorporated herein by explicit reference. Further, the Ethernet connection may be used to enable the use of web-based interfaces between machines, both locally and remotely.

The IGT® game cabinet currently under discussion uses a proprietary serial multi-drop RS485-based communications channel for several devices on the same wire. The I/O adapter board has been designed to have only the bill validator connected using this particular RS485 channel. Other devices are connected using other serial connectors built into the I/O adapter board. Since other devices, such as touch-screen controllers, are controlled by other interface means provided by the replacement board, resulting in one device coupled to the original single serial line, there is no need for any type of multi-device communications protocol on the RS485 channel. With only a single device on the channel, any issues surrounding the use of a proprietary serial interface for multiple devices are avoided. The I/O adapter board further provides an interface for the game cabinet's SENET circuitry (a readily available protocol), which interfaces to the display lights, player buttons, and the like.

Further, the I/O adapter board includes NVRAM with power management and a battery backup to save any needed game device state in the event of a power loss.

Additionally, the I/O adapter board may be reconfigured in the future, and replaced as an individual item separately from the processor board, to incorporate any additional functionality that is needed by newer games, new markets, or newer player input/output devices. Examples include but are not limited to better graphics, better sound, interactive web capabilities using a high-speed network connection such as 100 MB Ethernet, multiple game support, audio support for players with limited eyesight capabilities, and newer, more interactive player I/O devices. The same concept holds true of the processor (or CPU) board. The CPU board may be replaced separately from the I/O adapter board. This allows very economical upgrades of the game cabinet to be carried out in those situations where a new CPU board may be all that is needed to support, for example, games requiring a higher performance CPU but nothing else.

Additionally, if the CPU board ever fails, the replacement is significantly less expensive than the older proprietary boards. Not only that, this avoids the problem of finding replacements for aging electronics. Because the two-board processor board set of the disclosed embodiments uses an industry standard form and function, if existing CPUs, busses, and like, become unavailable (which can happen quickly, given that many designs have a total life span of less than two years now) the game may be kept in operation by replacing the CPU board, or both the I/O adapter board and CPU board. This circumvents the problem of finding replacement electronic components of an older board that are no longer being manufactured.

This further addresses the very significant issue of obsolescing OEM boards. In the high tech industry, after a board product has been out a few years, it becomes increasingly likely that at least some, if not most, of the boards components (chips) will gradually become unavailable. When this happens, it sometimes becomes impossible to continue manufacturing the same OEM boards as replacements for failed boards, even if the original game cabinet manufacturer wanted to continue to supply parts (and many do not, after a certain point in time). The OEM is now faced with re-engineering a new replacement CPU board for an older, low-demand game cabinet. That will rarely ever be done. The two-board processor board set addresses this problem by allowing the I/O adapter board to be produced relatively inexpensively, providing continuing life of older game cabinets through the use of standard form-factor CPU boards with the I/O adapter board.

Figure 5:
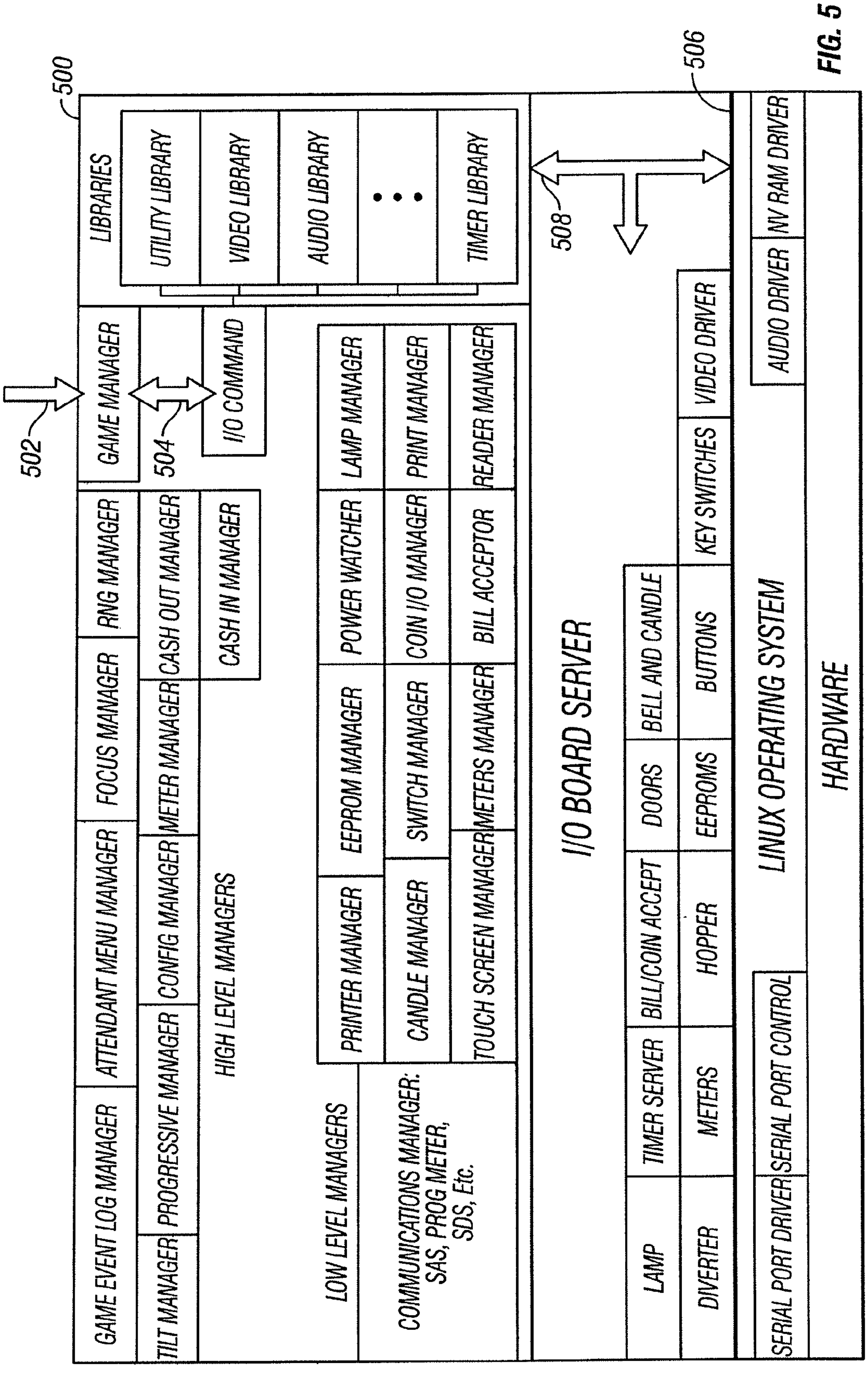
FIG. 5 is a functional block diagram showing a gaming kernel according to one embodiment.

FIG. 5 is a functional block diagram of the gaming kernel 500 of the disclosed embodiments. Game software uses the gaming kernel and two-board processor board set by calling into application programming interface (API) 502, which is part of the game manager.

There are three layers: (1) the two-board processor board set (hardware), (2) the Linux operating system, and (3) the game kernel layer (having the game manager therein). The third layer executes at the user level, and itself contains a major component called the I/O Board Server. Note the unique architecture of the gaming kernel: ordinarily, the software identified as the VO Board Server would be inside the Linux kernel as drivers and controllers. It was decided that as many functions normally found in a UNIX (in this case, Linux) kernel would be brought to the user level as possible. In a multi-user or non-dedicated environment, this would cause performance problems and possibly security problems. It has been discovered that in a gaming machine, those risks are manageable. Performance is maintained due to the control of overall system resource drains in a dedicated environment, coupled with the ability to choose a suitably fast processor as part of the two-board processor board set. Additionally, gaming software is highly regulated so the ordinary security concerns one would find in an open user environment (or where uncontrolled applications may be run) does not exist in gaming machines. Game application software is well behaved, creating a benign environment as far as attacks from installed software are concerned. To properly set the bounds of game application software (making integrity checking easier), all game applications interact with the gaming kernel using a single API in the game manager. This enables game applications to make use of a well-defined, consistent interface as well as making access points to the gaming kernel controlled, where overall access is controlled using separate processes.

The game manager parses the incoming command stream and, when a command dealing with I/O comes in, it is sent to the applicable library routine (the actual mechanisms used are the UNIX or Linux IPC capabilities). The library routine decides what it needs from a device, and sends commands to the YO Board Server (arrow 508). Note that a few specific drivers are still in the UNIX/Linux kernel, shown as those below line 506. These are built-in, primitive, or privileged drivers that were (i) general (ii) kept to a minimum and (iii) were easier to leave than extract. In such cases, the low-level communications is handled within UNIX or Linux and the contents passed to the library routines.

Thus, in a few cases library routines will interact with drivers inside the operating system which is why arrow 508 is shown as having three directions (between library utilities and the VO Board Server, or between library utilities and certain drivers in the operating system). No matter which path is taken, the "smarts" needed to work with each device is coded into modules in the user layer of the diagram. The operating system is kept simple, stripped down, and common across as many platforms as possible. It is the library utilities and user-level drivers that change for each two-board processor board set, as dictated by the game cabinet or game machine in which it will run. Thus, each game cabinet or game machine will have an industry standard processor board connected to a unique, relatively dumb, and as inexpensive as possible I/O adapter board, plus a gaming kernel which will have the game-machine-unique library routines and I/O Board Server components needed to enable game applications to interact with the game machine (game cabinet). Note that these differences will be invisible to the game application software with the exception of certain functional differences (i.e., if a box or cabinet has stereo sound, the game application will be able make use of the API to use the capability over that of a cabinet having traditional monaural sound).

Examples of the "smarts" built into the user-level code of one embodiment are described below. One example is using the I/O library to write data to the gaming machine EEPROM, which is located in the gaming machine cabinet and holds meter storage that must be kept even in the event of power failure. The game manager calls the I/O library function to write data to the EEPROM. The I/O Board Server receives the request and starts a low priority thread within the server to write the data. This thread uses a sequence of 8-bit commands and data writes to the EEPROM device to write the appropriate data in the proper location within the device. Any errors detected will be sent as IPC messages to the game manager. All of this processing is asynchronous.

Another example is the button module within the I/O Board Server, which pools (or is sent) the state of buttons every 2 ms. These inputs are debounced by keeping a history of input samples. Certain sequences of samples are required to detect the button was pressed, in which case the I/O Board Server sends an IPC event to the game manager that a button was pressed or released. For some machines with intelligent distributed I/O which debounces the buttons, the button module may be able to communicate with the remote intelligent button processor to get the button events and relay them to the game manager via IPC messages.

Another example is the use of the I/O library for payout requests from the game application. The I/O Board Server must start the hopper motor, constantly monitor the coin sensing lines of the hopper, debounce them, and send an IPC message to the game manager when each coin is paid.

The I/O library interface has been designed so that the 110 Board Server does not require NOVRAM data storage. All NOVRAM state flow is programmed in the game manager level (using library utilities) so that it is consistent across all platforms. The I/O Board Server also contains intelligence and a lot of state information. The intelligence needed to interface with each device is found in the combination of I/O library routines and the I/O Board Server.

The use of a UNIX-based operating system allows the game developers interfacing to the gaming kernel to use any of a number of standard development tools and environments available for the UNIX or Linux OS. This is a benefit over the prior art in casino game development, which required game developers to use low level, proprietary interfaces for their games. The use of proprietary, low-level interfaces in turn requires significant time and engineering investments for each game upgrade, hardware upgrade, or feature upgrade. The disclosed embodiment is a very significant step in reducing both development costs and enhancement costs as viewed by game developers. In particular, this will enable smaller game developers to reasonably compete with the larger, more established game developers by significantly reducing engineering time using a UNIX or Linux environment. Savings include but are not limited to reduced development time, reduced development costs, and the ability to use the gaming kernel and its two-board processor board set to market a single game for many game cabinets, spanning multiple game machine vendors. This is a remarkable and significant breakthrough for the gaming industry, being an additional breakthrough beyond simply providing a standard Unix-like interface to a game developer.

Some gaming kernel components are next described. The gaming kernel of the disclosed embodiments is also called the Alpha Game Kit kernel or Alpha Game Kit game kernel, abbreviated AGK game kernel or AGK kernel.

The Game Manager provides the interface into the AGK game kernel, providing consistent, predictable, and backwards compatible calling methods, syntax, and capabilities (game application API). This enables the game developer to be free of dealing directly with the hardware, including the freedom to not have to deal with low-level drivers as well as the freedom to not have to program lower-level managers (although lower-level managers may be accessible through the Game Manager's interface if a programmer has the need). In addition the freedom derived from not having to deal with the hardware level drivers and the freedom of having consistent, callable, object oriented interfaces to software managers of those components (drivers), the game manager provides access to a set of upper-level managers also having the advantages of consistent callable, object oriented interfaces, and further providing the types and kinds of base functionality required in all casino-type games. The game manager, providing all the advantages of its consistent and richly functional interface as support by the rest of the AGK kernel, thus provides the game developer with a multitude of advantages.

The Game Manager has several objects within itself, including an Initialization object. The Initialization object performs the initialization of the entire game machine, including other objects, after the game manager has started its internal objects and servers in appropriated order. In order to carry out this function, the Configuration Manager is amongst the first objects to be started; the Configuration manager has data needed to initialize (correctly configure) other objects or servers.

After the game is brought up (initialized) into a known state, the Game Manager checks the configuration and then brings either a game or a menu object. The game or menu object completes the setup required for the application to function, including but not limited to setting up needed callbacks for events that are handled by the event manager, after which control is passed back to the Game Manager. The Game Manager now calls the game application to start running; the game machine is made available for player use.

While the game application is running (during game play, typically), the application continues to make use of the Game Manager. In addition to making function calls to invoke functionality found in the AGK kernel, the application will receive, using the callbacks set up during initialization and configuration, event notification and related data. Callback functionality is suspending if an internal error occurs ("Tilt event") or if a call attendant mode is entered. When this state is cleared, event flow continues.

In a multi-game or menu-driven environment, the event callbacks set by a game application during its initialization are typically cleared between applications. The next application, as part of its initialization sequence, sets any needed callbacks. This would occur, for example, when a player ends one game, invokes a menu (callbacks cleared and reset), then invokes a different game (callbacks cleared and reset).

The Game Event Log Manager provides at least a logging or logger base class, enabling other logging objects to be derived from this base object. The logger (logger object) is a generic logger; that is, it is not aware of the contents of logged messages and events. The Log Manager's job is to log events in NVRAM event log space. The size of the space if fixed, although the size of the logged event is not. When the event space or log space fills up, a preferred embodiment will delete the oldest logged event (each logged event will have a time/date stamp, as well as other needed information such as length), providing space to record the new event. In this embodiment the latest events will be found in NVRAM log space, regardless of their relative importance. Further provided is the capability to read the stored logs for event review.

The Meter Manager manages the various meters embodied in the AGK kernel. This includes the accounting information for the game machine and game play. There are hard meters (counters) and soft meters; the soft meters are stored in NVRAM to prevent loss. Further, a backup copy of the soft meters is stored in EEPROM. In one preferred embodiment, the Meter Manager receives its initialization data for the meters, during startup, from the Configuration (Config) Manager. While running, the Cash In and Cash Out Managers call the Meter Manager's update functions to update the meters, and the Meter Manager will, on occasion, create backup copies of the soft meters by storing the soft meters readings in EEPROM; this is accomplished by calling and using the EEPROM Manager.

The Progressive Manager manages progressive games playable from the game machine. It receives a list of progressive links and options from the Config Manager on startup; the Progressive Manager further registers progressive event codes ("events") and associated callback functions with the Event Manager to enable the proper handling of progressive events during game play, further involving other components such as Communication Manager, perhaps the Meters Manager, and any other associated or needed modules, or upper or lower level managers. This enables the game application to make use of progressives known to the game machine via the network in the casino; the progressives may be local to the casino or may extend beyond the casino (this will be up to the casino and its policies).

The Event Manager object is generic, like the Log Manager. The Event Manager does not have any knowledge of the meaning of events; rather, its purpose is to handle events. The Event Manager is driven by its users; that is, it records events as passed to it by other processes, and then uses its callback lists so that any process known to the Event Manager and having registered a callback event number that matches the event number given to the Event Manager by the event origination process, will be signaled ("called"). Each event contains fields as needed for event management, including as needed and designed, a date/time stamp, length field, an event code, and event contents.

The Focus Manager object correlates which process has control of which focus items. During game play, objects can request a focus event, providing a callback function with the call. This includes the ability to specify lost focus and regained focus events. In one embodiment, the Focus Manager uses a FIFO list when prioritizing which calling process gets their callback functions handled relating to a specific focus item.

The Tilt Manager is an object that receives a list of errors (if any) from the Configuration Manager at initialization, and during play from processes, managers, drivers, and the like, that generate errors. The Tilt Manager watches the overall state of the game, and if a condition or set of conditions occur that warrant it, a tilt message is sent to the game application. The game application then suspends play, resumes play, or otherwise responds to the tilt message as needed.

The Random Number Generator Manager is provided to allow easy programming access to a random number generator (RNG), as a RNG is required in virtually all casino-style (gambling) games. The RNG Manager includes the capability of using multiple seeds by reading RNG seeds from NVRAM; this can be updated/changed as required in those jurisdictions that require periodic seed updates.

The Credit Manager object manages the current state of credits (cash value or cash equivalent) in the game machine. The Cash-In and Cash-Out objects are the only objects that have read privileges into the Credit Manager; all other objects only have read capability into the public fields of the Credit Manager. The Credit Manager keeps the current state of the credits available, including any available winnings, and further provides denomination conversion services.

The Cash-Out Manager has the responsibility of configuring and managing monetary output devices. During initialization the Cash-Out Manager, using data from the Configuration Manager, sets the cash out devices correctly and selects any selectable cash out denominations. During play, a game application may post a cash out event through the Event Manager (the same way all events are handled), and using the callback posted by the Cash-Out Manager, the Cash-Out Manager is informed of the event. The Cash-Out Manager updates the Credit Object, updates its state in NVRAM, and sends an appropriate control message to the device manager that corresponds to the dispensing device. As the device dispenses dispensable media, there will typically be event messages being sent back and forth between the device and the Cash-Out Manager until the dispensing finishes, after which the Cash-Out Manager, having updated the Credit Manager and any other game state (such as some associated with the Meter Manager) that needs to be updated for this set of actions, sends a cash out completion event to the Event Manager and to the game application thereby.

The Cash-In Manager functions similarly to the Cash-Out Manager, only controlling, interfacing with, and taking care of actions associated with cashing in events, cash in devices, and associated meters and crediting.

Further details, including disclosure of the lower level fault handling and/or processing, are included in the provisional from which this utility application receives date precedence, entitled "Form Fitting Upgrade Board Set For Existing Game Cabinets" and having No. 60/313,743, said provisional application being fully incorporated herein by explicit reference.

Various features of the disclosed embodiments will now be described in further detail. In one embodiment, a platform is provided which separates the game media from the operating system (OS) media. The OS media in the platform contains all executable programs and data that drive the core gaming features. This includes but is not limited to hardware control, communications to peripherals, communications to external systems, accounting, money control, and the like. The game media contains all executable game code, paytable data, graphics, sounds and other game specific information to run the particular game application or program. The game program communicates with the OS programs to perform core gaming features as required. This method to facilitate communications between the game media and the OS media will be further described below. The particular communication messages between the OS media and the game media, or game programming interface (GPI), will also be described.

The disclosed embodiment provides a number of benefits. For example, because the game program and all of its game-specific data is stored in a separate media, the media can be updated independently from the OS media. This allows programmers to develop completely new games and respective game media that can be used with old OS media or new OS media. Programmers can also add features to the OS media or fix bugs in the core features by simply releasing a new OS media. As new features are added to the OS media, care can be taken by the programmers to keep the GPI backward compatible with older game media released in the field. This allows the ability for feature growth in the OS without having to maintain or re-release hundreds of game programs already developed, tested, and approved by the regulatory agencies. Based on the disclosure and teachings provided herein, other benefits will be readily apparent to a person skilled in the art.

Inter-Process Communication Method

In order to separate the OS media from the game media, an OS needs to support dynamic loading of the game program. This is typically supported by most full-feature operating systems such as Windows and Linux. In one embodiment, the platform uses the Linux operating system to facilitate the dynamic loading of modules. Based on the disclosure and teachings provided herein, a person skilled in the art will appreciate how to apply various ways and/or methods to achieve dynamic loading of executables.

Executable programs need to communicate with each other. This is required to allow the game applications the ability to request for services from the OS programs and allow the OS programs to notify the game program of events and status changes in the gaming system.

Figure 6:
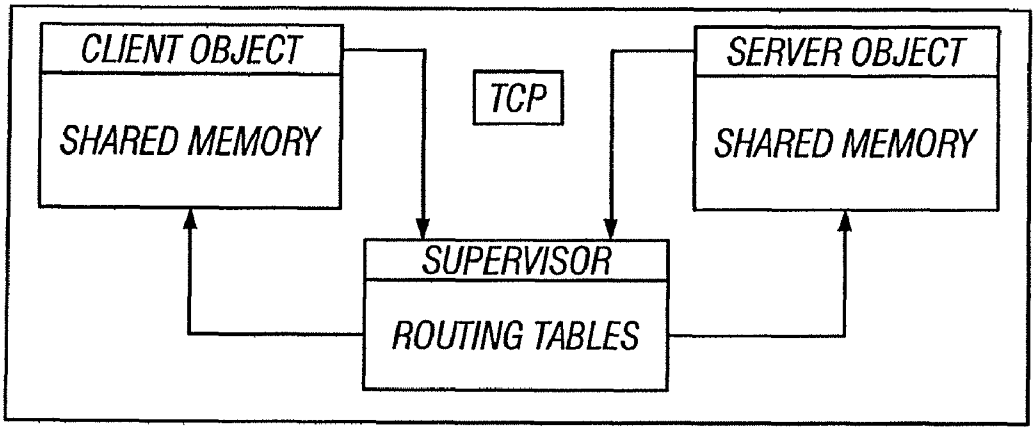
FIG. 6 is a simplified block diagram illustrating a client/server arrangement according to one embodiment.

The platform supports inter-process communication via TCP/IP sockets and shared memory resources. Communication between two processes is broken down into client side communications and server side communications. FIG. 6 is a simplified block diagram illustrating a client/server arrangement according to one embodiment. A client can establish a connection with a server. Once the connection is made, the client and server can send messages back and forth. A single client may contain several simultaneous connections, one connection for each different server with which it is communicating. Servers can support multiple connections with clients, one connection for each client that it is supporting. Servers may also be clients to other servers.

For a client process to establish a communication link with the server, the client first makes a TCP/IP connection with a supervisor process. The supervisor process acts as a telephone operator, allowing servers to register their well known names with the supervisor, and allowing clients to connect with servers by requesting a connection with the supervisor using the server's well known name. The supervisor is a separate process that is started by the OS prior to starting any client/server processes. The supervisor process first establishes a TCP/IP listing socket using a well known port address of 10000. Internally the supervisor process maintains a list of all clients and servers that are running. Initially this list is empty.

When a server process is started by the OS, the server process establishes a connection to the supervisor using the TCP/IP socket's well-known address. The server then sends a message to the supervisor to register the server's name and unique OS process ID (PID) with the supervisor. The supervisor records the server's name and PID in its memory by creating a record. The supervisor then creates a shared memory region for the server process. This shared memory is used by the server process to receive messages from clients that are connected to it and receive responses from any other servers this server is connected to. The supervisor then sends the server a reply on the TCP/IP socket informing the server of the shared memory region key ID. The server then uses the shared memory key ID to "map" in the shared memory for use. The server then waits for messages to be placed in the shared memory. Messages received in the shared memory instruct the server to perform some corresponding actions.

When a client process is started by the OS, the client makes a TCP/IP connection with the supervisor in the same manner as the server above. The client connects to a server by sending a connection request to the supervisor. This connection request contains the name of the server to which the client wishes to connect, as well as the client ID. The supervisor then looks up the name of the server in its internal records. If the name is not found, the supervisor waits for a new server to register with that name, while keeping the client waiting indefinitely. If the name is found or a subsequent server registers with the matching name, then the supervisor facilitates a connection between the client and the server. To establish a connection with the server, the supervisor first creates a shared memory region for the client correlating to its PID. Since clients can have multiple connections to servers, this shared memory region is only created once for the client PID. Subsequent connections to the same server or different servers simply reuse the existing shared memory region for the client. The server then responds to the client using the TCP/IP queue to inform the client of its shared memory key ID and the shared memory key ID of the server. The server then places a client connection message in the shared memory region for the server. This client connection message contains the shared memory key ID and PID of the client that is connecting to the server. The server processes this client connection message by opening the shared memory region of the client for access. The server keeps a list of which client PID's correspond to which shared memory regions it has mapped in.

Once the client is connected to the server, the client and the server can communicate directly by placing messages in the shared memory regions of the respective client and server. The supervisor's responsibility is to provide a facility to make a connection. Once the connection is made, the client and the server can communicate in a very fast manner without using the facilities of the operating system or supervisor. Sending a message is as quick as getting access to the shared memory, and copying the message to the shared memory region.

Clients can send two types of messages to the server, namely, events and requests. An event is a message to the server that does not require any response. After sending an event to the server, the client can continue to run without blocking the process. The server can process the message the next time its process is selected to run by the multitasking OS. Based on process priorities as determined by the OS, this may be immediately or sometime later. This allows the client to queue up several event messages to the server or other servers prior to getting tasks swapped out. Event type messages provide the benefit of minimizing the amount of task swapping that needs to occur between clients and servers.

The request style messages are similar to events except that the client is blocked from running until the server processes the message and sends a response to the client. In some situations, it is important to know that the server received the request and processed it before the client proceeds to the next action. When receiving a request message, the server can process the action requested by the client and send the client a reply with the results of the action performed. The server is not blocked by sending the reply to the client. Based on the process priorities, the OS may allow the server to continue to run, or a task swap to the client process will allow the client to process the reply. This allows the server to process requests from several clients without the need for unnecessary task swapping for each reply, thus improving overall system performance. In other cases, the server may simply note the requested action, immediately reply to the client that the request was received, and then process the action at a later time. It is up to the server to make this determination based on the nature of the action to be performed. The nature of a request message necessitates that a client can only have one request to a server in process at any one time. However, servers can simultaneously be processing multiple requests from clients, one request for each client.

Similarly, servers can send two types of messages, namely, replies and events. Replies are sent in response to client requests as described above. Servers can send events to clients. Similar to a client sending an event to a server, the server sends an event to the client by placing a message in the client's shared memory region. The server is not blocked by sending events to the client. The client process will process the event message the next time it is allowed to run. By the nature of these two messages that can be sent by the server, the server should not be blocked waiting for the client to process messages. This method avoids a deadlock situation where the client is waiting on the server, and the server is waiting on the client. This necessitates a hierarchy of clients of servers in which the servers are possibly clients to other servers, and the like.

The other responsibility of the supervisor process is to detect disconnections in the TCP/IP connections from clients and servers. When a client or server program is terminated by the operating system, the supervisor detects the closure of the TCP/IP socket connection to the supervisor. The supervisor then places disconnect messages in the shared memory regions of the other processes that were connected to the terminating process. This allows servers to detect when a client terminates so that resources allocated by the server on behalf of the client can be released and freed.

In one implementation, the predominant form of inter-process communication used by the platform is carried out through two C++ class libraries. An application (client) may request that work be performed by other programs (server). These two libraries may be used by the same application where there is a requirement for a server to also be a client of another server.

The purpose of these client/server libraries is to encapsulate and simplify inter-process communications and provide standardized ways to transmit data between programs. These encapsulated methods provide (1) an easily expanded, augmented communication scheme, (2) supervised connections and (3) high throughput.

The library objects use a combination of TCP and shared memory communication with a supervisor program to handle routing and server naming, supervision of paths, creation and destruction of system resources. Supervision and routing are done via the supervisor, which uses TCP to communicate shared memory access information to both clients and servers. Shared memory is used for data flow to/from clients and servers.

During client or server object creation, a TCP path is established to the supervisor. Any program exit or abort is detected via this TCP connection and the supervisor will dispatch a message to any connected clients or servers, notifying them of the change.

In one implementation, the shared memory interface includes a System V SHM which has the same key as the process ID of the process requesting the client or server object, a System V semaphore, also with the same key as the originators process ID. In each shared memory is a structure that contains the management data for the inter-process communication, such as head, tail, size of FIFO, and the like.

Client Libraries

When a client object requests a connection to a server via TCP to the supervisor, the client object provides a name for the server it wishes to use, and in return it is then provided routing data via a return TCP message. This allows the object to attach to the shared memory allocated for it by the supervisor and also to the shared memory belonging to the server. It may then post messages to the server using methods provided by the library. Special supervisory messages are also posted via the shared memory to the server, to notify the server of connected or disconnected client objects. Both client and server objects receive information in a return TCP message on where to look for their data and routing information and on how to dispatch incoming shared memory messages.

Server Libraries

When a server object registers its name with the supervisor via the TCP connection, the server object receives routing data via a return TCP message and attaches to its shared memory block. The server object then receives special "connection" messages that precede any request from a client informing the server of the return routing information for a new client.

Message Dispatch

When either a client or server object creates a message for the other, the class library functions attach routing and size information to the message. This allows the receiving functions in the library to "dispatch" the message to appropriate call back functions. Each client or server object has one default message handling function. It may be overridden via inclusion in other objects, or a function is provided to "attach" functions to various messages.

Both clients and servers call a special "Idle( )" function which does two things. First, it checks to see if there are any messages posted for this process; if so, it decodes the routing information, rebuilds the original packet sent, and calls the appropriate dispatch function. It then returns from the Idle (call, allowing the process to perform any deferred work it may need to do. Second, it puts the process to sleep on a semaphore waiting for messages to be available.

Common Structures

Both the client and server objects work with the Msg class structure. The programmer creates messages, which inherit this structure, and then adds what is required for the specific application. One illustrative Msg class structure is as follows:

// This class defines the basic format of client/server messages.

```
typedefstructMsg
{
uint32 cmd;          // Message command.
uint32 length;       // Total length of the message including
                     // this header information and any other data.
            // We usually add dynamic space here for the packet
            // so you can't really do CltSrvMsg msg++
            // instead you must do (int8 *)msg=((int8 *)msg)+msg.length
char data[0];
};
```

The above is the basis for all messages sent from either a client to a server or from a server to a client. The cmd portion is used to determine the "dispatch" functions appropriate for the message or if no specific function is defined the default one.

Client Functions

There are several functions provide in the client library, besides the standard creator and destructor methods. The three most common are:

virtual unsigned long Send (const Msg & msg,bool block=true);

virtual unsigned long Request (const Msg & request, Msg & reply, bool block=true);

virtual void AddMsgHandler (MsgHandler handler, uint32 cmd, uint32 mask=Oxffffffff);

The Send function posts a message to the server attached to the client object and requires no response. The Request function posts the request message to the server and waits for the reply message in return. The AddMsgHandler assigns the function "handler" to the message which matches the (Msg.cmd&mask=cmd&mask). When a call back message from the server matches this condition, the attached function will be called with the parameter of (Msg &msg).

Server Functions

The server also has functions provided in the library, in addition to the standard creator and destructor methods. There are three main functions:

virtual unsigned long Send(Client client, const Msg &msg, bool block=false);

virtual unsigned long Reply(Client client, const Msg &msg,bool block=false); virtual void AddMsgHandler(MsgHandler handler, uint32 cmd, uint32 mask=Oxffffffff);

The Send function posts a message to the client specified in the function call. This is used to perform a call back operation normally requested by the client. Examples are event posting, timers, operation completion, and asynchronous responses. The Reply function is used to return a response to a Request from a client, which the client will be waiting for. The AddMsgHandler assigns the function "handler" to the message which matches the (Msg.cmd&mask=cmd&mask). When a message is received from either a client Send or Request, which matches this condition, it will be called with the parameters of (Client client, Msg &msg).

A number of flowcharts illustrating client/server functions are further provided below. Each shared memory is managed by a QueArea structure. An illustrative QueArea structure is as follows:

```
typedef struct QueArea {
        int sem__id;
        unsigned short size, head, tail;
        bool overflowed;
```

-continued

```
        unsigned char response[ResBufSize];
                unsigned char events[0];
        };
```

The QueArea structure is protected from two or more programs accessing the structure simultaneously, thereby preventing corruption of management data. To this end, the structure contains a sem_id variable, which identifies a System v semaphore array, which has four indexes. Each index has a specific purpose: (1) used as a mutex to define ownership of the entire QueArea structure, (2) used to indicate the number of messages in the events fifo, (3) used to block a client until a response is received from a server, and (4) used to manage blocking until free space is available to add new messages. The semaphores are accessed using predefined semaphore operations including:

Shm::GetArea={0,−1,0};
Shm::FreeArea={O, 1,0};
Shm::PutMsg={1, 1,0};
Shm::WaitMsg={1,−1,0};
25 Shm::ChkMsg={1,−1,IPC_NOWAIT};
Shm::PutRsp={2, 1,0};
Shm::WaitRsp={2,−1,0};
30 Shm::FreeAreaPutMsg[2]={{0,1,0},{1,1,0}};
Shm::NeedSpace={3,1,0};
Shm::FreeAreaNeedSpace[2]={{0,1,0},{3,1,0}};
Shm::WaitSpace={3,0,0};

The size, head, tail and overflow variables are used to manage the event fifo.

The dedicated response buffer is reserved for a server to respond to a client's Request operation. Since a client can only do one Request at a time, only one response buffer is required. Having a separate, dedicated response buffer, insures that the server will always have room available to return the response without worrying about the space available in the fifo area.

Each server or client has a shared memory with its associated QueArea management structure. These structures are used in pairs, one for the client and one for the attached server. There are four operations which can pass through the client/server pair including: (1) client to server Send, (2) server to client Send, (3) client to server Request and (4) server to client Reply.

Figure 7:
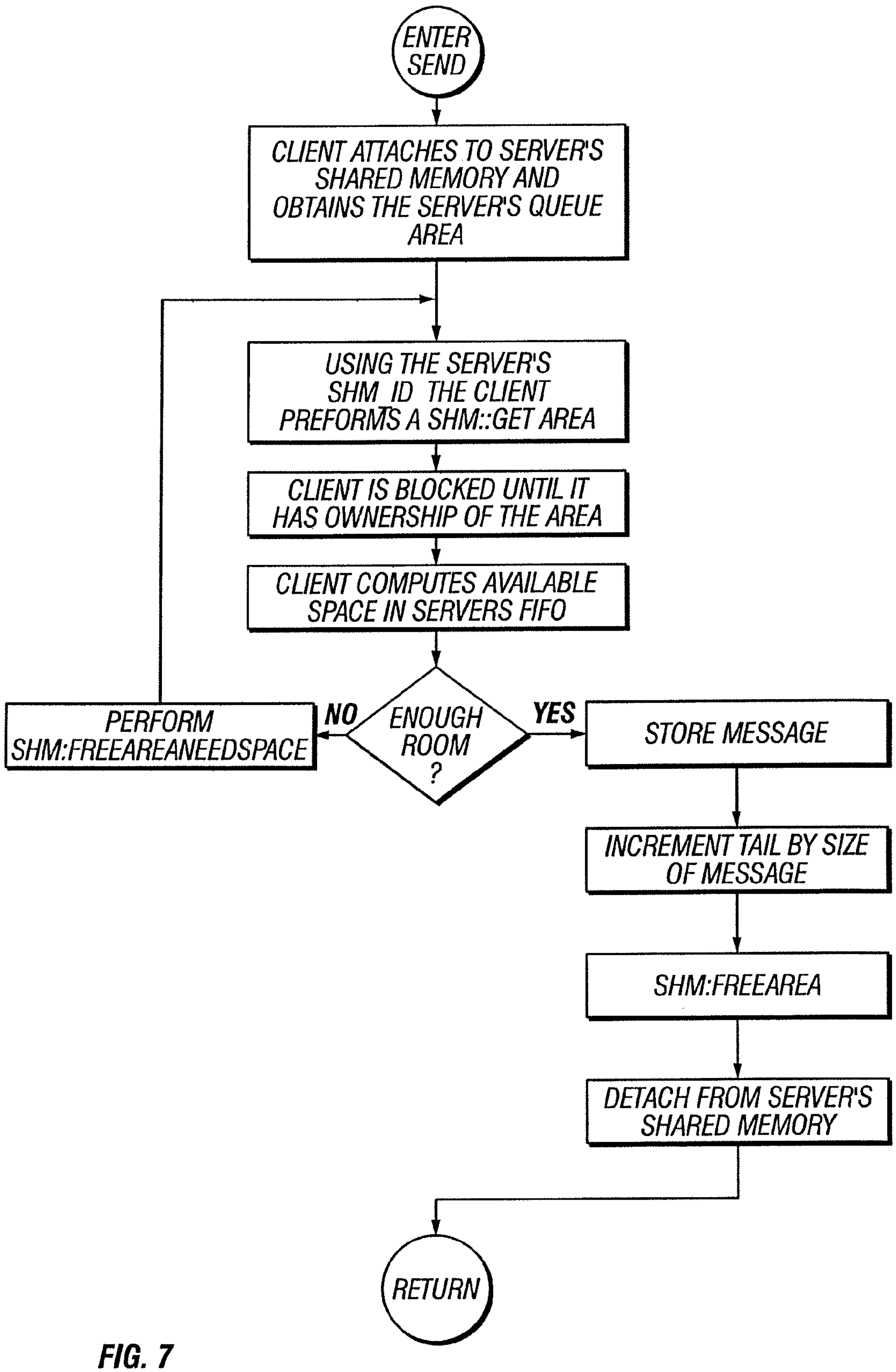
FIG. 7 is a flowchart illustrating the situation where a client is running and needs to send a message to a server using Send( )
Figure 8:
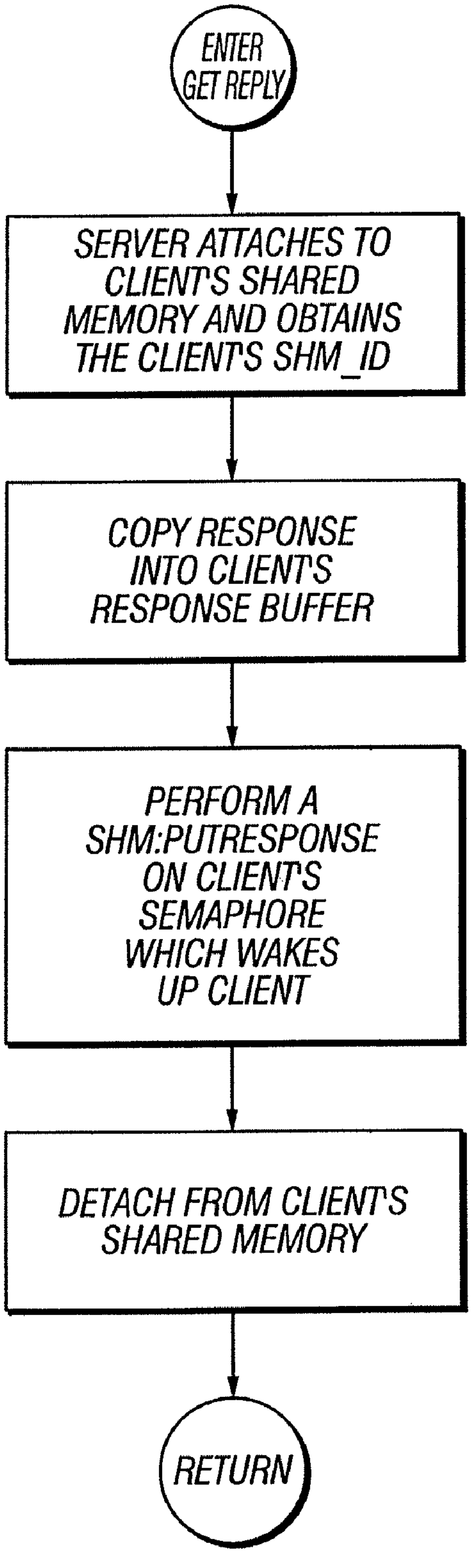
FIG. 8 is a flowchart illustrating the situation where a client needs to request data from a server.
Figure 9:
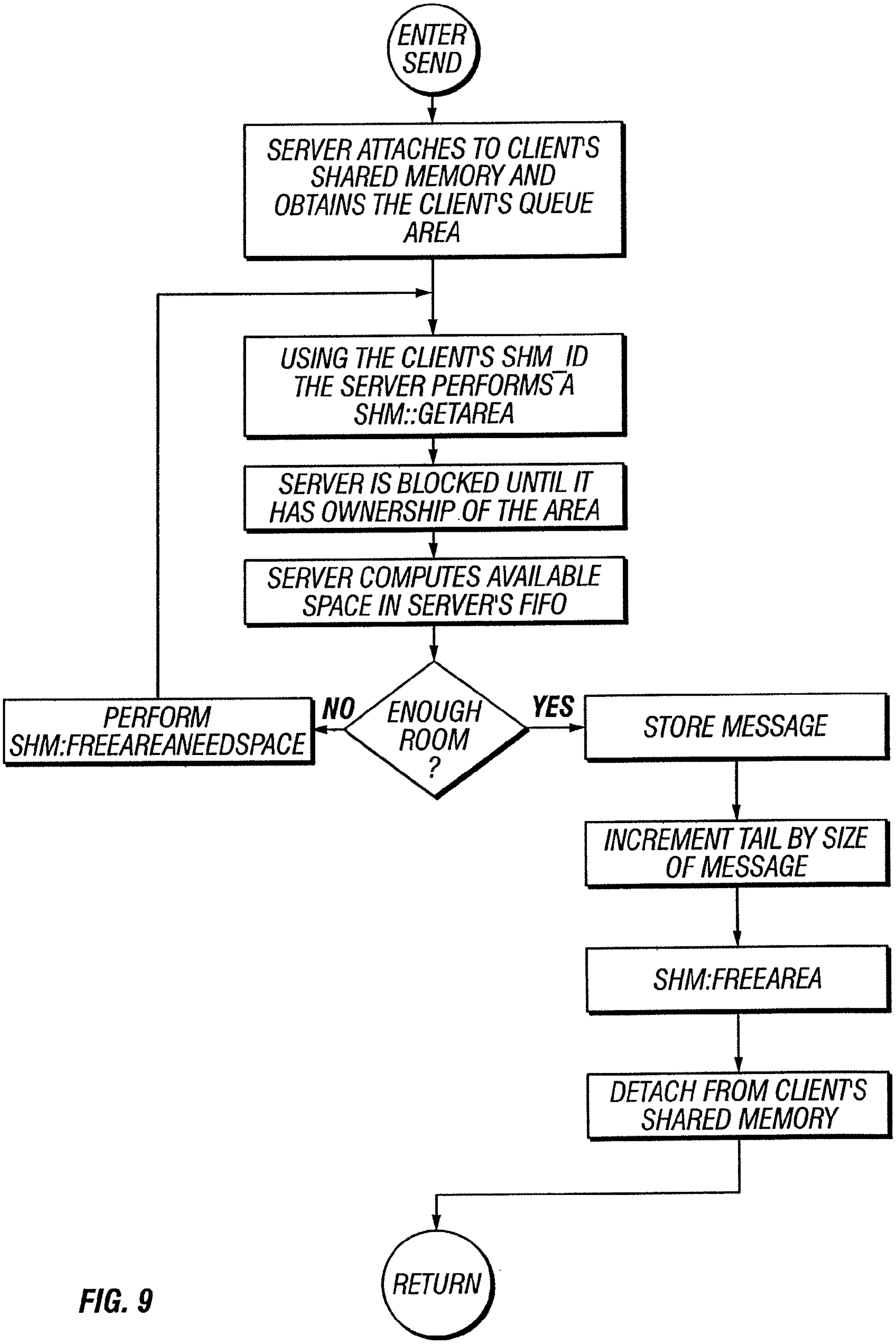
FIG. 9 is a flowchart illustrating the situation where the server performs a Send( ) to the client.
Figure 10:
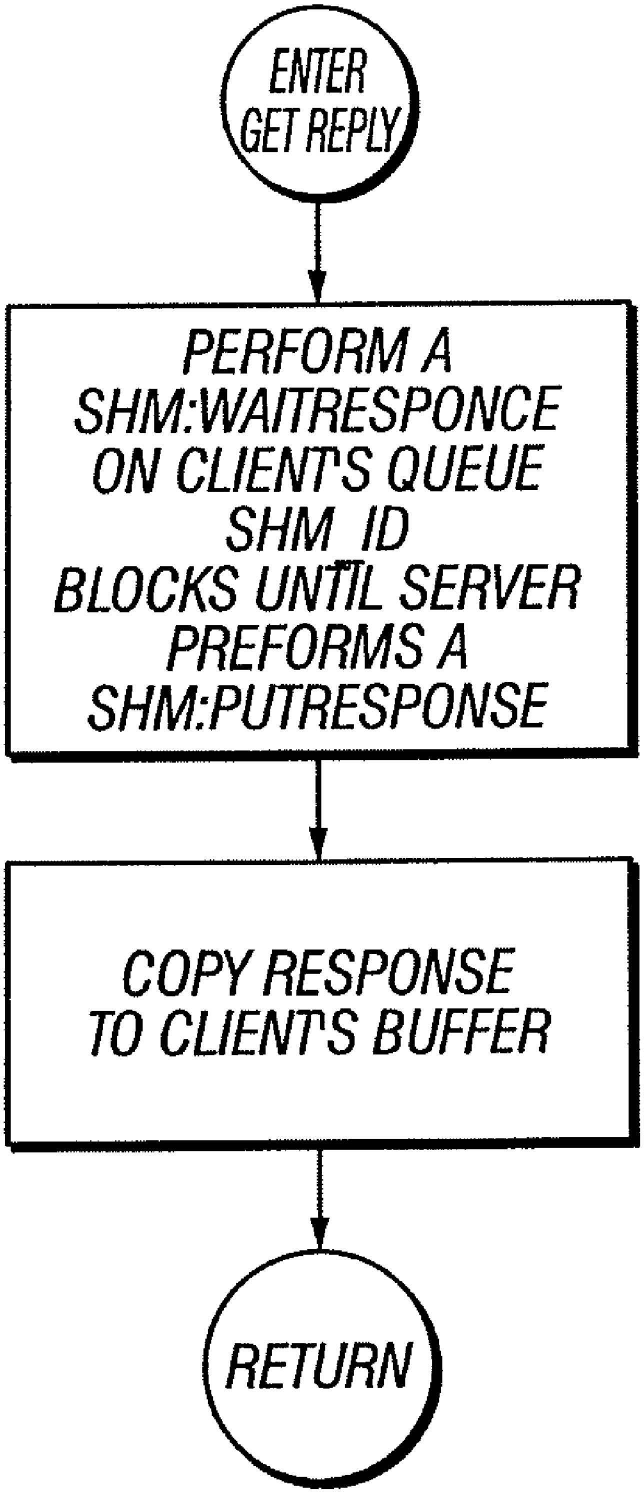
FIG. 10 is a flowchart illustrating the situation where a server sends a reply to a client who has performed a Request( ) function.
Figure 11:
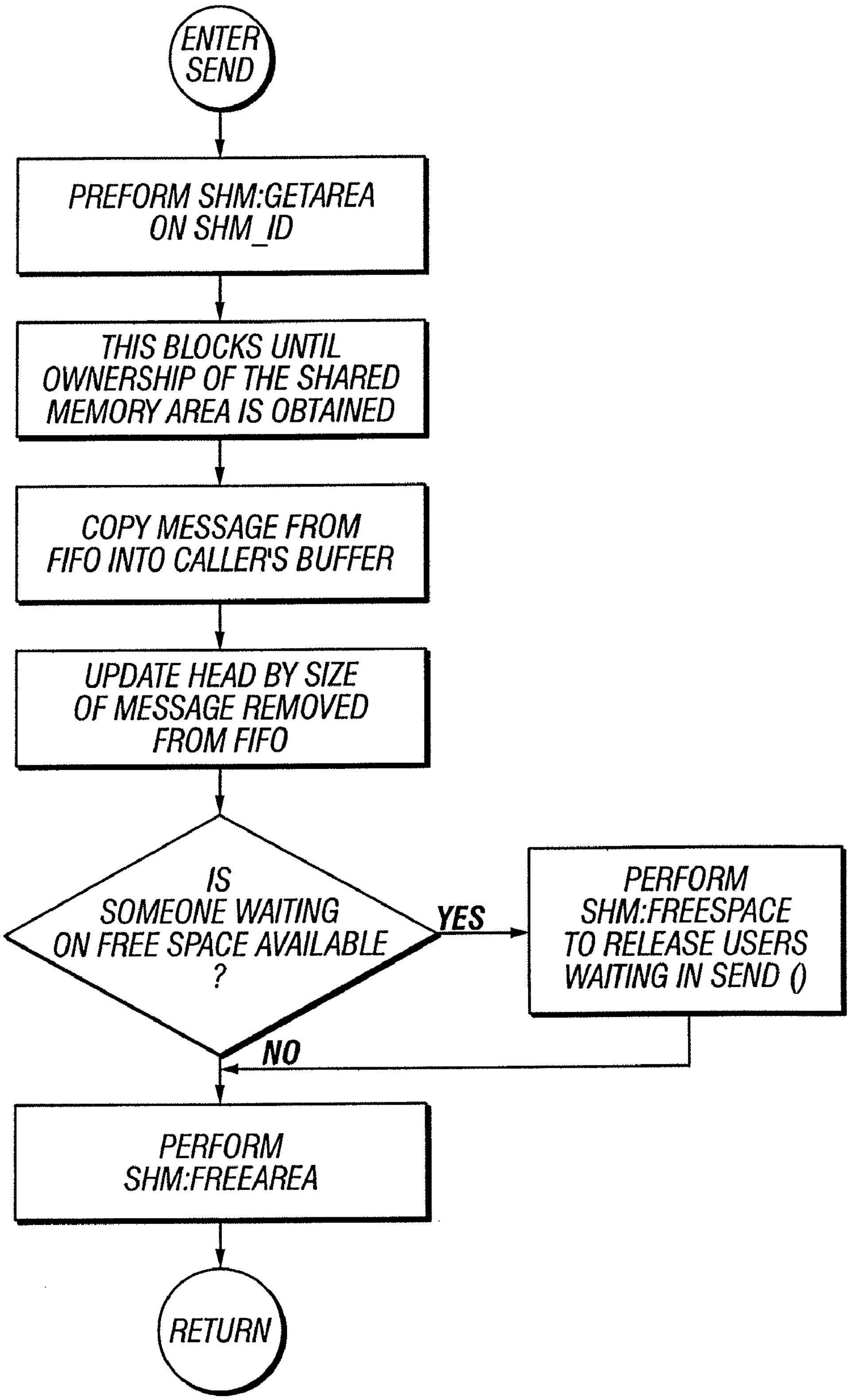
FIG. 11 is a flowchart illustrating the situation where Read is used by both the client and the server to remove Send( ) messages from the fifo.

Normally clients and servers are in a function Idlet) which blocks the second index of the sem_id with a Shm::WaitMsg service. At this point, the process is using no CPU 10 time and will not run until some external event caused the shm id index 2 to be incremented with a Shm::PutMsg service, or until an external signal is sent to the process. In the first case, Idlet) calls the embedded Readt) function which will remove the message from the fifo. Idlet) then dispatches the received message to the appropriate message handler and returns a true to the caller. In the second case, there is no message to dispatch, therefore, Idlef) returns a false to the caller. With the foregoing foundation, four illustrative operations are shown as a sequence of steps to perform each message function. FIG. 7 illustrates the situation where the client is running and needs to send a message to a server using Sendt). FIG. 8 illustrates the situation where the client needs to request data from the server. This function can be thought of as performing two steps: the first is the Sendr) as shown in FIG. 7 followed by a Getkeplyt) function. FIG. 9 illustrates the situation where the server performs a Sendt) to the client. This is similar to FIG. 7 with a change in direction from the server to the client. FIG. 10 illustrates the situation where a server sends a reply to a client who has performed a Requestt) function. FIG. 11 illustrates the situation where Read is used by both the client and the server to remove Sendt) messages from the fifo.

Game Manager Interface

The following further describes the Game Manager Interface used in the platform. The Game Manager Interface is used by the game application to perform the game machine functions on the platform. In this manner, the game application is not concerned with any game machine functions and is game machine independent. This independence allows a game application to run on various platforms with various device configurations without modification.

Initialization

When the game application starts, it creates an interface to the game manager and initializes that interface using the following functions:

CGameMgr * CreateGameMgrinterface( )

int32 Init( )

In a multi-game environment, the game application may be in an idle mode, because it is not currently selected for play. When the game is selected for play, it will be placed in the game mode.

The game manager is able to inform the game application when these modes change. Therefore, the game application defines a callback function of the following form:

void HandleGameAppCommand(uint32 command)

The game application registers for the game command callback from the game manager, using the following function:

int32 RegisterGameAppCommandHandler(HandleGameAppCommand, currentCommand, gameId)

When the game manager receives this register, it immediately calls the HandleGameAppCommand sending the command of idle or game. The game application can then continue its initialization depending on which mode it is in. The game application can register for other callbacks from the game manager, and can proceed with graphics and sound initialization.

The game application can determine if the game machine is suspended due to a tilt with the following function:

bool GetSuspendState( )

To allow for multiple denomination and tokenization, the game machine denomination is stored in cents.

The game application can determine the current denomination of the game machine with the following function:

uint32 GetDenomination( )

To support multiple denomination and tokenization, the game machine credits are stored as a double. Each credit has the value of the game machine denomination and can include fractional values.

The game application can determine the current credits on the game machine with the following function:

double GetCredits( )

The game application may call these functions during initialization, because it may load different graphics and sounds, depending on the current values and status.

When the game application is in the game mode, it will want to be notified, by the game manager, if the game machine is suspended due to a tilt. The game application will also want a notification if the machine is resumed. Therefore, the game application defines callback functions of the following form:

void HandleSuspendGame( )

void HandleResumeGame( )

If the game application is in the game mode, it registers for the suspend and resume callbacks from the game manager, using the following functions:

int32 RegisterSuspendedHandler(HandleSuspendGame)

int32 RegisterResumedHandler(HandleResumeGame)

When the game application is in the game mode, it will handle player cash out requests. It will send the cash out request to the game manager. When the cash out is started, the game manager will notify the game application. Then, when the cash out is completed, the game manager will notify the game application of the completion. Therefore, the game application defines callback functions of the following form:

void HandleCashOutStarted( )

void HandleCashOutComplete( )

If the game application is in the game mode, it registers for the cash out callbacks from the game manager, using the following functions:

int32 Regis terCashOutStartedHandler(HandleCashOutStarted)

int32 RegisterCashOutCompleteHandler(HandleCashOutComplete)

When the game application is in the game mode, it will generate win pays. It will send the pay win request to the game manager. When the win pay is completed, the game manager will notify the game application. Therefore, the game application defines a callback function of the following form:

void HandlePayComplete( )

If the game application is in the game mode, it registers for the pay complete callback from the game manager, using the following function:

int32 RegisterPayCompleteHandler(HandlePayComplete)

When the game application is in the game mode, it will want credit and paid updates from the game manager. Therefore, the game application defines a callback function of the following form:

void HandlePayComplete( )

If the game application is in the game mode, it registers for the UpdateDisplay callback from the game manager, using the following function:

int32 RegisterUpdateDisplayHandler(HandleUpdateDisplay)

When the game application is in the game mode, it will want credit and paid updates from the game manager. Therefore, the game application defines a callback function of the following form:

void HandleUpdateDisplay(intl6 displayType,
char * displayText,
double displayValue)

If the game application is in the game mode, it registers for the UpdateDisplay callback from the game manager, using the following function:

int32 RegisterUpdateDisplayHandler(HandleUpdateDisplay)

The game application displays a game history record when requested by the game manager. Therefore, the game application defines callback functions in the following form:

void HandleDisplayHistory(HistoryData *historyData,
float areaLeft,
float areaTop,
float areaRight,
float areaBottom,
int zOrder)

void HandleExitHistoryDisplay( )

The game application registers for the history display callbacks from the game manager, using the following functions:

int32 RegisterDisplayHistoryHandler(HandleDisplayHistory)

t32 RegisterExitHistoryDisplayHandler(HandleExitHistoryDisplay)

The game application displays a pay table test when requested by the game manager. Therefore, the game application defines callback functions of the following form:

void HandleDisplayPayTableTest(float areaLeft,
float areaTop,
float areaRight,
float areaBottom,
int zOrder)

void HandleExitPayTableTestDisplay( )

The game application registers for the pay table test display callbacks from the game manager, using the following functions:

int32 RegisterDisplayPayTableTestHandler(HandleDisplayPayTableTest)

int32 RegisterExitPayTableTestDisplayHandler(HandleExitPayTableTestDisplay)

The game application displays the game statistics when requested by the game manager. Therefore, the game application defines callback functions of the following form:

void HandleDisplayGameStats(float areaLeft,
float areaTop,
float areaRight,
float areaBottom,
int zOrder)

void HandleExitGameStatsDisplay( )

The game application registers for the game statistics display callbacks from the game manager, using the following functions:

int32 RegisterDisplayGameStatsHandler(HandleDisplayGameStats)

int32 RegisterExitGameStatsHandler(HandleExitGameStatsDisplay)

When the game application is fully initialized, it notifies the game manager with the following function:

int32 GameReady( )

When the game manager receives the game ready, it calls the HandleUpdateDisplay twice. The first call sends the total credit display, and the second call sends the total paid display.

Game Play

The main game manager functions are related to game play. A game must enable wagering, set a wager, commit a wager, start a game, optionally pay a win, post a history record, and end a game.

The game application calls the following functions to perform game play:

int32 EnableWagering( )

int32 SetWager(double credits)

int32 CommitWager( )

int32 DisableWagering( )

int32 StartGame( )

int32 PayWin(double credits)

As shown above, the Pay Win is optional. If there was no win, the game application can continue with the PostHistory and EndGame. If there is a win, the game application calls PayWin, and the game manager will call the HandleUpdateDisplay callbacks as needed. When the win pay is complete, the game manager will call the HandlePayComplete callback.

int32 PostHistory(HistoryData * historyData)

int32 EndGame( )

The game application can call the following function to get random numbers:

int32 GetRandom(int32 *randArray,
int32 numberRequested,
int32 min,
int32 max,
bool exclusive=false
int32 *excludeArray=NULL,
int32 numberExcluded=( )

Cash Out

When the game application is in the game mode it will handle player cash out requests. It will send the cash out request to the game manager using the following function:

int32 CashOut( )

When the cash out is started, the game manager will call the HandleCashOutStarted callback. As the cash out proceeds, the game manager will call the HandleUpdateDisplay callback.

When the cash out is completed, the game manager will call the HandleCashOutComplete callback.

The game application will acknowledge the cash out complete using the following function:

int32 CashOutVerified( )

Display History

The game application displays a game history record when requested by the game manager. The game application is expected to display the game history when the game mode is idle or game. The game application will only be requested to display history records for the pay table IDs that it supports.

The game manager is responsible for storing and reading the game history records. When the history display is activated, the game manager will read the appropriate history record, display the generic history data, check the pay table ID, and call the supporting game application HandleDisplayHistory callback.

The game application displays the graphics associated with that history record and notifies the game manager with the following function:

int32 DisplayHistoryComplete( )

The game manager handles the next and previous operator selections and notifies the game application to clear the current history record with the HandleExitHistoryDisplay callback. The game application clears its display and notifies the game manager with the following function:

int32 HistoryExitComplete( )

Display Pay Table Test

The game application displays the pay table test when requested by the game manager. The game application is expected to display the pay table test when the game mode is idle or game. The game application will only be requested to display the pay table test for the pay table IDs that it supports. When the pay table test is activated, the game manager will call the DisplayPayTableTest callback.

The game application displays the pay table test associated with that pay table ID and notifies the game manager with the following function:

int32 DisplayPayTableTestComplete( )

At this point, the game application continues to accept the operator input and evaluate pay table results. However, the game manager is responsible for handling the operator selection to exit the test. When this happens, the game manager calls the HandleExitPayTableTestDisplay callback. The game application clears its display and notifies the game manager with the following function:

int32 payTableTestExitComplete( )

Display Statistics

The game application displays the game statistics when requested by the game manager. The game application is expected to display the game statistics when the game mode is statistics or game. The game application will only be requested to display game statistics for the pay table IDs that it supports.

The game application is responsible for storing and reading the game statistics records. When the statistics display is activated, the game manager calls the supporting game application HandleDisplayGameStats callback.

The game application displays the statistics and notifies the game manager with the following function:

int32 DisplayGameStatsCompleteO

The game manager handles the next and previous operator selections and notifies the game application to clear the current statistics with the HandleExitGameStatsDisplay callback. The game application clears its statistics and notifies the game manager with the following function:

int32 GameStatsExitComplete( )

Object Oriented Method

In one implementation, the platform is designed and implemented using object-oriented techniques. The game manager interface is generic and can handle various styles of games. Each different game will use the same game manager interface. Due to this design, a game base class is implemented. The game base class is contained in game.cpp and game.h. The game base class Init function creates the game manager interface, initializes that interface, and registers for the callbacks. Each callback calls a game object member function.

A game application (such as slot or poker) can be derived from the game base class. This derived game object can override the base class member functions, which are being called by the callbacks. In this manner, the game programmer can take advantage of the game manager interface code that exists in the game base class.

To continue with this method, a specific game can be derived from the game type object (such as slot or poker). Again, this specific game object can override the game type object member functions. This method allows the game programmer to concentrate on programming the graphics and sounds for the new specific game and not redevelop the code required to interface with the game manager.

Figure 12:
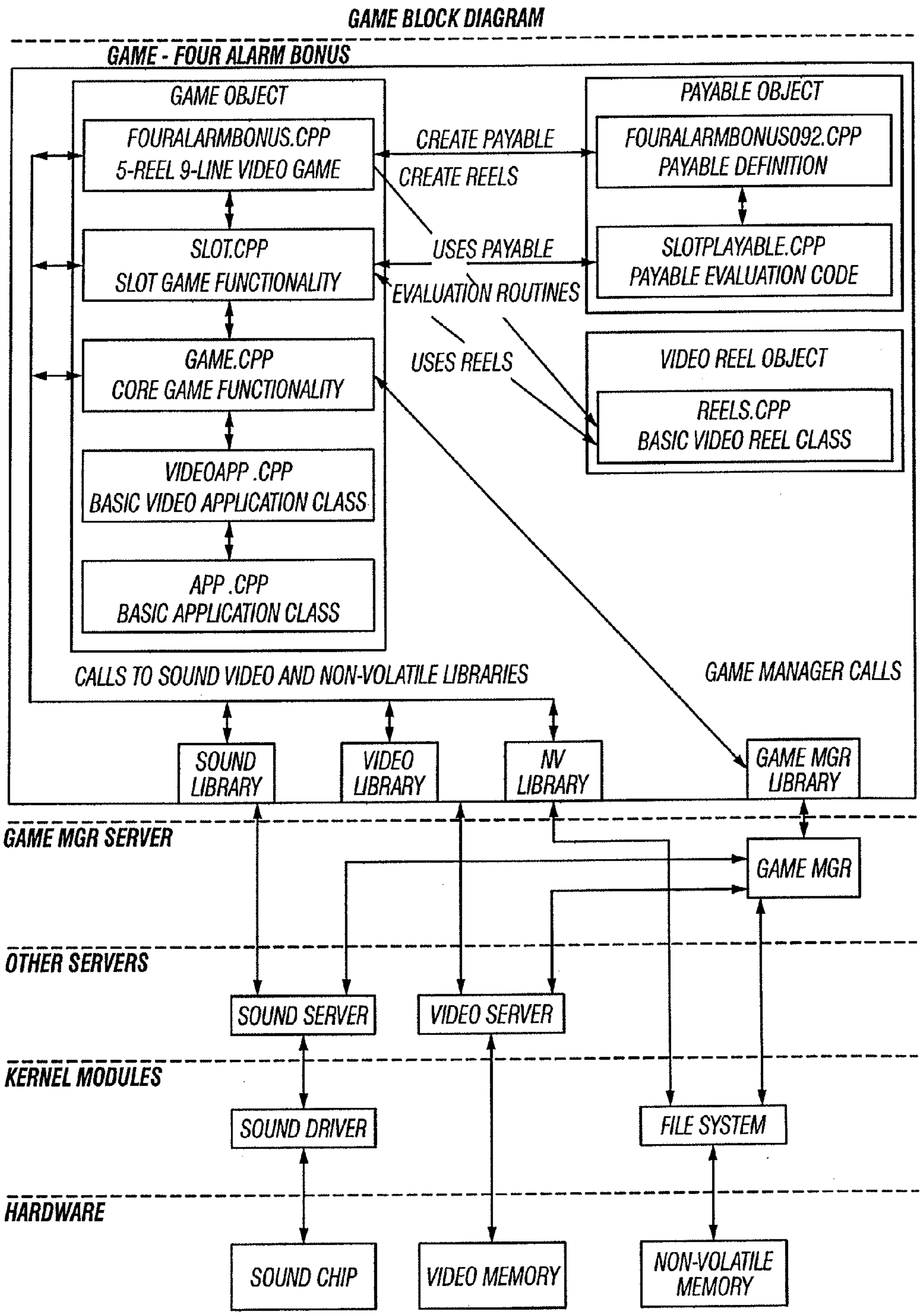
FIG. 12 is a simplified block diagram illustrating an embodiment of the platform architecture.

FIG. 12 is a simplified block diagram illustrating an embodiment of the platform architecture. FIG. 12 shows five (5) layers. The top layer is the FourAlarmBonus game application. This application is responsible for the game play functionality. The GameMgr is a separate application which manages the basic functionality for gaming machines, hopper pays, tilts, communications, accounting, diagnostics, and the like. The Sound and Video Servers provide multimedia capability to both the game and GameMgr applications. Both the game and GameMgr use the Non-volatile library (NV Library) to store critical data and state information using the Linux file system.

Interprocess Communication

FIG. 12 shows several independent executable applications, FourAlarmBonus, GameMgr, Sound Server, and Video Server. Each application is a separate executable program which uses inter-process communication messages to communicate with the other programs. All inter-process communications are implemented with message queues using shared memory. Each process waits in an "Idle" loop for a message to arrive. Arriving messages, sometimes called events, drive every aspect of the running application's functionality. To facilitate inter-process communications, each server interface is implemented with a library with which the application links. For example, FourAlarmBonus uses the Sound library to send inter-process messages to the Sound Server, while the underlying architecture is still messages, the libraries help hide the complexities of message composition from the application programmer.

Sound Server

The sound server is responsible for accepting client (e.g., FourAlarmBonus) requests to load and play sounds. The sound files supported are wave files. The sound server is responsible for overlapping all simultaneous sounds being played by multiple clients. It uses a special algorithm to combine the wave files into a single sound stream that is sent to the Linux Sound Driver for forwarding to the hardware.

Video Server

The video server is responsible for accepting all client requests to load graphic files and fonts. It is also responsible for sending button presses to the application and controlling lamp flashing for the buttons. Each graphic file loaded is in the form of a sprite. Sprites can be positioned anywhere on the screen and they have z-orders which allow sprites to overlap each other. When the video server Idle loop has no more inter-process communication requests to service, it updates the screen by redrawing all of the sprites in the correct order.

GameMgr

The GameMgr is a large program comprised of many internal modules. It is responsible for controlling the core gaming functionality, such as, functionality associated with a slot machine. This includes supporting tilts, accounting meters, hopper payouts, coin acceptor processing, attendant menus, event logging, and basic game flow. The game manager does not know very much about the type of game it is supporting. It only knows about basic game states such as (1) Idle—the game is in an Idle state where no bets have been made and it is waiting for player input; (2) Bet—a bet has been wagered by the game; (3) Play—the game is currently in the game play state; and (4) Payout—the game is awarding a win of a particular amount of credits.

The GameMgr accepts requests by the game to perform certain actions such as initiating a wager, paying out a particular win amount, and saving the games history data. Through these calls, the GameMgr obtains enough information to keep accounting and history critical data. The GameMgr sends events to the game, for example, when the credits are incremented after money has been inserted into the machine. It also updates the game when credits are being cashed out. When a tilt occurs, the GameMgr sends a suspended event to the game to tell it to suspend until the tilt is cleared.

FourAlarmBonus

The FourAlarmBonus module is a game application that is made up of several modules. It uses the Sound Library, Video Library, NV Library, and GameMgr Library to communicate to the other applications and Linux services.

App Class

The application class is a simple base class that supports the inter-process communication architecture upon which the system is dependent. It calls the Idle function in a loop to receive messages from other systems which drive the game operation. The App class can be told to exit, where it will exit the next time Idle is called. The App class supports suspending where calls to Idle will not return to the game until the application is unsuspended.

VideoApp Class

The VideoApp class inherits the App class and extends its functionality by adding support for input events sent by the Video Server. Events such as button pressed, touch down, drag, and touch up are received by the VideoApp class and placed in an Input queue. The input queue can then be processed when InputIdle is called by the game.

Game Class

The Game class is one of the larger modules in the game. It inherits the VideoApp class and extends its functionality by providing support for GameMgr library calls, GameMgr event processing, basic game state flow, and critical data storage. The Game class starts by calling functions to initialize data, create the screen, and return to the previous game state. The Game class basic states reflect the same basic states discussed for the GameMgr. The most important state is the Play state. The Game class does not know the specifics ways game are played (except for the basic states). Therefore, the Play state is further defined by the Slot class that inherits the Game class. As object-oriented programming goes, the Game class provides many useful functions for the Slot class to call. These functions can be overridden by the Slot class to redefine functionality. For example, the StatePlay function is overridden by the Slot class to define the basic substates for a slot game. When the StatePlay function is called by the Game class to play the game, the Slot class StatePlay function is actually called. Many functions within the Game class operate similarly.

Slot Class

The Slot class inherits the Game class and further redefines functionality of the Game class that is specific to slot video games. The Slot class adds support for slot game play substates such as the follows:

| | |
|---|---|
| StateDrawStops | Where the random reel stops are drawn. |
| StateSpin | Where the reels are spun to the stop positions. |
| StateEvaluate | Where the result of the game is evaluated. |
| StateDisplayResults | Where the results are displayed to the player. |
| StateBonus | Where a second screen bonus game is played. |

Other basic game states are overridden to provide additional support for slot features when the following states are called by the game class.

| | |
|---|---|
| StateInit | Initializes data specific to the slot game. |
| StateIdle | Animates the previous games results while waiting for input. |
| StateBet | Provides support for betting on paylines, and bet per payline. |
| StatePlay | Provides support for the slot play states described above. |
| StateEnd | Send the game results and slot specific history data to GameMgr. |

FOURALARMBONUS

The FourAlarmBonus class inherits the Slot class and adds in functionality that is specific to the FourAlarmBonus game. The slot class is fairly limited in knowledge about the particular type of video slot game. The slot class is designed to be limited in knowledge so that the FourAlarmBonus class can use the basic slot states but may add FourAlarmBonus specific functionality. The FourAlarmBonus class is responsible for defining all graphic content for a FourAlarmBonus game. It uses the Reels class to create the video reels specific to the 5-reel, 9-line FourAlarmBonus game. It creates the player "panel" display which contains all of the buttons the player can use to select the bet, paylines, bet one, bet max, cashout, spin, bet 9, bet 18, bet 27, bet 36, and bet 45 buttons. It also overrides the Slot class function StateBonus to further redefine how the second screen bonus game should be played. The FourAlarmBonus class is also responsible for creating the paytable used by the Slot class for playing the game and evaluating wins.

Paytable Class

The Paytable class is a base class for supporting all slot paytables. It contains the basic structures and evaluation routines for supporting the paytables. The slot class is used by the 4AlarmBonusO92.cpp file to create the slot paytable object. To create a paytable object, the calling function defines symbols, number of reels, number of paylines, reel positions paylines overlap, payline winning combinations, winning combination amounts, and scattered winning combinations and amounts. The Paytable class is very generic in that new evaluation routines can be added to the paytable object without rewriting the Paytable class.

4AlarmBonus092.cpp

This file uses the Paytable class to create the FourAlarmBonus paytable object. This file defines the symbols, pictures for the symbols, paylines, winning combinations, wining amounts, and the like. The paytable defined is a 92% payback paytable.

I/O System

The I/O system of a disclosed embodiment will now be described. The I/O system is designed with maximum flexibility in mind. This allows easy conversion of the platform to different cabinets and/or unique sets of I/O devices without major changes. The platform I/O architecture has been designed to be modular, flexible, extensible and configurable. This unique blend of attributes allows the platform to reach its maximum potential across a multitude of hardware systems.

The I/O system basically includes an I/O shell, a number of subsystems and associated configuration files. This system communicates to the rest of the platform via a generic application programming interface (API). One implementation uses inter-process communications as described above. The following is one implementation of the platform I/O system.

API—the complete generic interface to the I/O system is made via individual interfaces to the appropriate I/O subsystems.

I/O shell—the I/O shell is used to initiate the I/O system. One such implementation is to start all of the subsystems and to sequence periodic "checks" of the subsystems requiring regular processing. A master timer who calls a timer handler can achieve this. Within the timer handler, the "check" routines of the necessary subsystems are called. Individual timers and sequencing can also be done within each of the subsystems, via the check routine, using counters.

Hardware PO subsystem—the primary interface to individual bits in the input and output ports. This subsystem also contains functionality to initialize hardware, read input/output configuration and do the actual hardware port read (input) and writes (output).

I/O configuration subsystem—the I/O configuration subsystem is responsible for creating, reading and writing configuration data to and from NVRAM for operator selectable I/O components. Such components include deck button layout, coin acceptor inputs and types, and hopper inputs/outputs and types. Each selectable device has an associated configuration file similar to those of the inputs and outputs subsystems. The configuration file for each device is created to indicate which input/output port, bit, and polarity is being used by that device. Each configuration file may also contain the device type, the name of the device and any other properties needed by the device's driver. Once a specific device is selected by the operator, the information in that device's inputs (if any) are inserted into the input map and similarly, any outputs used by the device. The data associated with that particular model of a specific type of device (coin acceptor, for example) is then saved to NVRAM. The data saved to NVRAM will automatically be used upon the next startup.

Simple discrete inputs subsystem—the inputs subsystem periodically reads all inputs specified in the inputs configuration file. This subsystem performs de-bounce on all inputs based on a pre-determined value for each type of input. This data is read from the inputs configuration file at startup. While the configuration file is read, a list is created in memory that contains the input's polarity, image offset, bit number, input name, diagnostic and de-bounce type. A field is also included indicating whether this input index is used or not. The inputs include such items as button switches, door switches, key switches, power status, coin acceptor and hopper input data signals, and the like.

Input configuration file subsystem—this file contains information need to know the properties of all inputs that are to be monitored. Each record contains fields for 1) port, bit and polarity, 2) input name, 3) de-bounce type and 4) diagnostic status. The port field is a symbolic string similar to −18:1 where the "dash" ("−") represents reverse polarity or active low (no—equals active high). The value 18 in the aforementioned string represents the offset into the internal image of the I/O port map. The colon (:) separates the port specifier and bit which is the last field in the string. The string "n/a" represents an input that is not currently being used.

Simple discrete outputs subsystem—the outputs subsystem performs the write operation, when requested by the application, to any of the output bits specified in the outputs configuration file. Items that may be controlled by the outputs subsystem include such devices as button lamps, tower or candle lams, coin acceptor inhibit (lockout), hopper motor, jackpot bell, and the like. This subsystem is also used internally to control circuitry not under the control of the main application.

Outputs configuration file—this file is functionally equivalent to inputs configuration file except for the field definitions. Only two fields are used: 1) port, bit and polarity and 2) the field name.

Hardware information subsystem—the following describes unique personality board management. The I/O module is designed to sense/obtain pertinent hardware information such as manufacturer, platform, printed circuit assembly and programmable hardware revision. This gives the OS the ability to identify different flavors of personality boards and load/run appropriate subsystems, flavors of subsystems and/or configurations of I/O subsystems.

Serial ID subsystem—the serial ID subsystem reads a chip that contains a unique identification number. This value is then stored in redundant locations to prevent surreptitious use of previously saved information. The serial ID is used in conjunction with the EEPROM and NVRAM to determine if credit data was created by the identical hardware that resides in the cabinet when the ID chip is read at startup. If the ID chip that is read at startup is not the same as the one stored at initialization, a fault may be generated and the application suspended.

EEPROM subsystem—the EEPROM subsystem is responsible for reading from and writing to an Electrically Erasable Read-Only Memory device that keeps track of meter information, denomination, credit and payout limits and other essential data that must be retained between power cycles. The EEPROM is one of the redundant non-volatile storage mediums used.

Jurisdictional EEPOM subsystem—the jurisdiction EEPROM subsystem reads from an Electrically Erasable Read-Only Memory device that is pre-programmed with information specific to each jurisdiction. This information controls certain operational characteristics of the application based on the rules of the jurisdiction in which it is installed.

Hopper subsystem—this subsystem controls the operation of the hopper. The hopper is the payout device that dispenses coins when the player presses the collect button. When a collect is requested, the hopper driver will record the signal on-time and off-time of the pulse width of the coin out signal for up to eight (8) coins to qualify a valid coin out signal cycle. Once this cycle is determined, each subsequent coin out cycle is measured against the qualified cycle time. An error is generated if any of the on or off times are not within this period.

A configuration file is associated with the hopper subsystem to provide information about several different device types. Each model of hopper has a section in the configuration file defining the following: device type, device name, up to four (4) inputs and up to four (4) outputs. The hopper configuration file is used by the I/O configuration subsystem to update hopper input/output entries into their respective memory maps upon power-up. This file is also used by the I/O configuration subsystem to save the appropriate data after the operator selects the desired device.

Coin acceptor subsystem—the coin acceptor subsystem monitors the coin acceptor device to account for each coin that is inserted into the machine. Each device has its own operational characteristic, and this driver is modified to accommodate each new coin acceptor that will be used on the system. Two different approaches have been implemented. One includes a coin acceptor that generates only one output signaling the detection of a valid coin acceptance. This requires external sensors to determine if the coin that has been accepted was inserted properly or if the coin was inserted maliciously while trying to cheat the machine. The other approach uses internal optical sensors built into the coin acceptor itself. These "intelligent" devices provide at least one additional output to signal that a valid coin has been accepted. The latter method requires much less discrimination to determine cheating since the logic in the coin acceptor device can sense incorrect usage.

A configuration file is associated with the coin acceptor subsystem to provide information about several different device types. Each model of coin acceptor has a section in the configuration file defining the following: device type, device name, uses external optics: yes or no, and up to six (6) input definitions.

The coin acceptor configuration file is used by the I/O configuration subsystem to update coin acceptor input entries in the input map upon power up. This file is also used by the I/O configuration subsystem to save the appropriate data after the operator selects the desired device.

Hardware (Electromechanical) meters subsystem—this I/O subsystem is responsible for incrementing the electromechanical meters. It can be configured for many different cycle times without major driver modification. These are typically pulse width modulation devices and do not have any input as to whether the increment operation was successful or not. This driver does detect if a meter or meter cluster has been disconnected, however, and the driver generates an error condition in this condition.

The I/O portion of the platform has been designed to be modular, that is, separate from the rest of the OS. This modular design allows the platform to become fully hardware independent. By making the platform hardware independent, much value is added by being able to run the OS on a multitude of different hardware systems with minimal effort. During startup, before the programs start running, the startup logic does some preliminary reads of the circuitry to determine what gross type of circuitry is present. It uses this information to choose which configuration files (or parts thereof) are to be used.

Through the use of the generic API of the I/O module, the platform achieves hardware independence. All devices are handled as logical devices at this level, i.e., it is the job of the I/O system to do what is necessary to involve the physical hardware. An example generic hopper interface is as follows:

Send: Pay(numcoins), PauseO, ResumeO, ResetO, SetErrorCode( )

Request: GetErrors( )

Callbacks: CoinPendingO, CoinPaidO, ErrorChange(errorCode, flag)

Making the I/O system configurable allows the platform to operate within various combinations of elements, including electrical (logical to physical configuration), component/device selection, regulation required and operator preferences.

An example implementation demonstrating logical to physical translation via configuration follows:

| | | | |
|---|---|---|---|
| LampMgr | API | libiolbld/outputs/outputs.cpp | |
| Outputs | -> | Set(outputID) | //outputID can be standard output enum // or an arbitrary configured output |
| | | HandleMsg:switch(cmdSet) | // Io/bld/outputs/Outputs.cpp |
| | | hioPutOutput(ID, true) | // Sets output to logical true viacfg data |

There are many possibilities of I/O conceptual designs that maintain modularity. There may be circumstances in which one is favored over another. This is all part of the I/O system planning.

One option is to swap out the entire module with another one. This is achievable by creating other I/O modules for other hardware systems using the generic API. Another method is to replace subsystem drivers with ones of compatible functionality. This can include drivers that have been enhanced in some way.

Another option is to replace subsystem drivers with ones of compatible hardware drivers. As an example, the EEPROM subsystem may be replaced with one for a different EEPROM device. Again, by using a generic API, this is possible. Another option is to create a common generic 110 module optionally with hardware specific shared objects swapped in and out as necessary, per the configuration subsystem.

The I/O system CPU usage can be balanced by changing timing-related definitions in the I/O system header files or, as an option, to modify the I/O system to make the master timer run-time configurable. This would be useful to support the common generic I/O module. For example, by doubling the I/O master timer (described above), the "check" routines are called at half the rate.

The generic API can be expanded to support other I/O devices as required. The expansion can be in the form of additional I/O subsystems. It may be beneficial to do this with planned backward compatibility as part of this expansion.

Jurisdictional Configuration Chip

The platform is targeted for multiple jurisdictions. Each of these Jurisdictions has a different set of requirements for gaming machines. Gaining vendors have taken different approaches to handling the differences between jurisdictions but overall they tend to have firmware targeted for a particular one.

The OS supports different configurations under each jurisdiction. The design allows this support without the need for multiple versions of the OS targeted for each jurisdiction. The platform implements a separation of OS and jurisdictional configurations via a single hardware chip. This chip contains the required configurations for a particular jurisdiction including data that identifies that particular jurisdiction.

The OS reads the information on the configuration chip through an I/O interface. Based on the data retrieved by the OS, individual modules within the OS can then be configured to comply with that jurisdiction's restrictions.

An example of a jurisdictional configuration would be whether hoppers are allowed in that jurisdiction. A bit in the configuration chip is reserved for setting this option to allowed/not allowed (true/false). If the bit is set to "on" in a jurisdiction configuration, the hopper feature is allowed. This does not mean that the manufacturer has actually implemented a hopper but simply that the jurisdiction allows the use of one. Similar bits are used for ticket printers, bill validators, and coin acceptors.

This separation of the OS and the jurisdictional configuration allows the OS manufacturer to concentrate on one common code base that can be used under all targeted jurisdictions.

Access to the jurisdiction chip is provided through an I/O server interface. The game OS is shielded from the workings of this server so that a generic interface is provided.

Software Authentication

According to one aspect of the disclosed embodiments, a number of methods are used at boot time and run time to authenticate the BIOS ROM, boot media, and those components which are loaded into system DRAM. To guard against anyone changing one or more of the components while servicing or otherwise accessing the game, the various removable parts are tied together by the use of one and only one cipher. The sequence of starting up the game can be taken into account and all areas validated before they are used. To guard against someone changing components while the machine is operating, the authentication is done continuously, every few seconds. If a discrepancy is found, the game is shut down, preventing any monetary disbursements.

The overall design of the system validation may be summarized as follows. First, a suitable validation checksum method is chosen (SHA1) to create a hash code. However, it should be understood that any repeatable hash validation system could be used, such as MD5/CRC32/and the like. This hash code is then used to validate the various critical areas of the system before and during their use including, for example, (1) bios ROM, (2) pre-partition boot media area, (3) partitions on the boot and game media, (4) all removable/replaceable media, (5) individual files placed on the media, and (6) configuration EEPROMs. Second, to increase security and to tie the various parts together into an integrated whole, the validation hash is encrypted with a private/public key with only one copy of the public key, stored in bios ROM, available. All validation routines use this single key to perform their validation. Now all parts of the "game" software are both validated and the validations are secure. Additionally, all parts of the game are matched to the other parts, via a single DSS signature key.

Figure 13:
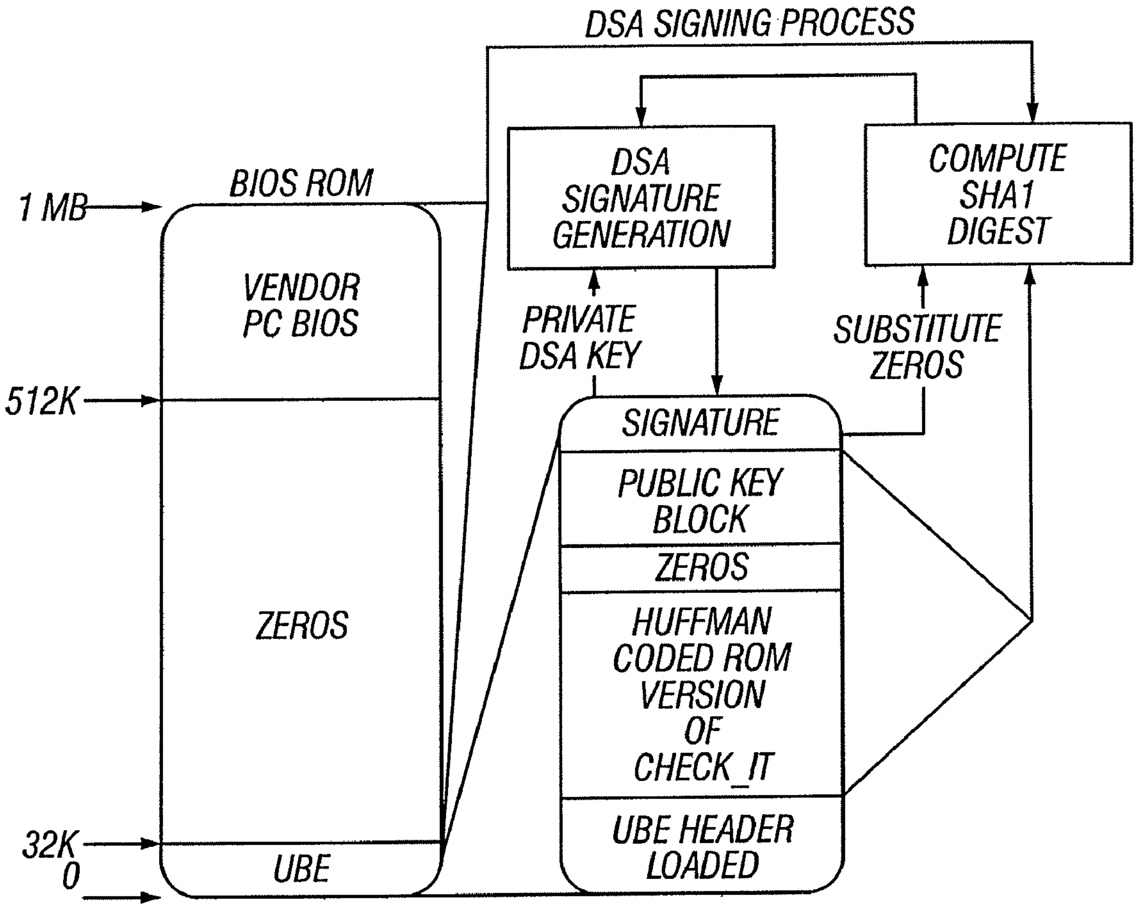
FIG. 13 is a simplified block diagram illustrating an embodiment of a BIOS ROM.

In one implementation, the BIOS ROM for the platform is an 1 MB device, which in its most basic form contains two entirely independent sections, as shown in FIG. 13. The top half of the ROM is occupied by the unmodified system BIOS image provided by the 30 vendor of the particular PC compatible single board computer being used. The bottom of the ROM is occupied by a standalone validation utility which self-validates the entire ROM image, the pre-partition area of the boot media and the Linux partitions which are booted.

This bottom section, currently 32 KB in size, is detailed on the right side of FIG. 13. It includes a User BIOS Extension (UBE) header with a loader, which can expand the Huffman compressed validation code, which follows. At the very end of the 32K section is the DSS signature for the entire 1 MB ROM. Immediately prior to the signature is a data structure containing the DSA public key that is used for all boot and run time DSS signature validation operations. In addition to the public key itself, this data structure contains the required related constants.

A second UBE is located in the top section of the 512 KB half of the BIOS EPROM reserved for user BIOS extensions. This UBE is called early in the boot process, and its purpose is to check for the presence of a PCI device that is installed in the PCI slot connector. If such a device is detected, the boot process is halted.

The makerom and biosprom utilities that construct the 1 MB ROM image set all unused areas of the image to zero.

Figure 14:
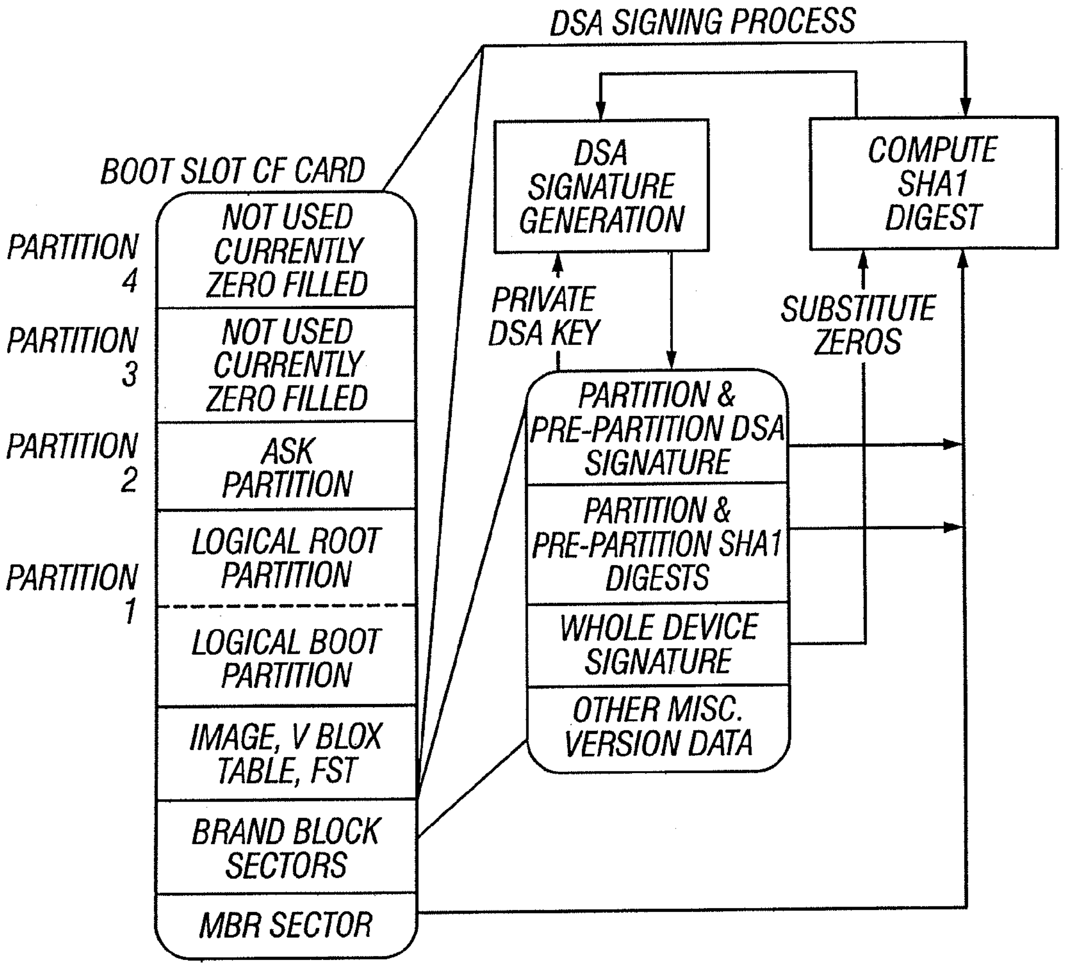
FIG. 14 is a simplified block diagram illustrating an embodiment of boot media.

The boot media that occupies the boot card slot in the platform is shown in FIG. 14.

A boot or game media image is created by using the nvrblk driver and conventional Linux disk partitioning tools just as though it were a hard disk. As with any partitioned hard disk, there may be from one to four primary partitions, any one of which may be an extended partition containing any number of logical partitions.

In one convention, the first partition is used as an extended partition containing two logical partitions, one being the Linux boot partition and the other being mounted at run time as the root file system. The second primary partition is mounted at run time as a file system containing the platform software. The third and fourth possible partitions are not used.

The boot media differs from conventional hard disk layout in that the start of the first partition is displacing one or more cylinders into the device so as to leave room for digital signatures, an optional compressed splash image, and a file signature table.

The automated procedure that creates a boot media image begins by clearing the entire image to zeros, so that when the image is complete any unused areas are zero-valued. After partitioning and formatting the file systems and copying all files to their appropriate partitions, the mksigtable utility is used to install the file signature table; an optional splash image is installed with the standard Linux dd command; and the digital signatures area is mapped by a utility called pp setup.

Startup system validation is performed in three steps. First, the BIOS is validated as part of the system initialization. The BIOS has a digest performed over the content of the entire BIOS ROM image. Then the digest is converted to a DSS signature using the public key stored in the bios ROM chip. The DSS signature is compared to the signature stored when the ROM bias image was created.

Second, the BIOS validates the boot media. The BIOS reads in the MBR, pre-partition area, and partition 1 area. Digests are performed on the pre-partition and partition 1 areas. The digests are converted to a DSS signature using the public key stored in the bios area. The DSS signatures are compared to the signatures on the boot media.

Third, all parts of the boot media that are needed to start the Linux system are now validated and the system is booted. As part of the system boot up sequence, two copies of a validate program are started. Two copies are used to speed up the validation process. The first copy validates all of the boot media including the game OS area and the empty, unused area of the media. The second copy validates the game media. After the system is booted and the game OS and game areas are validated, the system start up sequence starts the game OS which includes multiple copies of the validation program to verify system validity in the background.

Background system validation is also performed. When the storage media is created, a list of all valid files is created with a DSS signature for each file. These are stored in the file manifest table that is part of the pre-partition area. When files are opened, the Linux kernel performs a digest with conversion to DSS. The DSS is validated against the DSS in the file manifest table.

When programs are loaded into memory a SHA-1 is computed on the read only areas of the program code. As part of the system background processing, a process validates the SHA-1 values computed when the program was loaded and insures that code and read only memory remains un-modified and that no new areas are added without the initial being computed by the "legal" code load block.

The startup system validation start sequence starts a series of programs that test and insure that the ROM BIOS, configuration PROM, and storage media remain loaded and valid.

PCI Device Detection

Boot time detection of a PCI device installed in the PCI slot connector is performed by the UBE located in the top 32 KB bank of the 512 KB section of the BIOS EPROM reserved for user BIOS extensions. This UBE is called early in the boot process. It is called after DRAM is initialized but before the video controller is initialized. If a PCI device is detected, the boot process is halted. The purpose of this test is to prevent the use of a PCI device to compromise the gaming device.

Boot Time Authentication

Boot time authentication is performed by the UBE at the bottom of the BIOS ROM. Following standard practice from the dawn of the IBM PC era, the UBE header contains a two byte signature value, 0x55, OxAA, which the system BIOS recognizes as a flag indicating that a BIOS extension is present. The system BIOS calls a stub procedure in the UBE header, and that procedure inserts a loader procedure in the header onto a list (called the "INT19 chain") of procedures to be called by the system BIOS after it completes conventional PC initialization. The stub procedure then returns control to the system BIOS.

After completing system initialization, the system BIOS causes all of the procedures on the INT19 chain to be sequentially called, one of which will be, in its proper turn, the UBE loader. Up to this point, everything that has happened is per industry standard PC architectural practice.

The UBE loader decompresses the Huffman coded validation program from the UBE section of the ROM. The decompressed program is placed at absolute address 0x90000 and jumped to.

Figure 15:
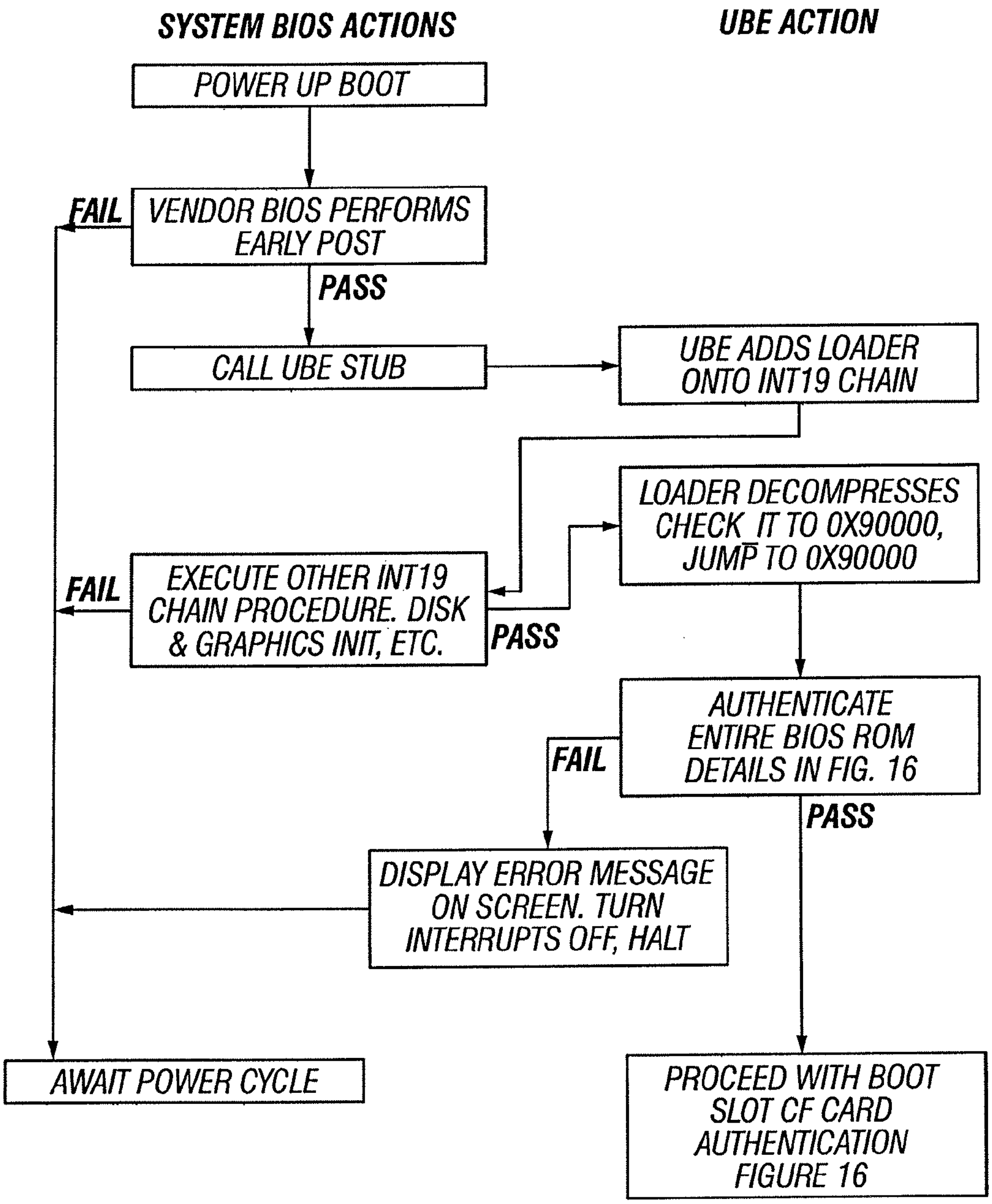
FIG. 15 is a simplified flow diagram illustrating an authentication process of a BIOS ROM according to one embodiment.

After a brief initialization, the validation code's first act is to validate the DSS signature of the entire ROM from which it came. It computes an SHA1 digest value over the entire ROM content. While passing over the region in the ROM where the DSS signature resides, zero value bytes are given to the SHAT algorithm, as illustrated in FIG. 15.

If the DSS signature proves invalid an error message is displayed on the screen (which is still in text mode at this point), interrupts are disabled and a halt instruction is executed. The system will externally appear dead and will execute no more code until the power is cycled.

Figure 16:
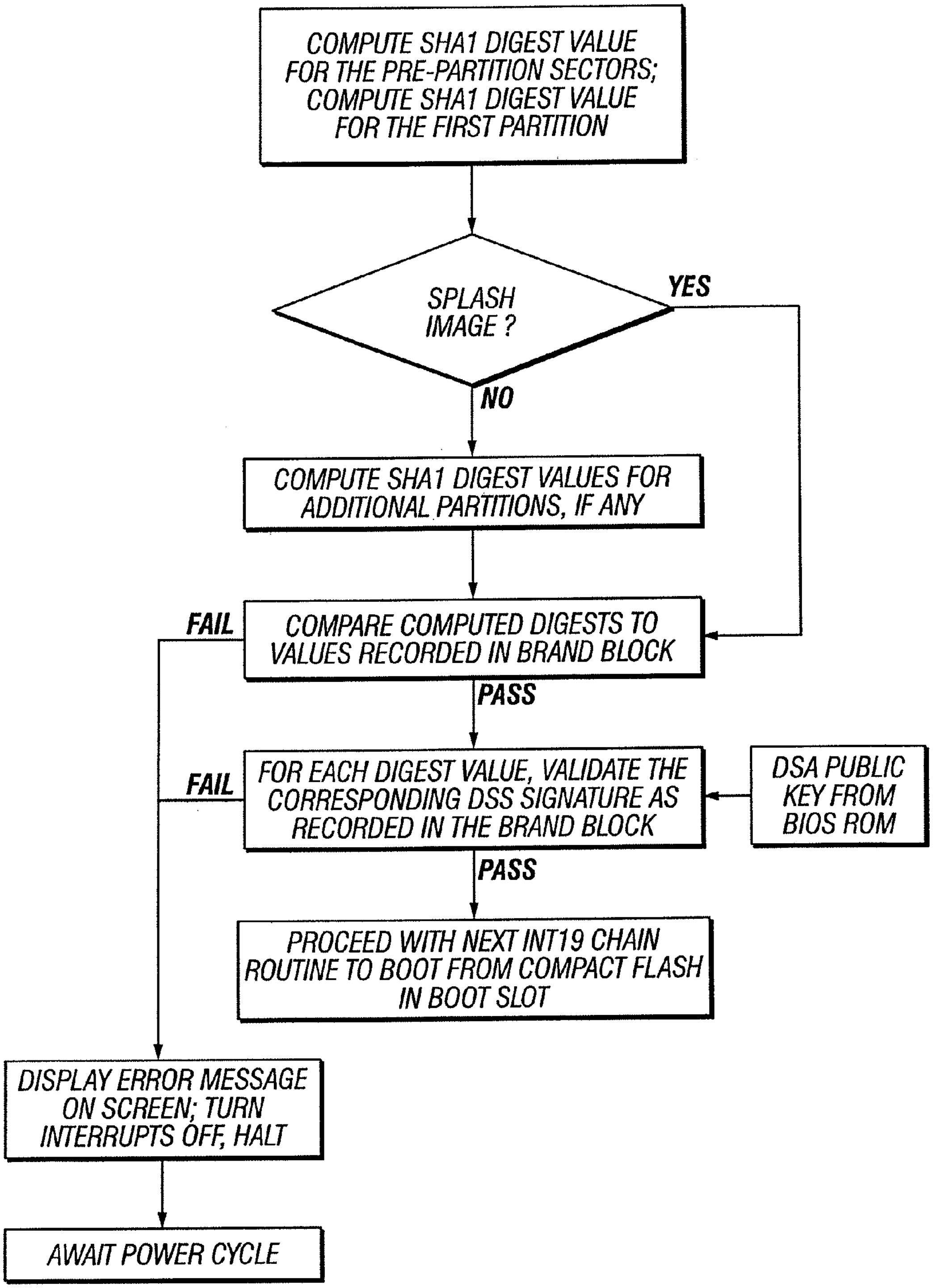
FIG. 16 is a simplified flow diagram illustrating an authentication process of a boot media according to one embodiment.

Otherwise, if the DSS signature proves valid, validation proceeds to validate the boot media in the boot slot as shown in FIG. 16.

Validation of the boot slot boot media begins with the pre-partition area. After validation, the splash image, if present, is decompressed and shown on the system display screen. During the rest of validation, a progress indicator "thermometer" bar is overlaid on top of the splash screen image. Absent a splash screen image, text messages are shown to indicate progress through the procedure.

With the SHA-1 digest values in hand, each digest is compared to its corresponding correct value stored in one of the brand block sectors. Failure of any digest value to compare correctly causes an error message to be displayed on the screen (even if it is in graphics mode), interrupts to be disabled and a halt instruction to be executed.

If all computed digest values are correct, each digest value is used to DSA validate its corresponding DSS signature, all the DSS signatures being stored in the brand block sectors. This is done using the public key and related constants taken from the ROM.

If any DSS signature fails to validate, an error message is displayed on the screen (again, even in graphics mode), interrupts are disabled and a halt instruction is executed.

Otherwise, if all DSS signatures prove valid, control is passed to the next procedure on the INTI 9 list, one of which will be the standard PC disk boot loader. That loader will in turn boot the operating system from the boot media in the boot slot in conventional manner.

Post Boot Authentication of Compact Flash

Having authenticated the boot/root partition on the boot media, the Linux kernel is loaded in the usual fashion. After kernel internal initialization completes, the kernel creates a process called init, which executes a command script found in the file /etc/rc.sysinit. This script file corresponds to the autoexec.bat file found in some legacy "operating systems", The rc.sysinit script does some minimal necessary initialization using only components from the already validated boot/root partition, and then launches a program called validator. The job of the validator is to authenticate in its entirety the media in both slots.

This is accomplished for each media by computing a SHA1 digest over the entire media. While passing over the region in one of the brand block sectors where the "whole device" DSS signature resides, zero value bytes are given to the SHA1 algorithm, as was the case when the signature was originally computed. Next, the digest value is used to DSA validate its corresponding DSS signature, the DSS signature being the whole device signature stored in the brand block sectors of its respective media. This is done using the public key and related constants taken from the ROM.

Checks for both media are carried out concurrently. If either authentication check fails, the system starts up in a fault state showing a call attendant message on screen, and normal operation is not possible without intervention by an attendant.

Otherwise, if both cartridges authenticate, normal system operation begins.

Continuous Run Time Authentication

During system operation, four (4) copies of validate are running continuously, having been indirectly started by the platform fault monitoring process, faultdog. One is responsible for continuous verification of the media devices installed in the OS slot. The second instance of validate is responsible for continuous authentication of the compact flash device installed in the GAME slot. The third instance of validate continuously authenticates the BIOS ROM. The fourth instance of validate continuously authenticates the configuration ID EEPROM. All of these instances of validate run in the background with a small percentage of the processor committed to the process. The authentication of the BIOS ROM and jurisdictional ID EPROM occur once every 20 seconds. If the validation process fails for any of the four devices, the game halts and a tilt condition is declared.

On Demand Run Time Authentication of Individual Files

Recall that each media contains something called a file signature table, or FST. The FST is a list of DSS signatures for every file on the card, sorted by Linux file system Mode number. Recall also that the FST resides on its media in the sectors before the first partition, and that these sectors are authenticated via a DSS signature of their own by the validator program and by the BIOS ROM which runs before booting the kernel.

Early on in kernel initialization, and well before the init process is started, the disk drivers are initialized. At that time the media are discovered and their FSTs are loaded into kernel memory for fast lookup of file signatures.

Figure 17:
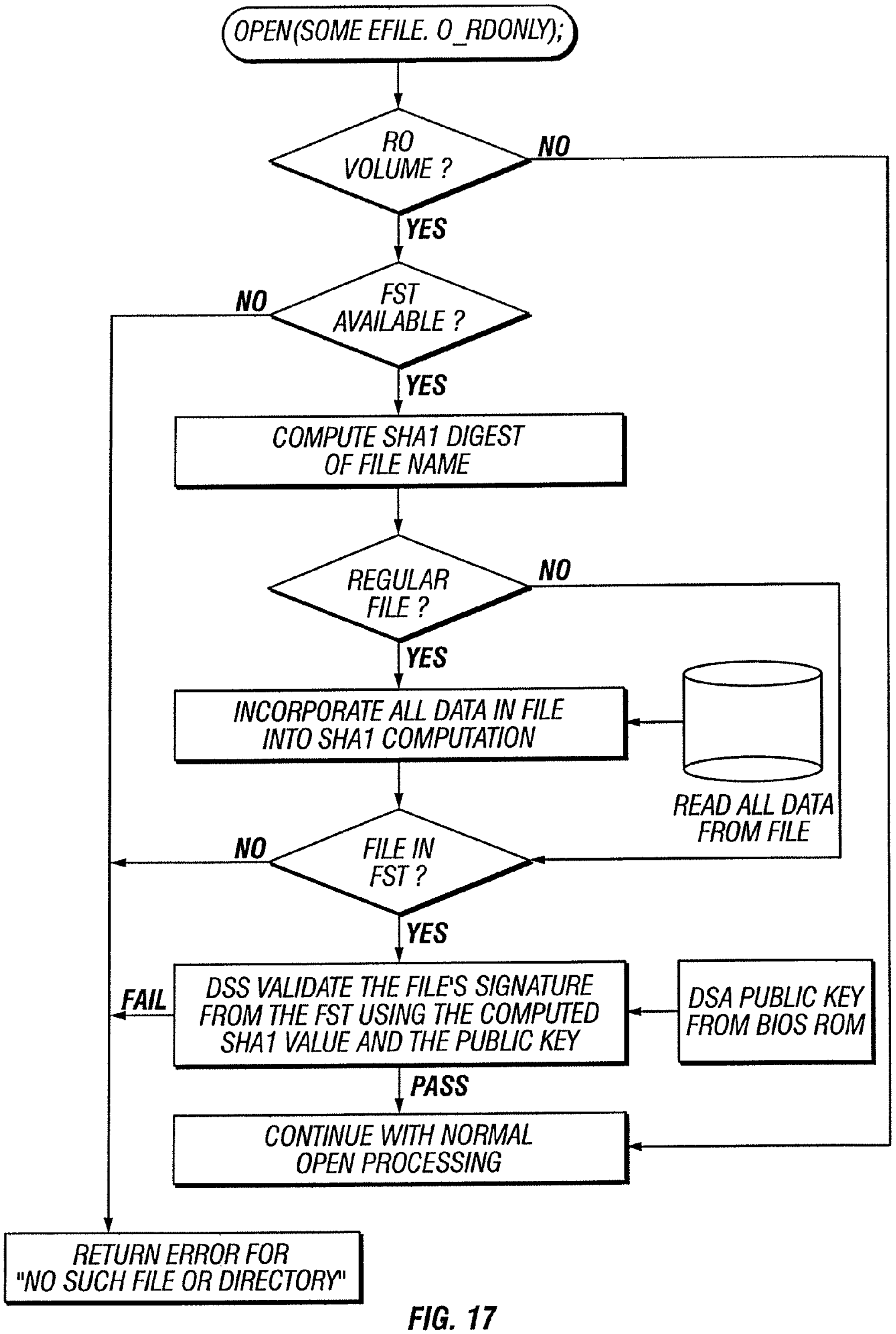
FIG. 17 is a simplified flow diagram illustrating an authentication process of an individual file according to one embodiment.

Subsequently, any time a file is opened, be it to load a program or simply read data, that file is authenticated by validating its DSS signature as found in the table. This process is illustrated in FIG. 17.

The kernel computes a SHA-1 digest for the file, looks up the file's DSS signature in the FST for the media holding the file, and validates the signature against the digest value. The public key to be used is taken by the kernel from the BIOS ROM the in kernel memory for later use. The SHA-1 digest is computed over a byte value sequence consisting of the fully resolved canonical file name and, in the case of regular files, all of the data in the file.

If the DSS signature for the file validates, the open is permitted to complete normally.

Otherwise, if the DSS signature fails to validate, the open fails, and the process calling open gets the error code for "No such file or directory."

One caveat: file signature checking is only active on file systems mounted read-only, which the rc.sysinit script is very careful to do for all media partitions.

It is worth noting that this mechanism is in place and active by the time the kernel starts the init process. Since the kernel is configured to mount the root file system read-only, even loading the init program and processing of the rc.sysinit file (and any files it in turn opens) are all subject to file signature checking.

Continuous Run Time Authentication of DRAM Resident Code and Data

As described above, executable programs are authenticated automatically because file content is authenticated upon opening of each file. However, the kernel takes additional steps to permit continuous run time authentication of programs resident in memory.

Figure 18:
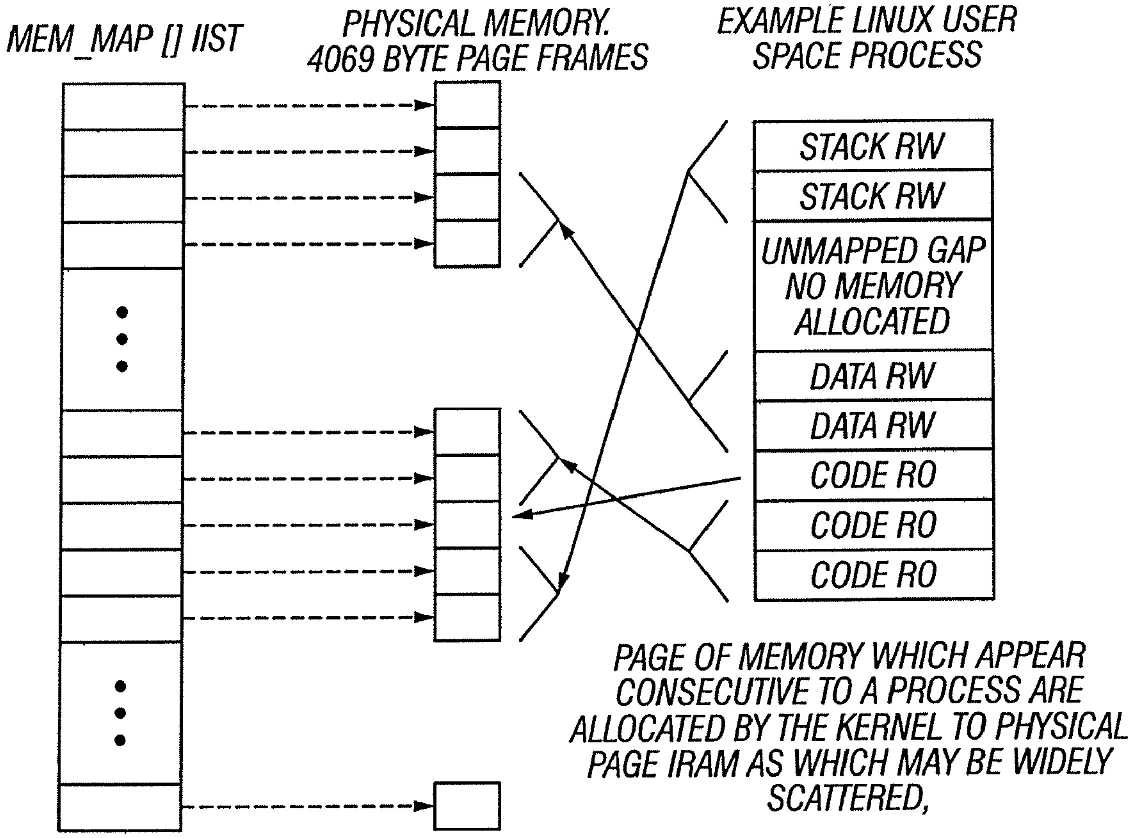
FIG. 18 is a simplified diagram illustrating the problem with Linux process memory allocation.

A program's memory can actually include scattered pieces and tracking them down on a process-by-process basis would be impossibly expensive in terms of CPU time used. FIG. 18 illustrates the problem. This is one of three reasons why the SHA-1 digest for an entire program file is not used to validate the program once it is loaded into memory and running. Another is that a program file contains constant data serving as initial values for some variables that will actually be changing during execution. Finally, the ELF executable file format contains data which is not part of the program at all, but which is an essential guide to the kernel loader regarding the structure and library linkage requirements of the program. More simply put, the structure of a running program in memory is very different from a simple image of the program in its executable file.

Referring now to FIG. 18, which is a simplified diagram illustrating the problem with Linux process memory allocation is shown. Linux divides memory into 4096 byte pieces called page frames and keeps a list of properties for each page frame. The name of the list is mem_map. The kernel has been modified for the platform so that the mem_map list shows whether each page frame is read-write or read-only, i.e., whether or not CPU memory protection circuitry permits the page frame to be modified by some program.

Examples of memory which are read-only would be code for the kernel itself or for user space programs (including any code from shared libraries), the code portions of loadable kernel modules, or any memory that processes allocate and specifically set to be read-only.

A special program known as a kernel thread has also been added to the kernel. Its job is to continuously go down the list of page frames and verify the integrity of each read-only page frame it finds. Like the user space process validator, the thread sleeps most of the time, and wakes periodically to check a few page frames of memory. The thread is designed so that it consumes about five percent of the CPU time, yet does not impose any visible performance penalty.

The thread tests the integrity of a page frame by computing an SHA-1 digest value for the data in the page frame and comparing that value to the correct value found in the mem_map table. If the comparison succeeds the thread will either check another frame or go back to sleep. Otherwise, if the comparison fails, a kernel fault (also called a "panic") is declared. Diagnostic information describing the fault is saved in NVRAM for later review, a brief message is displayed on the screen, and the system locks up until power is cycled.

Now if this is to work, one must ask how the "correct" digest values came to be in the mem_map table in the first place. The answer is that they are computed at the time the page frame is filled with data and marked read-only. In the case of kernel pages the digests are entered into the table very early during kernel startup, right after it is loaded from the media in the boot slot. In the case of user space processes or loadable kernel module code, digests are computed immediately upon loading from the appropriate media. In these latter two cases, the page data comes from a file opened for the purpose of starting a program or loading a module. The thing to keep in mind is that in all these cases, the data goes into the page frame and a digest is computed within milliseconds of the source media having been authenticated via DSS signature validation. Once a program is in memory, digest checking is simply a way of making sure its read only pages don't get modified while resident.

The kernel thread has one other important feature. It provides a means by which the user space fault monitoring program, faultdog, can tell the thread to initiate a non-stop start to finish recheck of all memory digest values. Such a full-up check typically takes a few seconds, during which time no game play is allowed. Digest errors discovered during this check cause a kernel panic, as described above. Faultdog may choose to initiate such a check for any number of reasons, for example, detection of the main door closure.

Core Dump Via Shared File system for Diagnostics

When a computer program malfunctions, the operating system kernel will stop the program and announce the program's failure. If certain resources are available, the kernel writes a copy of the failed program's memory out to a file called a "core dump." The writers of the program can often discern the exact cause of the problem by examining the core dump file.

It is not uncommon to encounter an embedded computer design that does not have the free storage available to absorb the core dump. Luckily though, many of these same designs do have a communications link attached to them, usually for the purpose of starting and stopping the applications and for monitoring their progress. This link can often be made to support "file sharing" with a remote computer. By establishing such sharing, the kernel can now be directed to write the core image onto the hard disk of the remote computer, where developers can dissect it. The following is an Ethernet-based example (in Linux). The embedded system is configured to enable TCP/IP (run 'xconfig' to enable TCP/IP; rebuild kernel). The embedded system is also configured to have DHCP (Dynamic Host Configuration Protocol) acquire an IP address. An NFS server is set up to store any core dumps (Linux services are configured to include NFS, NFSLOCK and the name of the directory is included to use in the /etc/exports). The core dump directory is mounted to the NFS server (the remote disk's directory is given a local name as though it were a physical part of the local, embedded computer; the connection is defined in /etc/fstab and "mount" is used). Core dumps are redirected to an alternate location (for Linux, this requires a change to the kernel so that it did not put the core dump into the directory with the program's file; once the kernel started "dumping" to a particular directory, a symbolic link was made to the remote disk; when the kernel wrote the core dump file to the stated directory, it was actually being redirected by the file system and network software to write the core dump onto the remote computer).

Sound Server

By including a sound server, it is much easier for a client to add sound. The program (process, task), which uses the sound server, is called the "client" in the following. More than one client may use the sound server at a time and each such client can define multiple sounds to be playing at a time. The sound server keeps track of each active sound file, mixes them, and sends them to the sound driver. The sound server accommodates differences in sound file formats. Thus, the client may use Wave files, Adpcm, and other formats.

Sound files are compressed and must be decompressed before mixing. The sound server does this internally, removing that burden from the client. Since many products play a repetitive list of sounds and the decompression is somewhat time consuming, sound servers "caches" the decompressed files. Therefore, when a client asks the sound server to load a sound file, the sound server searches the list of currently decompressed files in the cache and will preferentially use the already-decompressed file. The sound server deletes unused cache entries. All of this is transparent to the client.

Sound files can contain (timing) "Markers" which indicate when some other activity must occur, such as moving a cartoon character's lips to follow a voice sound track. The client software needs to know when these Markers appear in the sound file so the client can define a "callback." This is a subroutine (function, procedure) in the client, which triggers the non-sound activity needed at that point in time.

The sound server controls the volumes of each sound independently, but it also has "global" controls for volume and muting.

Video Server

The platform uses a client/server architecture for handling video or graphics processing. Inter-process communications are used for client/server communication, and it is mediated by the supervisor program as described above.

The game application initializes the video library, which registers itself as a client to the video server. This initialization will create a video client (VClient) and a server client (S Client). The game application requests graphics processing through the VClient. The video server receives the messages and processes them for the corresponding SClient.

Once a video client is created, the game application may create video objects via the client video library without worrying about the details of how the rendering is performed. All graphics operations are requested by the client through a sprite class and performed on the server as needed. The graphic objects that a game application may create and manipulate are as follows:

Sprite

A Sprite creates a rectangular area of the video screen onto which other graphic objects may be placed. A Sprite may receive events from a server (e.g., Touch Screen) and will process them if an event handler is defined. If there is no event handler, the event is passed to the Sprite's parent. Sprites may also be associated with hardware buttons and lamps and will receive events from these (see Events below for more information).

SpriteWindow

Same as Sprite except that events are not passed to the parent object.

SpriteRect

Draws an outlined rectangle.

SpritePoly

Draws a simple polygon on the video screen consisting of 1 to n points.

SpriteLine

Draws a simple line on the video screen consisting of two points.

SpriteLabel

Draws a simple text string on the video screen.

SpriteImage

Draws a bitmap image on the video screen.

Font

Loads a bitmap font into memory that maybe used for a SpriteLabel.

The process flow for creating and updating graphics objects is as follows:

Creation

1. Game application creates a new graphics object
   SSpriteImage * mySprite=new SpriteImage( . . . );
2. VClient sends a message to the video server requesting that a new graphics object be created.
   vclient->NewSpriteImage( . . . );
3. The Video Server receives a message requesting that a new graphics object be created for a client.
   Server::HandleMsgNewSpriteImage (Client client, MsgSpriteMove & msg);
4. The Video Server creates a new graphics object for the requesting client. SClient will maintain the pointer to this graphic object.
   svideo->newSpriteImage(client, . . . );

NOTE: Everything after Step 1 is transparent to the game application.

Update

1. Game application calls a graphics update function.
   mySprite->MoveTo(100, 100);
2. VClient sends a message to the video server to update the graphics object.
   vclient->MoveSprite( . . . );
3. The Video Server receives a message requesting that a graphics object be updated for a client.
   Server::HandleMsgSpriteMove (Client client, MsgSpriteMove & msg);
4. The Video Server updates the graphics object for the requesting client. The pointer to the object is retrieved from the SClient instance.
   svideo->SpriteMove(client, msg.handle, msg.position);

NOTE: Everything after Step 1 is transparent to the game application.

As noted above in both examples, the low-level work of graphics processing is handled by the video server. The game application only has to request that an object be created and when and how it needs to be updated. The methods for updating a graphics object are detailed below.

AdvanceFrame

Advances to the next image frame. This is used for sprites that have multiple images for animation or multi-states.

SetFrame

Sets the sprite to a specific image frame.

Show

Makes a sprite visible.

Hide

Makes a sprite invisible.

Enable

Enables the sprite. If an event handler is assigned, it will be active.

Disable

Disables the sprite. If an event handle is assigned, it will be inactive.

SetZOrder

Sets the drawing order for the sprite. This determines which sprites are drawn on top of another.

Align

Aligns the sprite to a specific point on the video screen.

Move

Moves the sprite by a delta value.

MoveTo

Moves the sprite to a specific point on the video screen.

SetSize

Sets the display size of the sprite.

Events

Sprite objects may be programmed to handle touch events and respond to button pushes from a list of pre-defined hardware buttons. Hardware buttons may be attached for handling by the AttachButton method. They may be removed by using the DetachButton method.

Lamps

A Sprite may also control the state of a lamp associated with an attached button. Use the SetLampState method to turn a lamp on or off.

The video server keeps a Z Order for all sprite objects. The Z order determines the drawing order for objects. A list of dirty rectangles is kept by the server to determine which areas require updates. This minimizes the amount of updating performed by only redrawing areas that have changed. Messages from the video client are sent to the server and are queued for processing by the server. Once all commands have been processed from the message queue, the server performs the necessary updates.

Rendering of sprites is done from back to front based on the z-order. The regions to draw for all sprites is calculated. Sprites may be transparent or solid. Solid sprites preclude rendering of images behind it which results in a speed increase.

Rendering occurs on an off-screen bitmap. The dirty rectangles are then updated to the primary video surface. After rendering is complete, all dirty rectangles are cleared for the next update.

Figure 19:
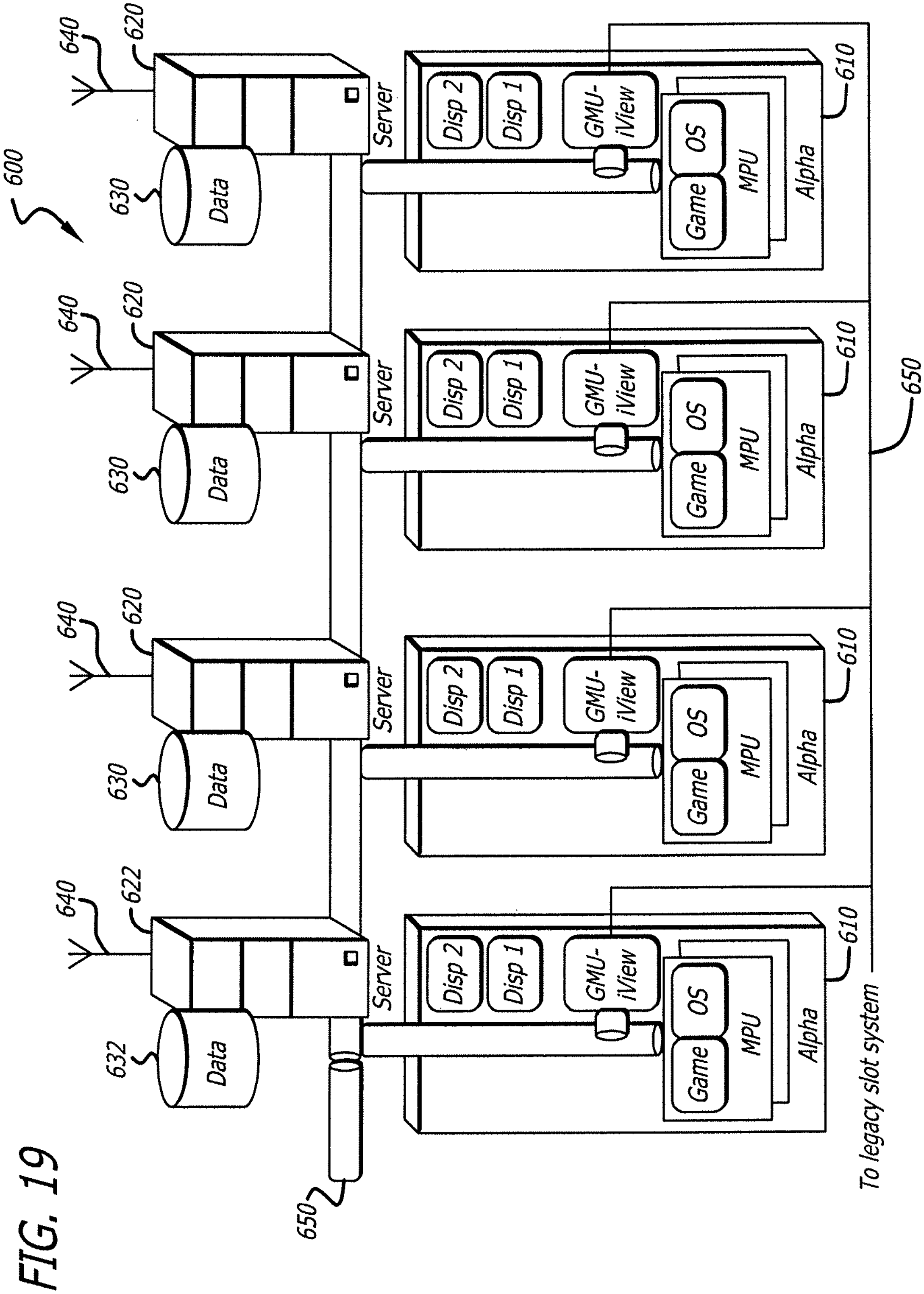
FIG. 19 illustrates a disclosed embodiment of a local game-area network system.

Referring now to FIG. 19, a preferred embodiment of an operating system-based, local game-area network 600 is shown that is specific to the games of a particular manufacturer, and is independent of slot systems 650 and back-end servers. In one embodiment, several gaming devices 610 are interconnected in a local game-area network 600 to produce a hybrid peer-to-peer system in which every gaming device has the potential to act as a local game-area server 620 for the remainder of the gaming devices 610 in the local game-area network 600. (In a true peer-to-peer system, each device in the system communicates with every other remaining device in the system.) The gaming device 610 and associated server that act as a local game-area server 620 for the remainder of the gaming devices 610 in the local game-area network may change (to another gaming device and associated server in the local game-area network) depending on various factors. This local game-area server 620 may be referred to herein as the "active" local game-area server 622 (or host server). Accordingly, the local game-area network 600 provides a local game-area server 620 (and associated database 630) that are made available to game developers.

This novel architectural configuration enables gaming devices 610 (or other devices) in the local game-area network 600 to link games, retain history information, make use of off-game mass storage, and even run an RNG (random number generator) on a local game-area server 620. This configuration supports greatly enhanced team play and "group game" interaction. The gaming devices 610 (or other devices) in the local game-area network 600 may be connected by wires, wireless, IR, or the like. Optionally, those skilled in the art will appreciate that, in some embodiments, a wireless phone is attached to one or more of the local game-area server 620 to phone a home location (or to another remote location) with data related to game play.

In a preferred embodiment of an operating system-based, local game-area network 600, gaming devices 610 from a single manufacturer are networked together so that they work better as a group than they do as individual machines. This type of configuration enables game developers to be freed from the one-game, one-cabinet mindset, as well as to develop games that span multiple cabinets and potentially involve groups of people in cooperative and/or competitive play scenarios (e.g., multi-game, community gaming, and the like). One aspect of another embodiment includes an optional Ethernet connection (or other appropriate interface) from the local game-area network 600 to a "full casino floor" broadband network 650. Such an optional Ethernet connection provides an expansion capability to link in a casino download and configuration server, as well as for eventual replacement of a legacy floor network.

As disclosed above, in another aspect of an embodiment, a wireless connection 640 is provided to and from an "active" local game-area server 620 in the local game-area network 600. In one embodiment, the wireless connection is a mobile (i.e., wireless) telephone. In such an embodiment, data accumulated by the local game-area server 620 is uploaded to a specific game manufacturer's headquarters at some preset time, upon some specific event, and/or upon some series of events. In this manner, the wireless connection may download patches, new web content, new game content, and/or serve as a management insertion point for maintenance issues. Data transferred over the wireless connection may include, by way of example only, and not by way of limitation, information related to game play history that game developers may find valuable in evaluating new and old games. The wireless connection may alternatively or additionally be 802.11, or some substantially equivalent form of local game-area networking. In some embodiment, the wireless connection is used to link the local game-area server 620 to a casino backend system to avoid wiring difficulties and aide in server support and maintenance.

In still another embodiment, an Alpha MPU (master processing unit) (See U.S. patent application Ser. No. 10/794,760, which is incorporated herein by reference) is used to drive a second screen of a gaming device 610 that runs only a web browser on the second screen and drives the web browser from a local game-area server 620. In one embodiment, the local game-area network 600 enables many different types of synchronization of both game play and game operation.

In one embodiment of the local game-area network 600, the physical transport layer can be network topology that enables more than one-to-one connection. This includes, by way of example only, and not by way of limitation: Ethernet, wireless, and multi-drop serial connections, and the like. In such an embodiment, the protocol and application layers can be anything requiring communication, including by way of example only, and not by way of limitation: progressives, bonus systems, player tracking, accounting, performance evaluation, data collection, data consolidation, and resource sharing.

In another embodiment of the local game-area network 600, a bank controller is replaced with a local game-area server 620 having comparable functionality on (or associated with) one of the gaming devices 610 within the bank (i.e., the local game-area network 600). Thus, the local game-area server 620 controls all of the gaming devices 610 within the bank, thereby making a bank controller unnecessary. However, in such an embodiment, the operation of the bank of gaming devices 610 (i.e., the local game-area network 600) is now dependent on a specific gaming device 610 and its associated local game-area server 620. Thus, one gaming device 610 (and its associated local game-area server 620) within the local game-area network 600 operates as a "host server" (local game-area server) for all of the gaming devices 610 in the local game-area network 600, along with its other duties. Correspondingly, the other remaining gaming devices 610 in the local game-area network 600 operate as the "clients" of the "host server." Accordingly, if the gaming device 610 needed to be moved, had to be shut down due to an unrelated error, or otherwise was intentionally or unintentionally taken off-line, the entire local game-area network 600 would lose connectivity. For this reason, a "floating server" (as described below) configuration is typically utilized in a preferred embodiment of the local game-area network 600.

In one embodiment of a local game-area network 600, several gaming devices 610 are linked together, with each gaming device having its own associated local game-area server 620. However, in one embodiment, every gaming device 610 in the local game-area network 600 is actively controlled by (and/or otherwise in communication with) only a single "active" local game-area server 622. This "active" local game-area server 622 (i.e., floating server) is a server that can move dynamically and automatically between available (and previously inactive) local game-area servers 620 in the local game-area network 600 as needed. In this manner, when a gaming device 610 in the local game-area network 600 is shut down due to a malfunction, operational need, or otherwise, the gaming device's corresponding local game-area server 620 is typically shut down as well. If this local game-area server 620 that is being shut down happens to be the "active" local game-area server 622 (i.e., the floating server), the server will automatically move (or "float") to another (previously inactive) local game-area server 620 in the local game-area network 600. As long as all the gaming devices 610 (and associated local game-area servers 620) in the local game-area network 600 are not shut down simultaneously, an "active" local game-area server 622 will always be available for remaining gaming devices 610 in the local game-area network 600.

In many prior network configurations (e.g., large flat Ethernet networks), every device is connected on the same network, each with its own connection to the same host system. Accordingly, this configuration makes every device dependent on the host to be able to operate, and all scalability is the burden of the host system. However, in an embodiment of a local game-area network 600, each bank of gaming devices 610 communicates only to the local game-area server 620 located in (or near) the local game-area network 600. In some embodiments, the local game-area server 620 also optionally communicates with a back-end host system. This architecture removes the dependency on the back-end host system and distributes the network load to the local game-area servers 620 in the local game-area networks 600, as well as providing many other benefits and capabilities, such as greater scalability.

Figure 20:
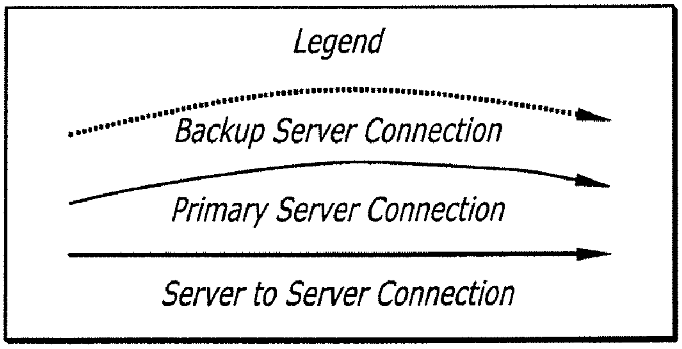
FIG. 20 illustrates a diagram key legend for use with FIGS. 21-32.

Referring now to FIG. 20, a diagram key legend in shown. Each of FIGS. 21-32 follow the diagram key legend shown in FIG. 20. In this regard, the dotted line is always a connection from a client to a backup or secondary server, the solid thin line is always a connection from a client to a main (or primary) server, and the heavy solid line is always a connection between two servers.

In another embodiment of a local game-area network 600, a "back-up" local game-area server 624 is utilized in addition to an "active" local game-area server 622. With respect to data storage, each local game-area server 620 typically has an associated local game-area database 630. Accordingly, an "active" local game-area server 622 has an associated "active" local game-area database 632 and a "back-up" local game-area server 624 has an associated "back-up" local game-area database 634. Therefore, in one embodiment, in order to prevent other gaming devices 610 in a local game-area network 600 from suffering a host connection outage (i.e., an "active" local game-area server 622 outage), a "back-up" local game-area server 624 is run on another gaming device 610 in a local game-area network 600.

Figure 21:
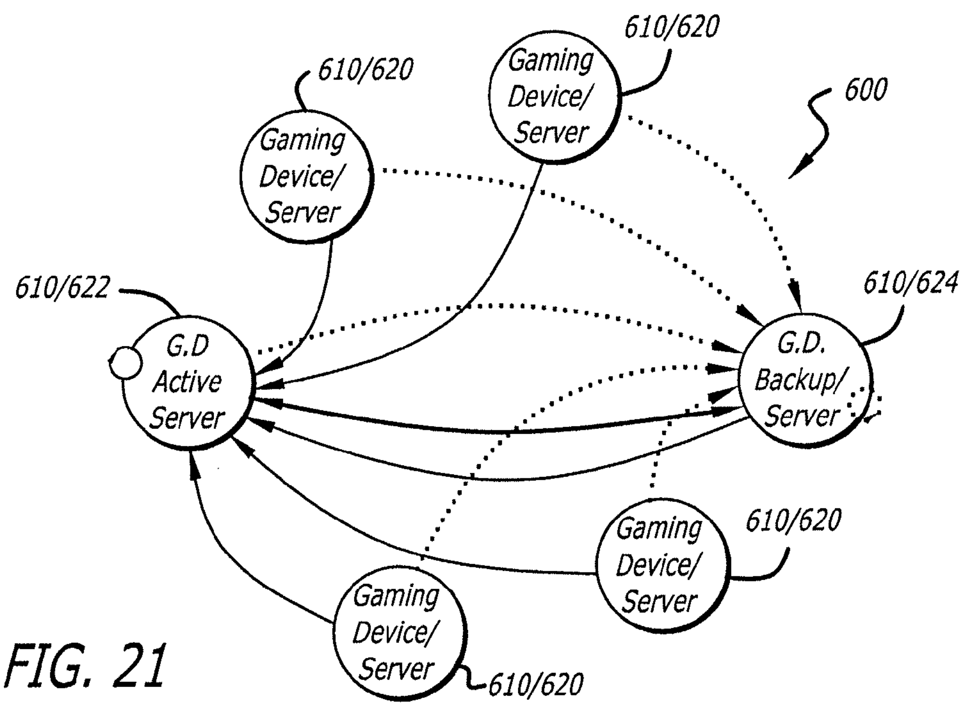
FIG. 21 illustrates a local game-area network in which a plurality of gaming devices are connected to two hosts, an “active” local game-area server and a “back-up” local game-area server.

Otherwise stated, each gaming device 610 and local game-area server 620 (client) in a local game-area network 600 is connected to two hosts, an "active" local game-area server 622 and a "back-up" local game-area server 624, as shown in FIG. 21. In the event that the "active" local game-area server 622 goes out for any reason (intentionally or unintentionally), the "back-up" local game-area server 624 (and its associated "back-up" local game-area database 634) are already up to date and ready to handle the load. At this point, another local game-area server 622 is then activated. More specifically, with respect to the "active" local game-area database 632 and the "back-up" local game-area database 634, data synchronization is typically achieved using one of two techniques. In this regard, either all gaming devices 610 and associated local game-area server 620 (clients) duplicate data between both server connections, or the servers communicate directly, thereby enforcing synchronization between each other.

Figure 22:
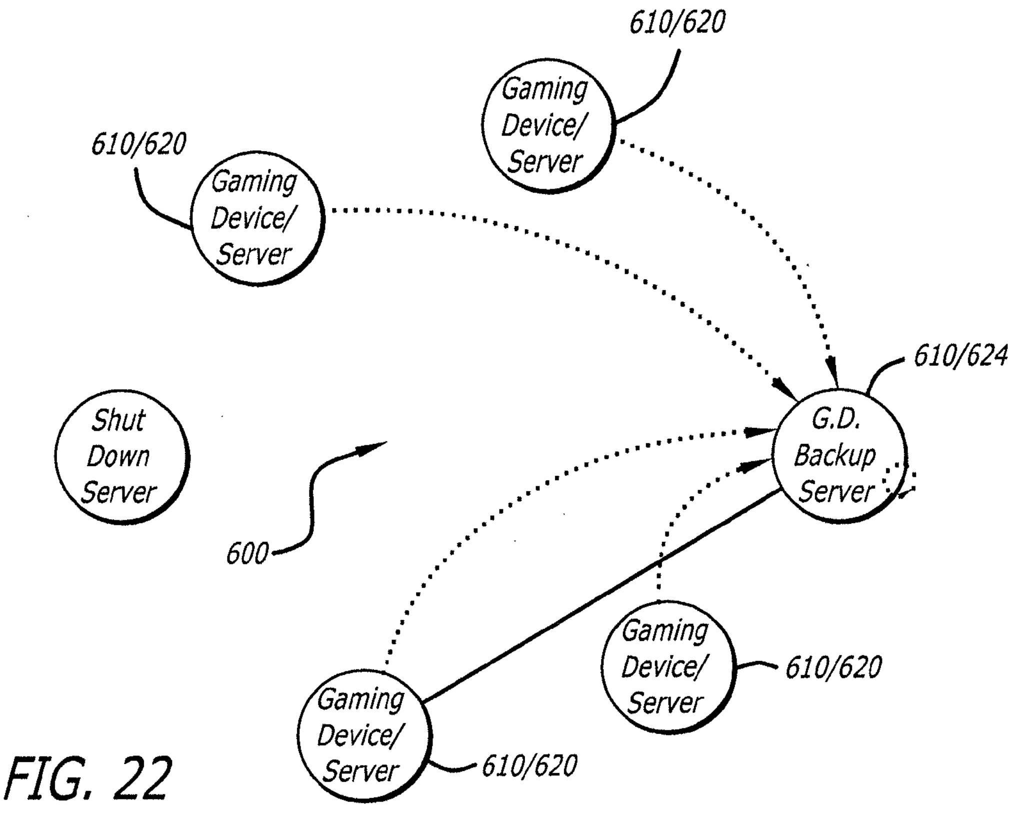
FIG. 22 illustrates a local game-area network in which a plurality of gaming devices were connected to two hosts, an “active” local game-area server and a “back-up” local game-area server, after one of the hosts has been disconnected.
Figure 23:
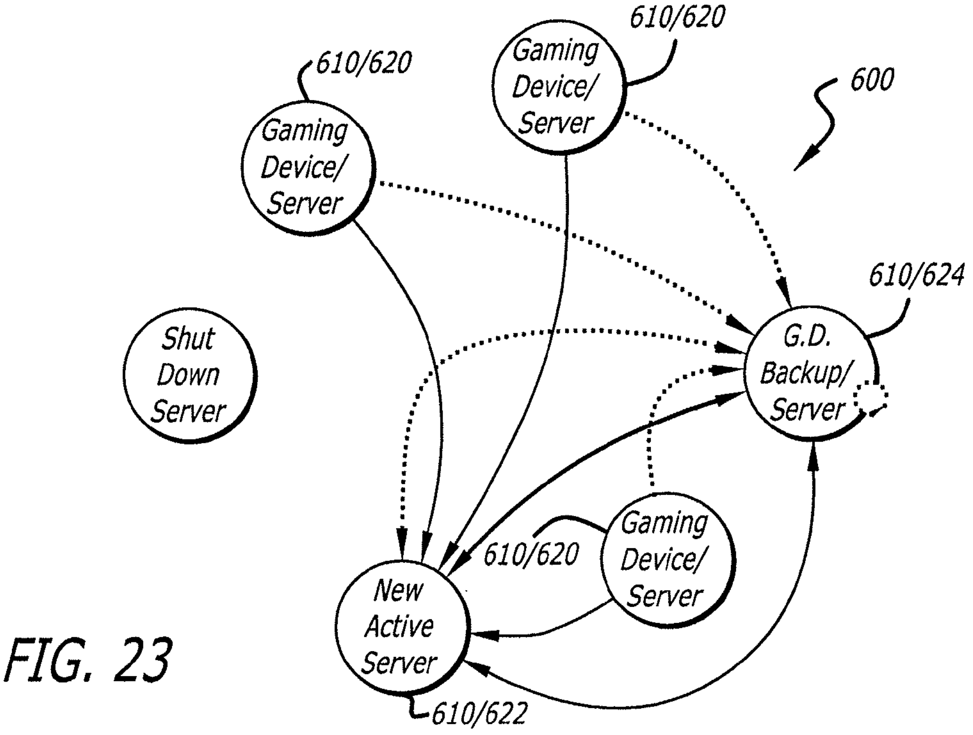
FIG. 23 illustrates a local game-area network in which a plurality of gaming devices were connected to two hosts, an “active” local game-area server and a “back-up” local game-area server, after one of the hosts has been disconnected and a new host has been activated.

Referring now to FIG. 22, in one embodiment, several gaming devices 610 in a local game-area network 600 are connected to two hosts, an "active" local game-area server 622 and a "back-up" local game-area server 624. Specifically, FIG. 22 illustrates the situation when the "active" local game-area server 622 disconnects; however, the process is virtually the same for disconnection and recovery of the "back-up" local game-area server 624. As soon as the disconnection is confirmed, the remaining server (e.g., the "back-up" local game-area server 624 in this example) then initiates an "initialize and synchronize" transmission with a gaming device 610 in a local game-area network 600 that was previously only a client (e.g., "inactive" local game-area server 620). This re-stabilization starts a new "active" local game-area server 622 on the gaming device 610, thereby restoring the two servers per local game-area network 600 concept, as shown in FIG. 23. The local game-area network 600 now has two servers again and is once again protected from the loss of a gaming device 610 and its associated "active" local game-area server 622 begin disconnected.

Figure 24:
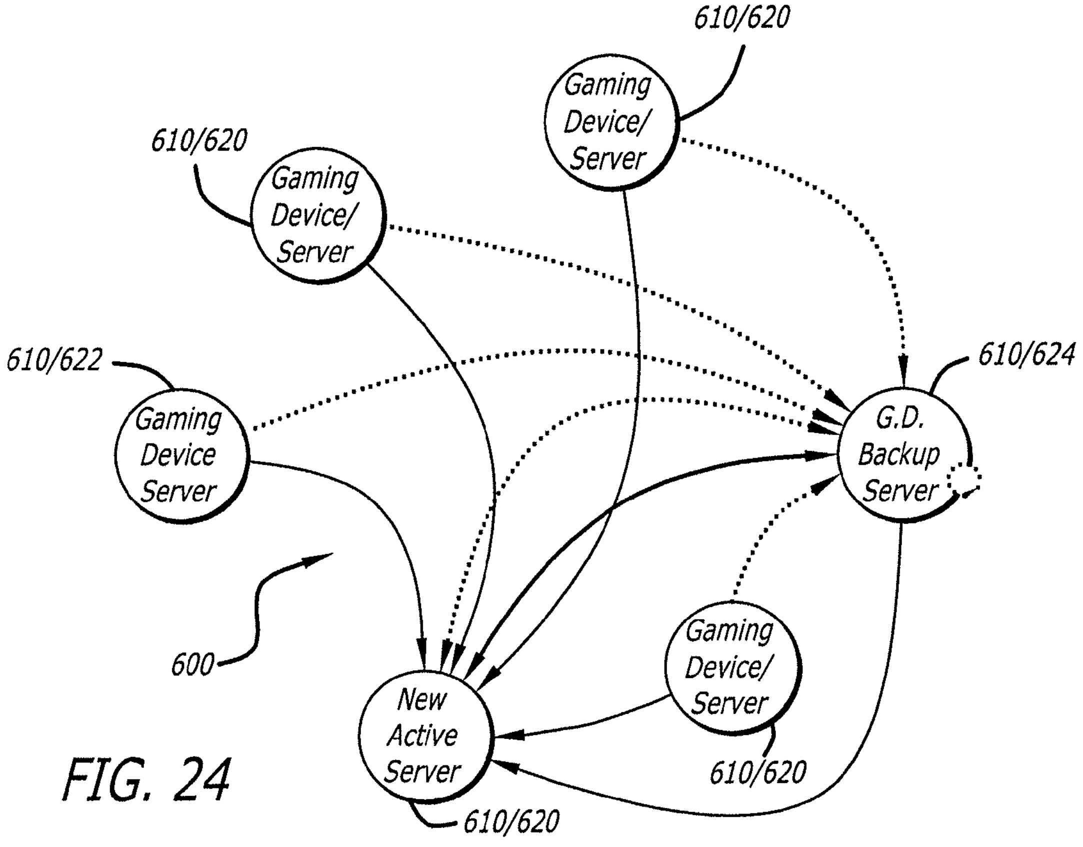
FIG. 24 illustrates a local game-area network in which a plurality of gaming devices were connected to two hosts, an “active” local game-area server and a “back-up” local game-area server, after one of the hosts has been disconnected, a new host has been activated, and a the disconnected host has reconnected as a client.

Referring now to FIG. 24, in the event that the disconnected or "lost" server (e.g., the "active" local game-area server 622 or the "back-up" local game-area server 624) comes back up (i.e., from a reboot or a repair), that server is now re-connectable to the local game-area network 600. In this situation, when the local game-area server 620 reconnects to the local game-area network 600, the server will broadcast out, see that there are already two servers running (e.g., a "active" local game-area server 622 and a "back-up" local game-area server 624) and shut itself down. The associated gaming device 610 then only runs as a client.

With respect to another aspect of an embodiment, when two servers are running in the local game-area network 600, the intention is that if one server is lost the other server can pick up with no data loss. To accomplish this result, both of the servers have to maintain synchronization. A first technique for accomplishing this result requires sending all messages to both servers. This is a difficult option in practice because if the overlaying protocol requires host decisions, each server could make inconsistent decisions that would cause a loss in synchronization. Accordingly, it is preferable to have each client communicate to a single server (e.g., the "active" server 622), and maintain the secondary connection (e.g., the "back-up" server 624 connection) to reduce downtime when switching which server is primary. In this configuration, the secondary connection only consists of "keep-alives," and no actual protocol data is sent. Accordingly, when the local game-area network 600 is arranged in this configuration, the servers are now responsible for keeping each other in synchronization.

With respect to larger network configurations, it should be noted that the configuration of each bank in a floating server network is the same no matter how many levels are set up. In this regard, four pieces of information are typically required for the configuration of each bank: a unique identifier, a bank name, eligibility, and a parent bank identifier. With respect to the unique identifier, each gaming device 610 on the network 600 must be uniquely identifiable. This identity could be anything guaranteed to be unique to the gaming device 610, such as a serial number, an operator entered value, IP address, or MAC address. With respect to the Bank or Network Name, each gaming device 610 within a bank is configured with its unique bank identifier or name. This allows the gaming device 610 to find other gaming devices within the same bank to network, without having to specifically specify each peer in the network 600. With respect to the eligibility for server, each gaming device 610 needs to know if it is eligible to be a server in its bank. Only gaming devices 610 on the same switch, hub, or router as the original server can be eligible. On some physical transport types this can be automatically detected, but not always. With respect to the parent bank network, each bank can have one external connection. This external connection can be used to create a tree-type network architecture, or it can be a connection to an external control or interface system or device. This upward connection may not be a requirement depending on the implementation of the user interface and application level protocol.

In still another aspect of one embodiment, once the required information has been obtained, the local game-area network 600 can start to initialize itself. Once the first gaming device 610 is configured, the local game-area network 600 begins to form. In one embodiment, when a gaming device 610 has been configured, it sends a broadcast to the local game-area network 600 with its identity and name, and queries information looking for a local game-area server 620. In such an embodiment, if the broadcast fails to find the local game-area server 620 for the local game-area network 600, the gaming device 610 enables an operator to activate the first local game-area server 622. Preferably, from this point on, server creation and deletion is automated. Continuing, in such an embodiment, if the broadcast finds an "active" local game-area server 622, the gaming device 610 connects to the server as a client. When the "active" local game-area server 622 receives its first connection that is eligible to be a server in its own right, the "active" local game-area server 622 will initiate that client as a "back-up" local game-area server 624. Once an "active" local game-area server 622 and a "back-up" local game-area server 624 have been initiated, all additional gaming device 610 broadcasts are responded thereto. New gaming devices 610 and their associated local game-area servers 620 are connected to both servers as clients.

Figure 25:
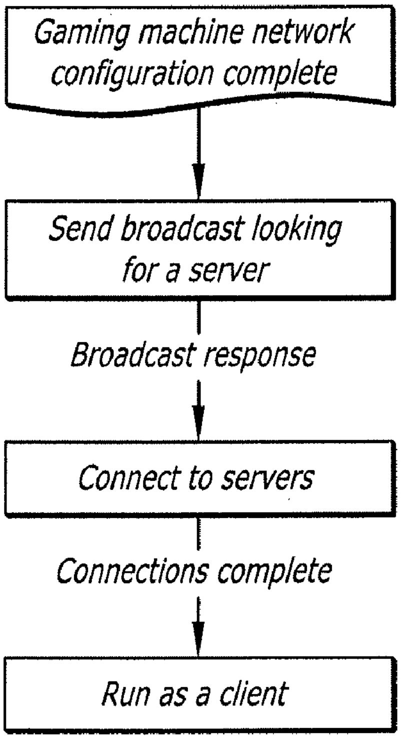
FIG. 25 illustrates a logical flow diagram of a network configuration in which a local game-area server is running as a client with a server connection available.
Figure 26:
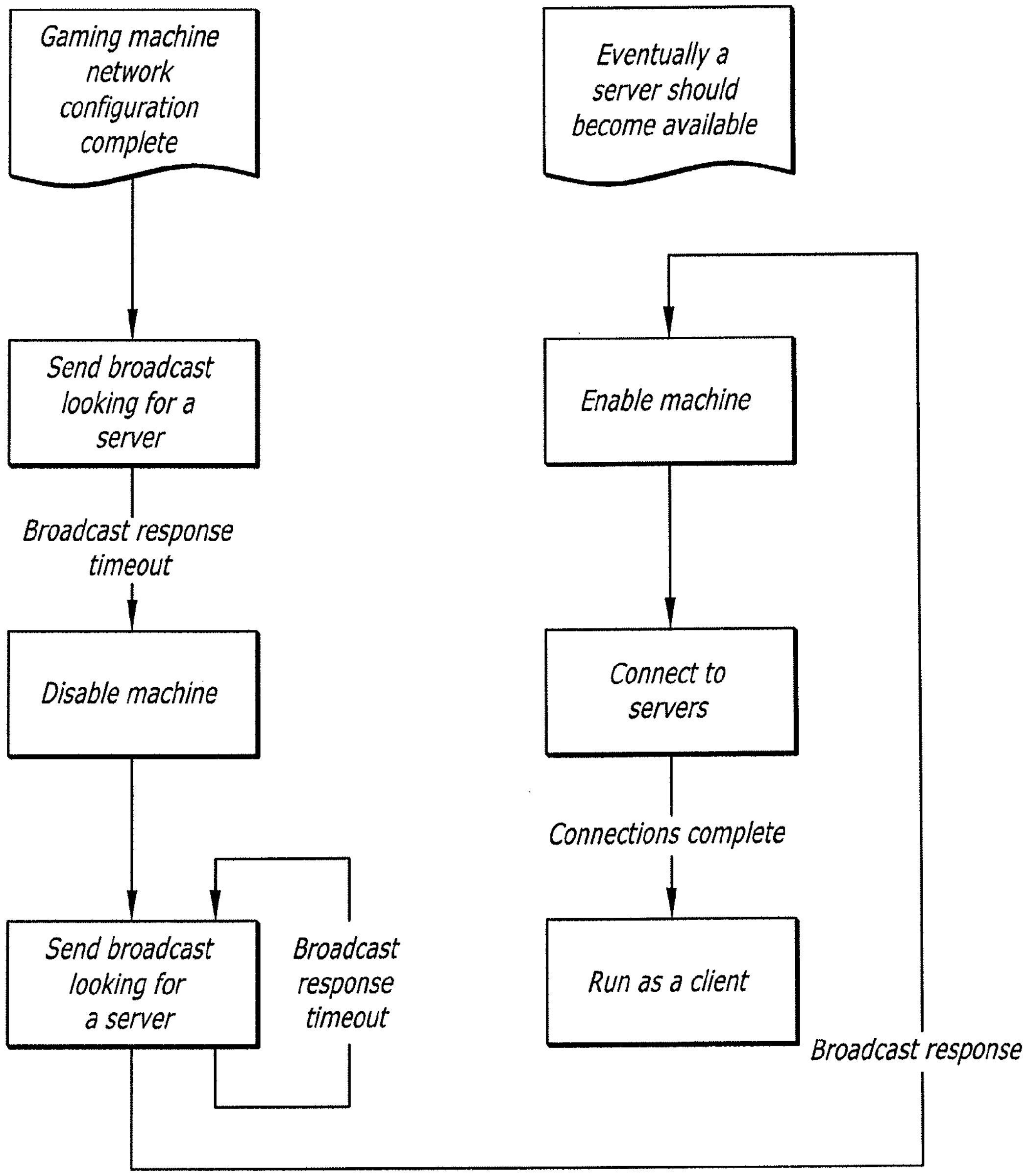
FIG. 26 illustrates a logical flow diagram of a network configuration in which a local game-area server is running as a client without a server connection available.
Figure 27:
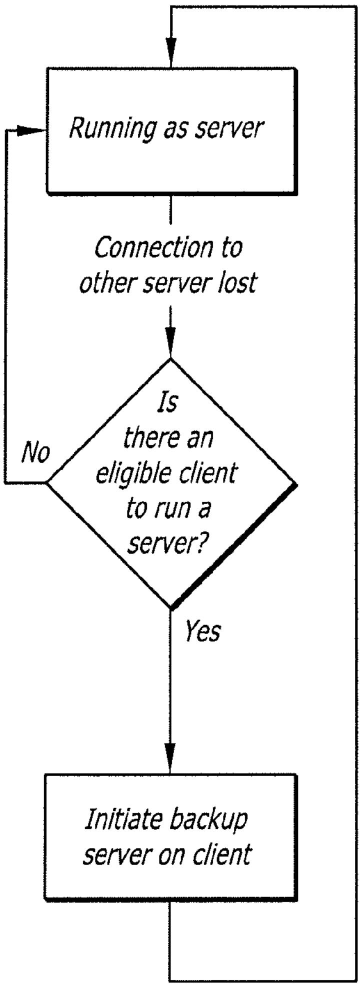
FIG. 27 illustrates a logical flow diagram of a network configuration in which a local game-area server is running as a server during a connection loss to the other server.
Figure 28:
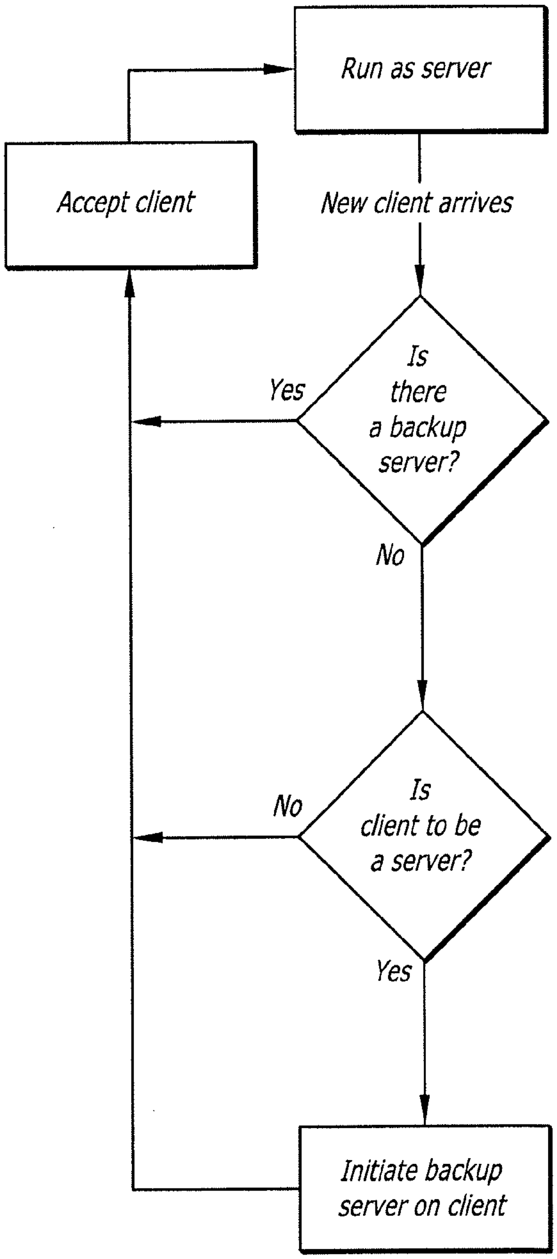
FIG. 28 illustrates a logical flow diagram of a network configuration in which a local game-area server is running as a server during a new client arrival.
Figure 29:
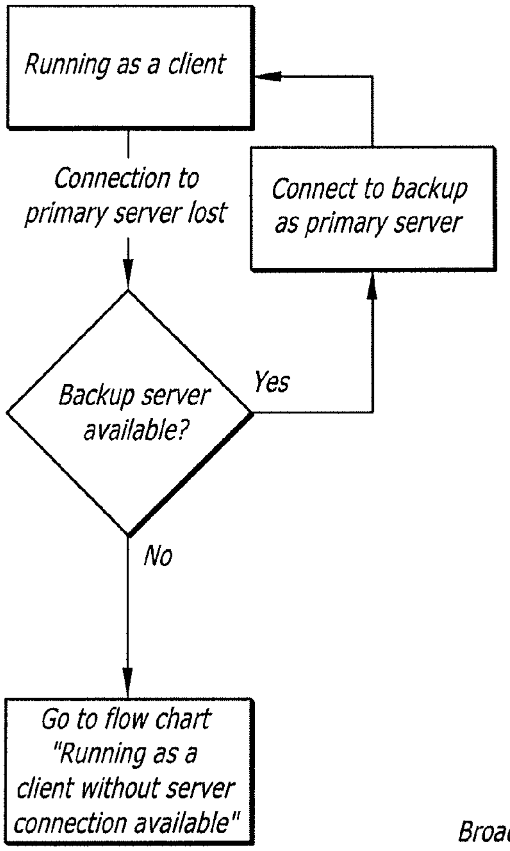
FIG. 29 illustrates a logical flow diagram of a network configuration in which a local game-area server is running as a client during primary server connection loss.
Figure 30:
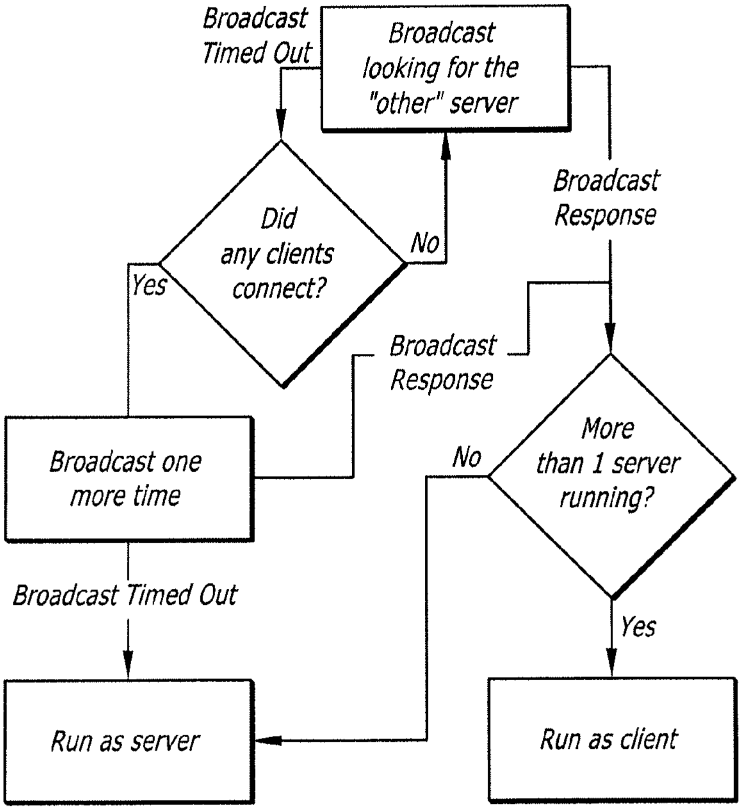
FIG. 30 illustrates a logical flow diagram of a network configuration in which a server recovers from total connection loss (or power outage)
Figure 31:
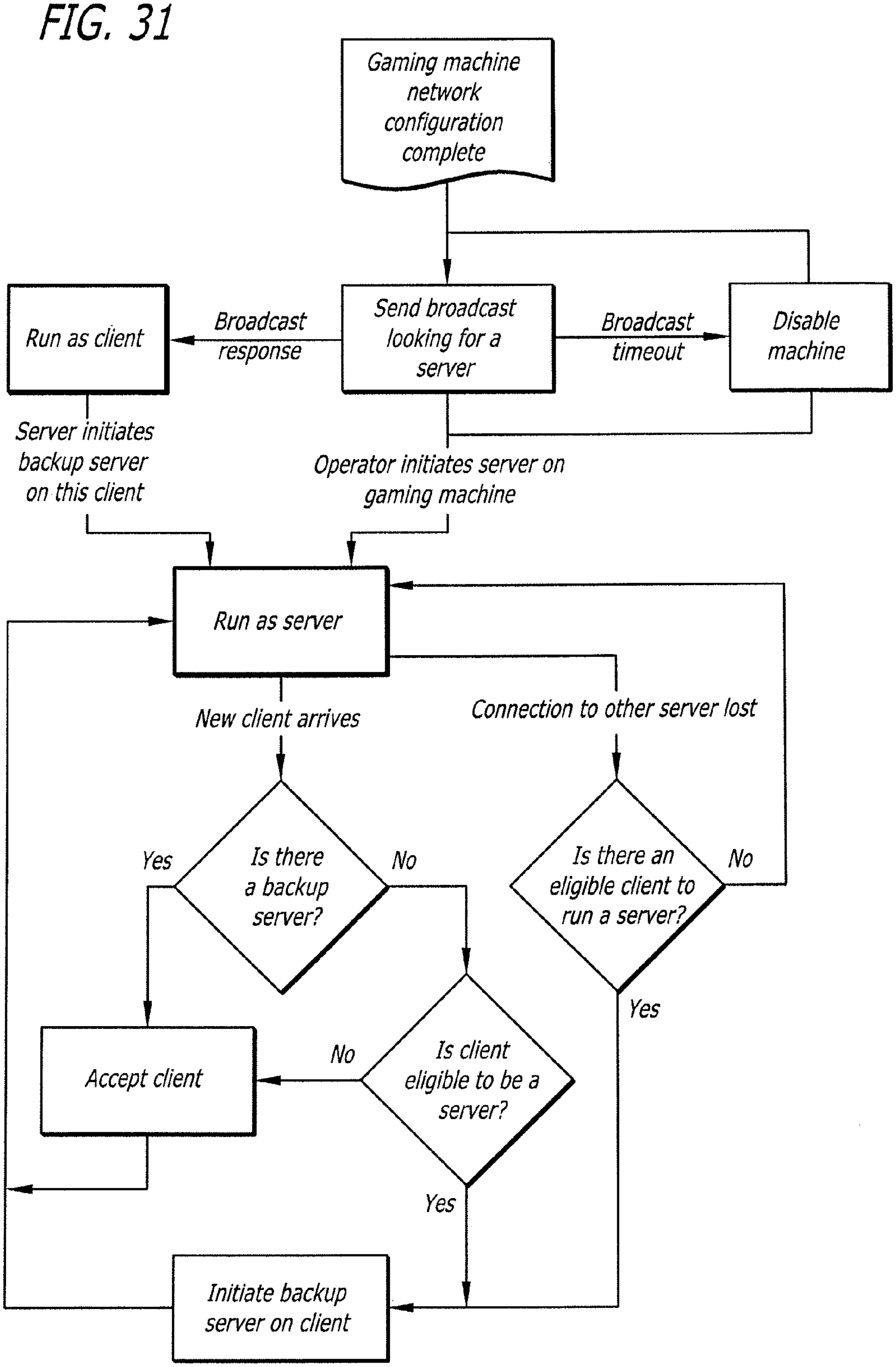
FIG. 31 illustrates a logical flow diagram of a network configuration that is a combination of FIGS. 25-31.

Referring now to FIG. 25, a logical flow diagram of a network configuration is shown in which a local game-area server 620 is running as a client with a server connection available. Referring now to FIG. 26, a logical flow diagram of a network configuration is shown in which a local game-area server 620 is running as a client without a server connection available. Referring now to FIG. 27, a logical flow diagram of a network configuration is shown in which a local game-area server 620 is running as a server during a connection loss to the other server. Referring now to FIG. 28, a logical flow diagram of a network configuration is shown in which a local game-area server 620 is running as a server during a new client arrival. Referring now to FIG. 29, a logical flow diagram of a network configuration is shown in which a local game-area server 620 is running as a client during primary server connection loss. Referring now to FIG. 30, a logical flow diagram of a network configuration is shown in which a server recovers from total connection loss (or power outage). Referring now to FIG. 31, a logical flow diagram of a network configuration is shown that is a combination of FIGS. 25-31.

With respect to accessing the user interface of an "active" local game-area server 622 (e.g., floating server), since the "active" local game-area server 622 has neither dedicated hardware or guaranteed known location after gaming devices 610 start being removed and added to the local game-area network 600, conventional means of accessing a server for data collection or configuration are unsuitable. The "active" local game-area server 622 needs to be accessible regardless of which gaming device 610 and associated local game-area server 620 is currently the host server. One method of accessing the server 622 is to connect a gaming device 610 to the same local game-area network 600, and access the server 622 as a client, following the same broadcast method a gaming device 610 would use to find the server 622. This method allows both mobile and permanent devices to be used as user interfaces. In the mobile case, the same display hardware could be used to access any bank or even multiple banks at once. Another method of accessing the "active" local game-area server 622 is to enable each gaming device 610 on a server to provide access via an operator menu. The operator menu would work similar to using a mobile device, except it would be making additional reuse of gaming device hardware to accomplish the task. Finally, accessing the "active" local game-area server 622 as a parent host is also an option. In this situation, the user interface is connected to, or part of, the parent network device to which the "active" local game-area server 622 has an outgoing connection. This can be accomplished using a dedicated control server or simply a user interface accessing the "active" local game-area server 622.

Figure 32:
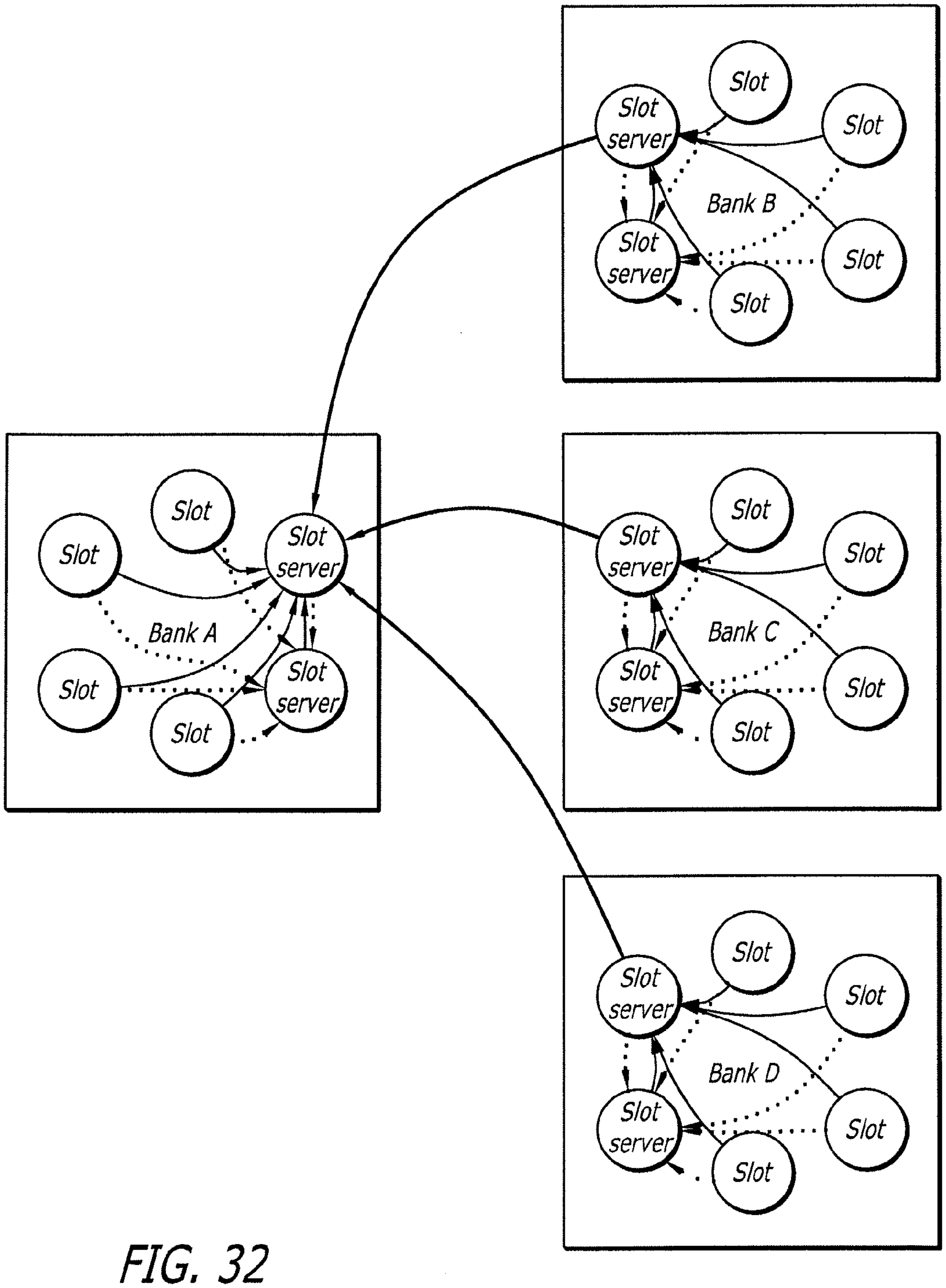
FIG. 32 illustrates a logical flow diagram of a network configuration in which a local game-area network is utilized in conjunction with other network configurations.

Referring now to FIG. 32, a floating server design can be utilized with a tree or star network configuration. Each bank server can maintain an outgoing connection to an external server. The external server can be anything capable of accepting the connection. This includes, by way of example only, and not by way of limitation: another bank of machines, an external host system, a simple display terminal, or a complex display terminal. This external host connection can also be a floating server with a back-up. FIG. 32 shows four banks of gaming device 610, each running a floating server system.

Any gaming device 610 in this entire network could be lost, without disrupting the operation of any other gaming devices.

Referring again to FIG. 9, in another aspect of one embodiment, the local game-area network 600 enables many other capabilities that include, by way of example only, and not by way of limitation: (1) communication messages (i.e., message that enables one standalone slot machine to link with a server and then to other slot machines such that operations like game play, lights buttons, sounds and graphics can be synchronized); (2) communications protocols that support the aforedescribed communication messages; and (3) local storage (e.g., in a local server database 630) of game performance data and reflexive use thereof (locally store game performance data and optimize the data for reflexive gaming on a carousel level).

Continuing, the local game-area network 600 enables game developers to operate in cooperation and synchronization with other games without modification to the core operating system. In this manner, the local game-area network 600 enables game developers to control both the games and server development, thereby providing group play capabilities that include, by way of example only, and not by way of limitation: (1) head-to-head play (e.g., a racing game, shooting game, or the like); (2) pattern matching games (Tetris™, Sudoku, or the like, in which contributions from players are tallied and wins are distributed proportionate to each player's contribution to the group win); (3) progressive, bonus, or tournament games, in which a player is rewarded based upon their contribution to completing the game (in contrast to the typical 'winner take all' approach); (4) the ability to sign game results on a game so that a user's score and "handle" (e.g., user name) can be displayed for others to see and attempt to "beat;" (5) leader boards of game results, game outcome, and win meters that show how a particular user's play compares to others (such a leader board is driven by the server but appears on the game screen, a top screen on that game cabinet, and/or on an overhead sign); and (6) ticket management, in which the use of tickets to enter people into tournaments is controlled by the local game-area server 620. Additionally, the local game-area network 600 may enable a "Calcutta" option during game play in which groups of people earn scores, and a top pre-selected number of players (X) are selected to go to the next stage. The X people are paired and all players can bet on their "team-pair" to win the next round. The teams compete and awards are given to first, second, and third place winners. Money is contributed up front by players or by the casino from marketing funds or alternatively is pulled as a percentage of wagers.

Referring again to the optional second screen, a second screen may be driven by a web browser in the master processing unit and be independent of the game logic. This separation is a useful capability since certain regulatory considerations may prevent the use of an Internet web browser that is logically connected to game logic or other gaming functionality. The server 620 (or the game) can display web pages on the second screen. In this regard, the displayed content may include, by way of example only, and not by way of limitation: (1) advertisements; (2) news, sports book information and streams; (3) progressive displays; (4) informational sites for the casino, floor maps, directions to bathrooms or restaurants or cabarets; (5) sites that the game logic directs the web browser to display; and (6) diagnostic information for employees that display system parameters while game tests are underway (e.g., line monitors, meter displays, options, and detailed help menus).

In one embodiment, the local game-area server 620 in the local game-area network 600 can be physically located in any one of several places: (1) the server may be a true physical box with attached database; (2) the server may be physically mounted in an overhead display attached to all the connected gaming device (or Alpha platforms); (3) the server may be physically mounted to one of the slot bases of a carousel; (4) the server may be physically located in a box in a wiring closet on the casino floor; (5) the server may be physically mounted in a box in the ceiling above the slot floor; (6) the server may be physically mounted in a box in a server room.

In another aspect of one embodiment, the local game-area network 600 enables a local game-area server 620 to download to a gaming device 610 in a one-to-one relationship (or optionally in a one-to-few relationship). In one specific non-limiting embodiment, a portable computer (or other portable computing device) is utilized as a local game-area server 620 and is connected over a data line (Ethernet, RS232, USB, and the like) to a gaming device 610. The portable computer (local game-area server 620) may query the gaming device 610 for options, logs of various types, and assets. The local game-area server 620 may also upload data and options. With the addition of a hub or switch, the local game-area server 620 may handle a "bank" of gaming devices 610. Notably, in some embodiments, the local game-area server 620 is connected to a gaming device 610 in a permanent or quasi-permanent interface configuration. In such an embodiment, the local game-area server 620 is typically not a portable computer, but rather is another type of computing device that is not optimized for portability.

In one embodiment, a local game-area server 620 in a local game-area network 600 enables numerous capabilities beyond the acquisition of authentication information. Such capabilities include, by way of example only, and not by way of limitation: (1) download of option settings; (2) download of hardware assets; (3) download of software assets; (4) upload of configuration options; (5) modification and viewing of configuration options; (6) saving of configuration options; (7) update of software; (8) download of logs (configuration logs as required by regulations, saving of logs, interpretation of logs, application logs, and the like); and (9) testing of the gaming device(s) 610.

The use of a local game-area server 620 in a local game-area network 600 typically provides many benefits in the transmission of information, due to high data transfer rates. These "high data transfer rate" benefits include, by way of example only, and not by way of limitation: (1) download options; (2) graphical display of download options; (3) user modification of download options; (4) upload of modified options; (5) record retention of inter-transfer to asset management system; (6) logs application, installation, and/or configuration; (7) diagnostic testing (e.g., using the local game-area server 620 to run diagnostic checks on a gaming device 610; (8) entry point for an entire asset management system; (9) downloading, storing, and forwarding of logs for diagnostics; and (10) facilitating computer forensics for regulators and the like.

Typically, the use of a local game-area server 620 in a local game-area network 600 provides further benefits as well. In a one-to-one "game device 610 to local game-area server 620" download configuration there are no problems with immediacy and identification. This is often true in a "one local game-area server 620" to a "few local game devices 610" configuration as well. Such a configuration provides a mechanism for electronically testing a gaming device 610 without disruption of other devices on the network 600. In one embodiment, the local game-area network 600 provides the data acquisition means for an overall asset management system. As described above, this configuration may provide information relating to device state, device health, and future operational benefits. Another practical benefit of the local game-area network 600 is that this network operates independent of any possibly existing wide area slot floor network 650. In this manner, if such a network 650 is damaged, not yet constructed, or not available for any reason, the advanced features described above with respect to the local game-area network 600 can still be used.

Although the disclosed embodiments have been described in language specific to computer structural features, methodological acts, and by computer readable media, it is to be understood that the invention defined in the appended claims is not necessarily limited to the specific structures, acts, or media described. Therefore, the specific structural features, acts and media are disclosed as exemplary embodiments implementing the claimed invention.

Furthermore, the various embodiments described above are provided by way of illustration only and should not be construed to limit the invention. Those skilled in the art will readily recognize various modifications and changes that may be made to the claimed invention without following the example embodiments and applications illustrated and described herein, and without departing from the true spirit and scope of the claimed invention, which is set forth in the following claims.

What is claimed:

1. A method of using a local game-area network in a casino environment, wherein the local game-area network does not require support from a large casino floor network or back-end server system to enable group gaming, the method comprising:

providing a plurality of gaming device sub-systems in the local game-area network, each gaming device sub-system including a gaming device and a corresponding local game-area server, wherein each local game-area server is associated with a corresponding gaming device in each gaming device sub-system;

designating one of the local game-area servers as an active local game-area server that has host status while the remaining local game-area servers act as clients, wherein only a single local game-area server is used to support the plurality of gaming device sub-systems, and the other local game-area servers in the plurality of gaming device sub-systems are inactive; and in response to the active local game-area server becoming non-operational, dynamically moving the host status of the active local game-area server to an available local game-area server acting as a client in the local game-area network.

2. The method of claim 1, wherein the local game-area network is non-operating system-dependent.

3. The method of claim 1, further comprising: designating one of the local game-area servers is a back-up local game-area server.

4. The method of claim 3, further comprising using the back-up local game-area server to help prevent data loss if the active local game-area server becomes non-operational.

5. The method of claim 1, further comprising connecting the local game-area network to a larger casino floor network that includes additional gaming devices.

6. The method of claim 5, wherein the larger casino floor network is a serial network.

7. The method of claim 5, wherein the larger casino floor network is Ethernet.

8. The method of claim 5, wherein the larger casino floor network is an IP-based network.

9. The method of claim 5, wherein the local game-area network is operational without support from the larger casino floor network.

10. The method of claim 5, wherein the local game-area network is operational as a back-up network if the larger casino floor network becomes non-operational.

11. The method of claim 1, wherein the local game-area network enables group gaming among the plurality of gaming devices in the local game-area network.

12. The method of claim 11, wherein the group gaming includes tournament gaming.

13. The method of claim 11, wherein the group gaming includes progressive gaming.

14. The method of claim 11, wherein the group gaming includes head-to-head competitive gaming.

15. The method of claim 11, wherein the group gaming includes collaborative gaming.

16. The method of claim 1, wherein the local game-area network enables local downloads among the plurality of gaming devices in the local game-area network without assistance from a larger casino floor network or a back-end system.

17. The method of claim 1, wherein the local game-area network enables diagnostic testing.

18. The method of claim 1, wherein the local game-area network is at least partially comprised of wireless connections.

19. The method of claim 1, wherein the local game-area network enables synchronization of sounds, lights, video, pictures, graphics, reels, or combinations thereof, within the gaming devices in the local game-area network.

20. The method of claim 1, wherein the local game-area network enables local data storage of group gaming data without assistance from a larger casino floor network or a back-end system.

21. A method of using a local game-area network in a casino environment, the method comprising:

providing a plurality of gaming device sub-systems in the local game-area network, each gaming device sub-system including a gaming device and a corresponding local game-area server;

providing a plurality of additional gaming devices connected to the local game-area network;

designating one of the local game-area servers as an active local game-area server that has host status while the remaining local game-area servers act as clients, wherein only a single local game-area server is used to support the plurality of gaming device sub-systems, and the other local game-area servers in the plurality of gaming device sub-systems are inactive; and in response to the active local game-area server becoming non-operational, dynamically moving the host status of the active local game-area server to an available local game-area server acting as a client in the local game-area network.

22. The method of claim 21, wherein the local game-area network is non-operating system-dependent.

23. The method of claim 21, further comprising designating one of the local game-area servers as a back-up local game-area server.

24. The method of claim 23, further comprising using the back-up local game-area server to help prevent data loss if the host local game-area server becomes non-operational.

25. The method of claim 21, further comprising connecting the local game-area network to a larger casino floor network.

26. The method of claim 25, wherein the larger casino floor network is a serial network.

27. The method of claim 25, wherein the larger casino floor network is an Ethernet.

28. The method of claim 25, wherein the larger casino floor network is an IP-based network.

29. The method of claim 25, wherein the local game-area network is operational without support from the larger casino floor network.

30. The method of claim 25, wherein the local game-area network is operational as a back-up network if the larger casino floor network becomes non-operational.

31. The method of claim 21, wherein the local game-area network supports group gaming among the plurality of gaming devices in the local game-area network.

32. The method of claim 21, wherein the group gaming includes tournament gaming.

33. The method of claim 21, wherein the group gaming includes progressive gaming.

34. The method of claim 21, wherein the group gaming includes head-to-head competitive gaming.

35. The method of claim 21, wherein the group gaming includes collaborative gaming.

36. The method of claim 21, wherein the local game-area network supports local downloads among the plurality of gaming devices in the local game-area network without assistance from a larger casino floor network or a back-end system.

37. The method of claim 21, wherein the local game-area network supports diagnostic testing.

38. The method of claim 21, wherein the local game-area network is at least partially comprised of wireless connections.

39. The method of claim 21, wherein the local game-area network supports synchronization of sounds, lights, video, pictures, graphics, reels, or combinations thereof, within the gaming devices in the local game-area network.

40. The method of claim 21, wherein the local game-area network supports local data storage of group gaming data without assistance from a larger casino floor network or a back-end system.

41. A method of using gaming system having multiple networks in a casino environment, the method comprising:

providing a casino floor network, wherein the casino floor network is selected from the group consisting of a legacy casino floor network, an Ethernet casino floor network, and an IP-based casino floor network;

providing a local game-area network, wherein the local game-area network enables group gaming without assistance from the casino floor network or a back-end server system;

providing a plurality of gaming device sub-systems connected to the local game-area network, each gaming device sub-system including a gaming device and a corresponding local game-area server;

designating one of the local game-area servers as an active local game-area server that has host status while the remaining local game-area servers act as clients, wherein only a single local game-area server is used to support the plurality of gaming device sub-systems, and the other local game-area servers in the plurality of gaming device sub-systems are inactive; and in response to the active local game-area server becoming non-operational, dynamically moving the host status of the active local game-area server to an available local game-area server acting as a client in the local game-area network.

42. The method of claim 41, wherein the local game-area network is a physical network, and not merely a virtual network.

43. The method of claim 41, wherein at least one gaming device includes an Alpha Game Kit kernel.

* * * * *

UNITED STATES PATENT AND TRADEMARK OFFICE

CERTIFICATE OF CORRECTION

PATENT NO. : 8,321,571 B2
APPLICATION NO. : 13/301638
DATED : November 27, 2012
INVENTOR(S) : Robert W. Crowder, Jr. et al.

It is certified that error appears in the above-identified patent and that said Letters Patent is hereby corrected as shown below:

In the Specifications:

Column 5, In line 1, add --S-- to “DRAWING”

Column 5, In line 9, replace “1/0” with --I/O--

Column 5, In line 42, remove “and”

Column 5, In line 44, replace “.” with --;--

Column 9, In line 24, insert --upgrades-- after “enables”

Column 13, In line 24, replace “Unix” with --UNIX--

Column 19, In line 57, insert --( )-- after “Idle”

Column 19, In line 58, remove “(”

Column 20, In line 18, add --d-- to “provide”

Column 27, In line 58, replace “InputIdle” with --Input Idle--

Column 32, In line 51, replace “Gaining” with --Gaming--

Column 33, In line 50, replace “an” with --a--

Column 36, In line 21, replace “systems”,” with --systems.”--

Column 48, In line 4, add --s-- to “device”

Signed and Sealed this
Twenty-eighth Day of May, 2013

Teresa Stanek Rea
*Acting Director of the United States Patent and Trademark Office*